US012312148B2

(12) United States Patent
Antico

(10) Patent No.: US 12,312,148 B2
(45) Date of Patent: May 27, 2025

(54) BABY BOTTLE POD

(71) Applicant: A & J Innovative Solutions LLC, Sherborn, MA (US)

(72) Inventor: Addison Antico, Sherborn, MA (US)

(73) Assignee: A & J Innovative Solutions LLC, Sherborn, MA (US)

( * ) Notice: Subject to any disclaimer, the term of this patent is extended or adjusted under 35 U.S.C. 154(b) by 142 days.

(21) Appl. No.: 18/108,350

(22) Filed: Feb. 10, 2023

(65) Prior Publication Data

US 2023/0271766 A1 Aug. 31, 2023

Related U.S. Application Data

(60) Provisional application No. 63/439,227, filed on Jan. 16, 2023, provisional application No. 63/350,659, filed on Jun. 9, 2022, provisional application No. 63/314,770, filed on Feb. 28, 2022.

(51) Int. Cl.

| | |
|---|---|
| ***B65D 81/32*** | (2006.01) |
| ***A61J 9/00*** | (2006.01) |
| ***A61J 11/00*** | (2006.01) |
| ***B65D 23/04*** | (2006.01) |
| ***B65D 43/02*** | (2006.01) |
| ***B65D 53/02*** | (2006.01) |
| ***B65D 85/72*** | (2006.01) |

(52) U.S. Cl.

CPC ........... *B65D 81/3211* (2013.01); *A61J 9/008* (2013.01); *A61J 11/008* (2013.01); *B65D 23/04* (2013.01); *B65D 43/0204* (2013.01); *B65D 53/02* (2013.01); *B65D 85/72* (2013.01); *B65D 2543/00592* (2013.01)

(58) Field of Classification Search

CPC ......... A61J 1/2093; A61J 9/008; A61J 9/085; A61J 11/008; B65D 81/3211; B65D 23/04; B65D 43/0204; B65D 53/02; B65D 85/072; B65D 2543/00592

USPC ............ 215/11.1, 11.2, 11.6, DIG. 8, 6, 311; 206/219, 220, 221, 222, 217; 426/117, 426/112, 115, 106; 220/4.21, 324, 378, 220/129, 129.1

See application file for complete search history.

(56) References Cited

U.S. PATENT DOCUMENTS 380,782 A * 4/1888 Barrett et al. ..... B65D 51/1644 215/311
4,076,139 A * 2/1978 Larson ...................... A61J 9/08 220/605
4,121,727 A * 10/1978 Robbins ................. B65D 50/06 215/206
4,778,068 A * 10/1988 Kohus ....................... A61J 9/00 215/11.1

(Continued)

*Primary Examiner* — Anthony D Stashick
*Assistant Examiner* — Prince Pal
(74) *Attorney, Agent, or Firm* — NEO IP

(57) ABSTRACT

The device of the present invention includes a compact baby bottle attachment. The device of the present invention is a pod that is functional as a cap to a baby bottle, a storage container for powdered formula, and a dispenser for powdered formula. The device is removably attachable to conventional baby bottles and eases the baby feeding process by storing powdered formula separately from the water reservoir, sealing the powdered formula compartment with a ring plug, and including a nip housing depression to ensure the nip is erect and ready to feed upon removal of the pod.

20 Claims, 34 Drawing Sheets

(56) References Cited

U.S. PATENT DOCUMENTS

| | | | | |
|---|---|---|---|---|
| 4,818,114 | A | 4/1989 | Ghavi | |
| 5,000,314 | A * | 3/1991 | Fuller | B65D 81/3205 215/DIG. 8 |
| 5,361,918 | A * | 11/1994 | Mason | B65D 51/28 215/11.1 |
| 5,401,200 | A * | 3/1995 | Ellis | A63H 33/04 446/124 |
| 5,419,445 | A * | 5/1995 | Kaesemeyer | A61J 11/04 215/11.4 |
| 5,551,583 | A * | 9/1996 | Sachathamakul | A61J 11/04 215/11.1 |
| 5,634,714 | A * | 6/1997 | Guild | A61J 9/00 215/DIG. 7 |
| 5,638,968 | A * | 6/1997 | Baron | B65D 81/3211 215/11.4 |
| 5,863,126 | A * | 1/1999 | Guild | B65D 81/3211 215/11.1 |
| 5,878,898 | A * | 3/1999 | Shefflin | A61J 9/085 215/11.1 |
| 6,045,254 | A * | 4/2000 | Inbar | B65D 25/087 215/DIG. 8 |
| 6,089,389 | A * | 7/2000 | Sharon | A61J 9/00 215/11.4 |
| 6,113,257 | A * | 9/2000 | Sharon | A61J 9/00 215/11.4 |
| 6,484,905 | B1 * | 11/2002 | Swackhamer | A47J 47/01 222/461 |
| 6,513,650 | B2 | 2/2003 | Mollstam et al. | |
| 6,644,471 | B1 | 11/2003 | Anderson | |
| 6,769,539 | B2 | 8/2004 | Stern et al. | |
| 7,219,796 | B2 | 5/2007 | Anderson | |
| 7,225,938 | B2 | 6/2007 | Frisch | |
| 7,287,657 | B1 * | 10/2007 | Rodriguez | A61J 11/008 215/11.1 |
| 7,810,661 | B2 | 10/2010 | Murphy | |
| 8,028,847 | B2 * | 10/2011 | Klaver | A61J 9/00 215/11.1 |
| 8,146,758 | B1 | 4/2012 | Peres | |
| 8,251,235 | B2 | 8/2012 | Py et al. | |
| 8,292,099 | B1 | 10/2012 | Wahlstrom | |
| 8,371,440 | B2 | 2/2013 | Questad et al. | |
| 8,439,231 | B2 | 5/2013 | Schroedter | |
| 8,459,450 | B1 * | 6/2013 | Whitaker | A61J 9/00 215/11.4 |
| 8,556,094 | B2 | 10/2013 | Brown et al. | |
| 8,573,421 | B2 | 11/2013 | Py et al. | |
| 8,636,158 | B2 | 1/2014 | Frisch | |
| 8,672,123 | B1 * | 3/2014 | Vallejo | A61J 9/00 222/153.04 |
| 8,757,451 | B2 | 6/2014 | Schroedter | |
| 8,820,549 | B1 | 9/2014 | Estrada | |
| 8,875,913 | B2 * | 11/2014 | Diaz | A61J 9/001 222/326 |
| 8,887,904 | B2 | 11/2014 | Gutierrez | |
| 9,016,488 | B1 * | 4/2015 | Peres | A61J 9/008 215/11.1 |
| 9,050,242 | B1 * | 6/2015 | Mooney | A61J 9/08 |
| 9,107,803 | B2 | 8/2015 | Vaught | |
| 9,227,777 | B2 | 1/2016 | Steven et al. | |
| 9,254,244 | B2 | 2/2016 | Perera et al. | |
| 9,289,356 | B2 | 3/2016 | Farber et al. | |
| 9,565,967 | B2 | 2/2017 | Manser et al. | |
| 9,566,214 | B2 * | 2/2017 | Eitrheim | A61J 9/00 |
| 9,580,227 | B2 * | 2/2017 | Wood | A61J 11/008 |
| 9,814,345 | B2 | 11/2017 | Kutcher et al. | |
| 10,070,751 | B2 | 9/2018 | Magniet et al. | |
| 10,301,087 | B2 | 5/2019 | Giuliano | |
| 10,463,576 | B2 | 11/2019 | Liang et al. | |
| 10,556,736 | B1 | 2/2020 | Guevara | |
| 10,919,690 | B2 | 2/2021 | Dogan et al. | |
| 11,083,327 | B2 | 8/2021 | Deleo | |
| 11,141,022 | B2 | 10/2021 | Sharon et al. | |
| 11,708,200 | B1 * | 7/2023 | Xu | B65D 81/3211 206/528 |
| 2001/0039977 | A1 * | 11/2001 | Sharon | B65B 43/60 141/1 |
| 2003/0024830 | A1 * | 2/2003 | Sharon | B65D 81/3205 220/8 |
| 2004/0118709 | A1 * | 6/2004 | Cho | B65D 51/2892 206/219 |
| 2004/0188371 | A1 * | 9/2004 | Holley, Jr. | A61J 9/001 215/11.1 |
| 2005/0056610 | A1 * | 3/2005 | Randolph | A61J 11/045 215/11.4 |
| 2005/0056611 | A1 * | 3/2005 | Hakim | A61J 11/00 215/396 |
| 2005/0194341 | A1 * | 9/2005 | Houraney | A61J 9/08 215/11.1 |
| 2005/0284498 | A1 | 12/2005 | Demarest | |
| 2006/0006128 | A1 * | 1/2006 | Resendiz Sanudo | A61J 9/08 215/11.6 |
| 2006/0113271 | A1 * | 6/2006 | Rea | A61J 11/045 215/11.1 |
| 2006/0273059 | A1 * | 12/2006 | Mendenhall | A61J 11/0085 215/396 |
| 2007/0012643 | A1 * | 1/2007 | McKiddy | A61J 11/008 215/11.1 |
| 2007/0221601 | A1 * | 9/2007 | Eitrheim | A61J 11/002 215/6 |
| 2007/0284329 | A1 * | 12/2007 | Hayes | A61J 11/04 215/11.1 |
| 2008/0083692 | A1 * | 4/2008 | Strickler | A61J 9/005 215/11.6 |
| 2010/0072160 | A1 * | 3/2010 | Hayes | A61J 11/002 215/11.1 |
| 2010/0193459 | A1 * | 8/2010 | Housley | A61J 11/045 215/11.5 |
| 2010/0213085 | A1 | 8/2010 | Belnap | |
| 2010/0213156 | A1 * | 8/2010 | Belnap | A61J 9/00 215/11.1 |
| 2010/0304357 | A1 * | 12/2010 | Meyers | G01N 33/52 422/68.1 |
| 2012/0067888 | A1 * | 3/2012 | Kawachi | B65D 51/002 220/233 |
| 2012/0292314 | A1 | 11/2012 | Tyroler et al. | |
| 2013/0037506 | A1 * | 2/2013 | Wahlstrom | A61J 1/2093 215/6 |
| 2013/0126461 | A1 | 5/2013 | Brown | |
| 2013/0224344 | A1 | 8/2013 | Mathieu | |
| 2014/0102919 | A1 * | 4/2014 | Gutierrez | A61J 9/04 215/11.5 |
| 2014/0107608 | A1 * | 4/2014 | McBean | A61M 1/062 215/11.1 |
| 2014/0246435 | A1 | 9/2014 | Py et al. | |
| 2014/0361016 | A1 * | 12/2014 | Moreau | B65D 51/28 426/115 |
| 2015/0096956 | A1 * | 4/2015 | Lin | A61J 9/08 215/11.6 |
| 2015/0114922 | A1 * | 4/2015 | Kohn | A61J 9/008 215/11.1 |
| 2015/0173561 | A1 | 6/2015 | Foster | |
| 2016/0089306 | A1 * | 3/2016 | Chee | A61J 11/0085 215/11.1 |
| 2016/0096673 | A1 * | 4/2016 | Leibovitch | A23L 2/52 426/2 |
| 2016/0120761 | A1 * | 5/2016 | Wood | A61J 9/008 206/219 |
| 2017/0049663 | A1 * | 2/2017 | Arends | A61J 11/04 |
| 2017/0273872 | A1 | 9/2017 | Jones | |
| 2017/0296001 | A1 * | 10/2017 | Sharon | A47J 43/27 |
| 2018/0009590 | A1 | 1/2018 | Wong et al. | |
| 2020/0022877 | A1 | 1/2020 | Li et al. | |
| 2020/0237623 | A1 | 7/2020 | Rosa et al. | |
| 2020/0385184 | A1 * | 12/2020 | Stallard | B65D 51/2821 |
| 2021/0085566 | A1 * | 3/2021 | Keenan | B01F 21/15 |
| 2021/0387787 | A1 * | 12/2021 | Gonzales | A61J 1/2093 |
| 2021/0403209 | A1 * | 12/2021 | Oz | A61J 1/201 |
| 2022/0002066 | A1 * | 1/2022 | Lombard | B65D 81/3211 |
| 2022/0002067 | A1 * | 1/2022 | Lombard | B65D 81/3211 |

(56) References Cited

U.S. PATENT DOCUMENTS

| | | | | |
|---|---|---|---|---|
| 2022/0002068 | A1* | 1/2022 | Lombard | B65D 41/04 |
| 2022/0160589 | A1* | 5/2022 | Matias | A61J 11/04 |
| 2022/0218569 | A1* | 7/2022 | Gatti | A61J 11/04 |
| 2022/0388753 | A1* | 12/2022 | Jaramillo | B65D 81/3211 |
| 2023/0172810 | A1* | 6/2023 | Visconti | A61J 9/0623<br>222/143 |
| 2023/0211938 | A1* | 7/2023 | Wisdom | B01F 33/50111<br>206/219 |
| 2023/0240475 | A1* | 8/2023 | Orofino | B65D 81/3211<br>220/592.17 |
| 2023/0271766 | A1* | 8/2023 | Antico | A61J 11/008<br>215/11.1 |
| 2024/0307269 | A1* | 9/2024 | Hong | H05B 1/0269 |

* cited by examiner

BABY BOTTLE POD

CROSS REFERENCES TO RELATED APPLICATIONS

This application is related to and claims priority from one or more prior filed US patent applications. This application claims priority to and the benefit of U.S. Provisional Patent Application No. 63/314,770, filed Feb. 28, 2022. This application also claims priority to and the benefit of U.S. Provisional Patent Application No. 63/350,659, filed Jun. 9, 2022. This application also claims priority to and the benefit of U.S. Provisional Patent Application No. 63/439,227, filed Jan. 16, 2023. Each of the aforementioned patents and patent applications is incorporated herein by reference in their entirety.

BACKGROUND OF THE INVENTION

1. Field of the Invention

The present invention relates to a device for facilitating an easy and convenient baby bottle feeding, and more specifically to a baby bottle pod that functions as a baby bottle cap, formula powder container, and formula powder dispenser.

2. Description of the Prior Art

It is generally known in the prior art to provide a container to store baby formula.

Prior art patent documents include the following:

U.S. Pat. No. 4,818,114 for Shaker top for baby bottles by inventor Ghavi, filed Jun. 12, 1987 and issued Apr. 4, 1989, is directed to a device that can be attached to a baby bottle to facilitate the mixing of solid food particles into liquid. The shaker top comprises a circular-dome shaped mixing chamber with internal screwthreads on the interior wall of said chamber that are proportioned and dimensioned to accommodate the attachment of the shaker top to a baby bottle. Support wedges are formed above the internal screwthreads on the inside wall of said chamber to provide a means of internally retaining a mixing disc. Said mixing disc is comprised of a plurality of uniformly spaced arms radiating from a center post which acts as a handle to ease the insertion and removal of the disc member. The arms of the mixing disc are diamond shaped to produce a multitude of shear points which increase the cutting action during the shaking process. This design discourages the sticking of wetted food particles in small crevices, avoids the unnecessary loss of milk solids and aides in the cleaning process, outer rim of the disc member is dimensioned to snap-fit into the support wedges inside the mixing chamber. The mixing disc is positioned to accommodate the movement of the liquids and food particles from the baby bottle, through the disc member, into the mixing chamber and back into the bottle. This action will facilitate the rapid dispersion of the solids into the liquid from both sides of the mixing disc.

U.S. Pat. No. 6,769,539 for device for protecting and adding a component to a container by inventors Stern, et. al., filed Nov. 14, 2001 and issued Aug. 3, 2004, is directed to a device comprising a compartment attached to a container that keeps a first component, which may be moisture sensitive, from a second component, preferably a liquid, until a selected time before use. The compartment has improved manufacturability and decreased leakage.

U.S. Pat. No. 6,644,471 for dispensing capsule for a liquid container by inventor Anderson, filed May 24, 2002 and issued Nov. 11, 2003, is directed to a capsule that is inserted into the neck of a bottle, or within a pull-up liquid dispenser cap, said capsule being a container or receptacle for sealably containing a liquid and/or dry material and a dispenser for releasing the material when desired into the bottle through the orifice previously occupied by the first and second plugs frangibly sealed in a first position and unsealed mechanically by the consumer depressing an elongated shaft releasing the liquid and/or dry materials into the container body in second position. The present invention allows the use of materials that would discolor, degrade or interact with other substances when added to the contents of the bottle, to remain stable and/or inactive until the time of use.

U.S. Pat. No. 6,513,650 for a two-compartment container by inventors Mollstam, et. al., filed May 15, 2001 and issued Feb. 4, 2003, is directed to a two-compartment container in which the first compartment has an upper layer and a lower layer and contains a first component that is to be added to the second compartment. Above the first compartment is a dome that is bowed upward and is flexible. Attached to the dome is a cutting means. Depressing the dome by pushing downward on it lowers the cutting means so that both the upper and lower layer of the first compartment are cut by the cutting means, releasing the first component into the second compartment. The cutting means may be a simple puncturer, or in the case where the second compartment comprises a beverage container or the like, the cutting means may be part of a tubular wall surrounding the opening through which someone can drink the beverage.

U.S. Pat. No. 7,219,796 for a dispensing capsule for a liquid container by inventor Anderson, filed Nov. 3, 2003 and issued May 22, 2007, is directed to a two piece sealed capsule that is inserted into a liquid bearing container including but not limited to the neck of a bottle, said capsule being a container or receptacle for sealably containing a liquid and/or dry material and a dispenser for releasing the material when desired into the container. The top of the capsule is depressed manually forcing two or more blade like prongs against the bottom of the capsule ripping a portion away, dispensing the material. The present invention allows the use of materials that would discolor, degrade or interact with other substances when added to the contents of the bottle, to remain stable and/or inactive until the time of use.

U.S. Patent Pub. No. 2021/0403209 for a soluble food delivery system by inventor Oz, filed Jun. 28, 2021 and published Dec. 30, 2021, is directed to a package having: a housing defining a body and a container; a frangible closure which, in combination with the body, defines a soluble compartment; a frangible closure which, in combination with the container, defines a water compartment separate from the soluble compartment; a quantity of a soluble contained within the soluble compartment; and a quantity of water contained within the water compartment and which, if mixed with the soluble contained in the soluble compartment, produces an ingestible.

U.S. Pat. No. 5,419,445 for a container for storing, mixing and dispensing by inventor Kaesemeyer, filed Jun. 24, 1994 and published on May 30, 1995, is directed to a baby bottle with two separate compartments for storage of powdered baby formula and water. Water is stored in a bottle portion and baby powdered formula is stored in a cartridge assembly. The cartridge assembly consists of a housing member, a seal member, a storage cylinder and a nipple assembly. Nipple assembly is attached to the top of storage cylinder which is disposed through the top of housing member. Seal member is attached to the bottom of housing member and engages an opposing mating surface on the bottom of storage cylinder, thus providing a releasable connecting means to disconnect the seal member from the housing member by allowing the seal member to be turned by the storage cylinder. The bottom of housing member is attached to the top of bottle portion. Seal member provides an internal leakproof seal that can be released by external means at a desired time by rotating nipple assembly. As a result, storage cylinder forces seal member to detach itself from the bottom of housing member. The seal member and powdered formula both fall into water. The seal member can provide a more efficient means of mixing the water and powder together while the bottle is being shaken. Once thoroughly shaken, the liquid formula is consumed through the end of a nipple.

U.S. Pat. No. 10,301,087 for a bottle for disposable one time use substance container by inventor Giuliano, filed Mar. 22, 2016 and issued May 28, 2019, is directed to a bottle comprising: a lower section, a container for enclosing and holding a first substance, the container being located inside the bottle, a lid for closing the container, an upper section connected to the lower section and for holding a second substance above the lid, a seal located between the lid and the container to assure that the second substance contained in the upper section does not mix with the first substance of the container, and a push-release system to displace the lid to permit mixing of the first and second substances. The push-release system includes the container movably mounted in the bottle between a first position where the container does not act on the lid and a second position in which the entire container is displaced to displace the lid to permit mixing of the first and second substances.

U.S. Patent Pub. No. 2014/0246435 for a ready to feed container with drinking dispenser and sealing member, and related method by inventors Py, et al., filed Dec. 3, 2013, and published Sep. 4, 2014, is directed to container including a body defining an outflow opening and at least one chamber adapted for storing a product, such as a fat containing liquid product, and a container closure including a primary seal for hermetically sealing the product within the chamber during storage. The container closure includes a sealing member forming a substantially fluid-tight seal between the container closure and the body, and a dispensing member in fluid communication with the chamber. The container closure and body move relative to each other between a first position where the primary seal is seated about the outflow port to hermetically seal the product in the chamber during storage, and a second position where the primary seal is displaced from the outflow port to allow product to pass from the chamber through the outflow port and into dispensing member to dispense the product.

U.S. Pat. No. 11,141,022 for a container unit comprising two containers by inventors Sharon, et al., filed Sep. 30, 2015 and issued Oct. 12, 2021, is directed to a container system that allows a user to store ingredients of a formulation in separate individual containers that can be assembled easily into an extended single compartment container, thereby enabling to mix the ingredients, in a gentle shaking or swirling manner, to form the formulation prior to use.

U.S. Pat. No. 7,810,661 for a baby formula travel bottle by inventor Murphy, filed Sep. 18, 2007 and issued Oct. 12, 2010, is directed to a baby-bottle apparatus for holding dry feeding formula separate from water in the bottle prior to in-situ mixing at feeding time combines a bottle, open and threaded at both ends, a powder chamber with a sealable, removable lid, and a piston-like pusher for releasing the lid and mixing the powder and water.

U.S. Patent Pub. No. 2015/0173561 for a system for the preparation of beverages by inventor Foster, filed Jul. 9, 2013 and published Jun. 25, 2015, is directed to a system for the preparation of beverages including a beverage supply device for delivering a dose of liquid through a liquid outlet and a beverage receptacle having a base having a liquid inlet. The supply device and beverage receptacle may be joined together using a coupling interface for connecting the beverage supply device to the base of the beverage receptacle. This allows the liquid to flow into the bottle via the liquid inlet in the base of the beverage receptacle. The system may operate with capsule containing concentrated beverage and may include further accessories.

U.S. Pat. No. 11,083,327 for a method and machine for preparing infant milk formula by inventor Deleo, filed Feb. 10, 2017 and issued Aug. 10, 2021, is directed to a machine-implemented method, comprising: heat-sterilising water; cooling the sterilised water; removably receiving a capsule containing powdered infant milk formula in a capsule chamber; injecting the cooled, sterilised water into the capsule chamber and through the capsule to form liquid infant milk formula; steam-sterilising the capsule chamber after removal of the capsule.

U.S. Patent Pub. No. 2013/0224344 for a baby bottle preparation by inventor Mathieu, filed Apr. 1, 2013 and published Aug. 29, 2013, is directed to a method of filling a baby bottle which comprises providing a baby bottle containing a hermetically sealed bottle liner, which contains a measured amount of powdered infant formula. The bottle liner comprises a lip retainer for preventing the bottle liner from falling into the bottle. The hermetic seal on the bottle liner may be opened. The method includes disposing filtered, heated water into the liner to mix with the powdered infant formula. A cap and nipple assembly is applied to the bottle.

U.S. Pat. No. 9,814,345 for a baby formula preparation with warming system and customized pods by inventors Kutcher, et. al., filed Nov. 8, 2016 and issued Nov. 14, 2017, is directed to a technique for preparing baby formula includes containing an amount of powdered formula, premeasured to provide a single serving of baby formula, containing an amount of water, premeasured to provide at least a single serving of baby formula, heating the water, and dispensing both the premeasured formula and the water for providing a single serving into a bottle or other vessel when the water reaches a predetermined temperature.

U.S. Pat. No. 10,070,751 for a capsule, beverage production machine and system for the preparation of nutritional product by inventors Magniet, et. al., filed Oct. 7, 2016 and issued Sep. 11, 2018, is directed to a capsule having an inlet face C formed by a circular section and a bulge section extending from the circular section so that the inlet face C is not symmetric in rotation. The capsule further has an optically readable code on a side wall of a cup-shaped body of the capsule opposite the bulge section. A beverage production machine has a capsule holder for holding the capsule in the beverage production machine so that the optically readable code can be read by a code reader. Liquid can be supplied to the capsule to produce a nutritional product. The optically readable code and the code reader can be prevented from being contaminated with liquid, vapor, dirt or the like. The beverage production machine can perform an automatic detection of the capsule type and a corresponding automatic setting of preparation parameters.

U.S. Pat. No. 9,565,967 for a portioned system for preparing a nutritional product by inventors Manser, et. al., filed Oct. 7, 2010 and issued Feb. 14, 2017, is directed to a portioned system for preparing a nutritional liquid product comprising a liquid supply device and a container containing nutritional ingredients; said container having an opening, the system further comprising a liquid injection interface for supplying an amount of liquid in the container thereby providing the nutritional liquid product, wherein the liquid injection interface comprises a liquid inlet and a product outlet for removing the nutritional liquid product from the container wherein the liquid injection interface comprises a wall extending transversally relative to the opening of the container during the operation of the system; said transversal wall comprising the liquid inlet and the product outlet which are transversally distant one another along the said wall.

U.S. Pat. No. 10,919,690 for a capsule having a membrane and method for preparing a nutritional product by inventors Dogan, et. al., filed Mar. 30, 2016 and issued Feb. 16, 2021, is directed to a capsule for preparing a nutritional product in a device adapted to supply liquid into the capsule. The capsule includes at least one compartment for providing nutritional ingredients for the preparation of the nutritional product in combination with the supplied liquid, and the compartment includes a liquid impermeable membrane forming a release side of the compartment. The capsule further includes at least one relief element. Also disclosed is a membrane for use in the manufacture of said capsule. Also disclosed are methods of producing and using the membrane and capsule.

U.S. Pat. No. 9,227,777 for a capsule containing nutritional ingredients and method of delivery of a nutritional liquid from the capsule by inventors Steven, et. al., filed Jan. 8, 2009 and issued Jan. 5, 2016, is directed to a capsule for use in a beverage production device, the capsule containing ingredients for producing a nutritional liquid when a liquid is fed into the capsule at an inlet face thereof, the capsule furthermore containing heat sensitive bioactive ingredients such as probiotic microorganisms which are physically separated from the other nutritional ingredients in the capsule.

U.S. Pat. No. 9,050,242 for an infant bottle with formula dispensing means by inventors Mooney, et. al., filed Nov. 10, 2011 and issued Jun. 9, 2015, is directed to an infant bottle cap providing a means for storing powdered infant formula which is then installed upon a conventional baby bottle. The device comprises a cap attachment which attaches to the bottle and an internal cavity which separates the nipple from the powdered formula. The cap attachment is hollow, allowing for the storage of formula inside said cap. The top surface of the cap further comprises a hinged and latching lid for filling the cap with powdered formula and pouring the formula into water within the bottle when ready for use.

U.S. Patent Pub. No. 2013/0126461 for a baby bottle-like, single-use disposable container by inventor Brown, filed Nov. 17, 2010 and published May 23, 2013, is directed to a baby bottle-like, single-use disposable container comprising a vessel and an upper element (teat, measuring element or bowl) with a hermetically closed capsule attached to the outside of the vessel, either by a string or by an adhesive element, or housed in the base of the baby bottle, the entire assembly being protected by a sealing wrap.

U.S. Pat. No. 9,289,356 for a storage and mixing container by inventors Farber, et. al., filed Mar. 15, 2013 and issued Mar. 22, 2016, is directed to a beverage container for separately storing a liquid apart from an additive until mixing. The beverage container has a vessel for retaining the liquid and a compartment for retaining the additive. The vessel has an open base at an end and a release valve is connected to another end. A base coupler is connected to the open base. The compartment has a connector at each of an open end and an opposing closed end of the compartment. Connecting the closed end and the open end of the compartment to the base coupler selectively separates and mixes the liquid and the additive, respectively. The beverage container has a closure for sealing the open end of the compartment when the liquid and additive are separated. A method for separating storing and mixing a liquid and additive is also provided. A kit assembly for a beverage container is also provided.

U.S. Patent Pub. No. 2005/0284498 for a package including an overcap having an integral compartment for a secondary product by inventor Demarest, filed Jun. 29, 2004 and published Dec. 29, 2005, is directed to a package including a container with a dispensing actuator for carrying and dispensing a primary product also including an overcap for carrying a secondary product. The overcap includes a primary cap having an upper chamber and a lower chamber. The lower chamber is adapted to releasably attach to the container and cover the dispensing actuator. The upper chamber is adapted to contain the secondary product. The overcap also includes a secondary cap for covering the upper chamber and the secondary product.

US Patent Publication No. 2021/0085566 for Formula and powder mixing assembly by inventor Keenan, filed Sep. 12, 2020 and published Mar. 25, 2021 is directed to a baby bottle formula mixing and feeding assembly designed to be coupled to a standard baby feeding bottle or powder mixing bottle. The formula mixing assembly is designed to include at least four main components: a bottom housing, a cylindrical gate body, a top housing and a cylindrical pliable cup body disposed within the top/bottom housing. A locking mechanism is included that unlocks the top housing and the gate body containing the pliable cup body and the formula, such that the apertures in the gate body align with the apertures in the bottom housing to when the top housing is rotated so as to empty the formula contents into the bottle with the liquid.

US Patent Publication No. 2020/0385184 for Infant formula preparation apparatus by inventor Stallard, filed Apr. 7, 2020 and published Dec. 10, 2020 is directed to an assembly for dispensing a substance into a receptacle, the assembly comprising: a) a first portion connected to an opening of the receptacle; b) a chamber for containing the substance, the chamber being at least partly located within the first portion; c) a seal located below the chamber, the seal retaining the substance in the chamber; d) a removable stop member; and wherein removal of the stop member enables the chamber to be moved downwardly to cause the seal to open and release the substance into the receptacle.

US Patent Publication No. 2020/0237623 for Powdered infant formula measuring and mixing pod and baby bottle assembly by inventors Rosa, et al., filed Jan. 26, 2019 and published Jul. 30, 2020 is directed to an apparatus for use with baby bottles, a baby bottle assembly, and a method of preparing liquid infant formula for feeding to a baby are disclosed. A measuring and mixing pod allows the appropriate amount of powdered infant formula to be measured out in advance and stored within the baby bottle from which it is to be served. The same bottle may be filled with water or other liquid while keeping the powdered formula dry. Further, a simple and quick method is provided for mixing the powdered formula with the liquid stored in the bottle when it is time to feed the baby.

US Patent Publication No. 2020/0022877 for Infant bottle and warming cover by inventors Li, et al., filed Oct. 1, 2019 and published Jan. 23, 2020 is directed to an infant bottle.

The infant bottle comprises an open-top receptacle for receiving liquid, a nipple sealably connectable to the open-top end of the receptacle, a formula compartment disposed adjacent the open-top end of the receptacle, an open-top end of the formula compartment corresponding and fitted within the open-top end of the receptacle, and a formula release mechanism to empty the contents contained in the formula compartment into the receptacle. A removable warming cover substantially covering at least a portion of the outer surface of the receptacle and comprising a sleeve of material for receiving the receptacle, a base comprising a rechargeable battery, and a heating element operatively connected to the battery, is also provided. A method of using the same is also provided.

US Patent Publication No. 2018/0009590 for Portable feeding bottle by inventors Wong, et al., filed Feb. 21, 2017 and published Jan. 11, 2018 is directed to a portable container, which contains a lower container body for storing a liquid, and an upper container body detachably connected to the lower container body. The upper container body adapted to store solid substance. The upper container body further contains a user-configurable opening device which is switchable between a first state and a second state. In the first state the opening device prevents the solid substance in the upper container body from falling into the lower container body. In the second state the opening device allows the solid substance to fall into the lower container body in order to mix with the liquid. The portable container not only separates the milk powder and warm water before brewing, but it also maintains the water at an appropriate temperature and to maintain the dryness of the milk powder. The warm water and the milk powder can then be mixed at any time to brew the milk suitable for drinking.

US Patent Publication No. 2017/0273872 for Baby formula consumption bottle by inventor Jones, filed Mar. 25, 2016 and published Sep. 28, 2017 is directed to a bottle for baby formula that includes: a main liquid portion; a formula portion attached to the liquid portion, where the formula portion includes an infant formula for consumption and is adapted for removal; an attachment means that provides a means to attach the formula portion to the liquid portion of the bottle; a nipple; and a removable cap, where the removable cap covers the nipple. Preferably, the attachment means is a threaded connection and the liquid portion includes a curved outer surface. The infant formula may be a premixed powder mixable with water.

US Patent Publication No. 2012/0292314 for Containers for storing materials that can be selectively mixed or dispensed by inventors Tyroler, et al., filed May 18, 2011 and published Nov. 22, 2012 is directed to a composite container including two containers that are axially aligned in movable toward each other to close a hole between the containers or away from each other to open the hole. When the hole is opened liquids, powder or other appropriate material in the containers can be mixed or intermingled ending up in either container or in both containers.

US Patent Publication No. 2010/0213156 for Apparatus and method for mixing infant formula by inventor Belnap, filed Feb. 25, 2010 and published Aug. 26, 2010 is directed to an apparatus and method for storing, mixing, and delivering a powder solid and a fluid such as baby formula and water without the risk of product contamination or product expulsion to the surrounding environment. The apparatus is used by placing the powder formula into a specially designed compartment, joining the compartment with another compartment configured to store a liquid, filling the second compartment with a liquid, and sealing the system together. Once mixing and activation is completed, the two compartments are twisted in relation to one another, and the two separate substances are now allowed to flow freely and mix. The product can now be served to the child.

US Patent Publication No. 2010/0213085 for Apparatus, system, and method for selectively mixing two substances by inventor Belnap, filed Feb. 25, 2010 and published Aug. 26, 2010 is directed to an apparatus and method for storing, mixing, and delivering a powder solid and a fluid such as baby formula and water without the risk of product contamination or of the product expiring. The apparatus includes a first compartment, a second compartment, a passage in a bottom of the first compartment, and a seal that seals the passage in the bottom of the first compartment. Communication between the first compartment and the second compartment is achieved by longitudinally displacing the second compartment with respect to the first compartment. The longitudinal displacement of the second compartment causes the second compartment to be withdrawn from the first compartment. The seal is attached to the top of the second compartment such that the displacement of the second compartment with respect to the first compartment causes the seal to be displaced from the passage.

U.S. Pat. No. 9,580,227 for Baby bottle by inventor Wood, filed Nov. 4, 2014 and issued Feb. 28, 2017 is directed to a baby bottle for feeding an infant is adapted to store baby formula powder in a nipple cavity separated from fluid in the bottle by a seal plate. The seal plate is dislodged by manual pressure applied to at least one seal plate release button integrated into a collar of the baby bottle, to permit the formula powder to mix with the fluid when the bottle is to be used for feeding.

U.S. Pat. No. 9,566,214 for Portable system of preserving and instantly mixing baby formula by inventors Eitrheim, et al., filed Oct. 17, 2012 and issued Feb. 14, 2017 is directed to a reusable, portable attachment for coupling in between a baby bottle top and a baby bottle container that comprises a container compartment for storing powdered formula separately from water prior to feeding, a hollow compartment, a removable seal therebetween, and a release actuator for releasing the seal to mix the powdered formula and water.

U.S. Pat. No. 9,254,244 for Illuminating baby bottle with removable container by inventors Perera, et al., filed Jun. 19, 2014 and issued Feb. 9, 2016 is directed to an illuminating baby bottle with a removable container includes a first container, a second container, a release mechanism, a connecting member, a liquid-flowing system, a bottle cap, and a lighting device. The first container and the second container are axially attached to each other through the connecting member while the release mechanism is concentrically positioned in between the first container and the connecting member. The release mechanism selectively rotates in between a locked position and an unlocked position in such a way that the locked position separately stores baby formula and water while the unlocked position allows the mixing of baby formula and water. The liquid-flowing system releases baby formula mixture from the first container so that infants or young children can be fed with the baby formula mixture. The lighting device is positioned on the bottle cap and can selectively operate in between an on-position and an off-position.

U.S. Pat. No. 9,107,803 for Container with storage chambers by inventor Vaught, filed Feb. 5, 2013 and issued Aug. 18, 2015 is directed to a container having at least two separate chambers that allow for the storage of two components of a liquid product to be stored, and later mixed, for consumption wherein the storing or mixing takes place within the container and is allowed by placement of a formula chamber disposed at various positions with the container.

U.S. Pat. No. 9,016,488 for Compartmentalized mixing bottle and associated use therefore by inventor Peres, filed Feb. 22, 2012 and issued Apr. 28, 2015 is directed to a compartmentalized mixing bottle for storing and selectively introducing a soluble mix to a predetermined quantity of fluid is disclosed. Such a compartmentalized mixing bottle preferably includes a primary compartment having a plurality of primary conduits, a secondary compartment having a secondary conduit and spaced apart from the primary compartment. The compartmentalized mixing bottle further includes a mechanism for selectively isolating the primary compartment from the secondary compartment. Such a selectively isolating mechanism is in continuous fluid communication with the secondary conduit and is removably engaged with the primary and secondary compartments respectively. In this manner, bi-directional rotation (clockwise and counter clockwise) of at least a portion of the selectively isolating mechanism, relative to the primary compartment, isolates and fluidly communicates the primary compartment with the secondary compartment, respectively.

U.S. Pat. No. 8,887,904 for Feeding nipple container by inventor Gutierrez, filed Mar. 15, 2013 and issued Nov. 18, 2014 is directed to a container for storing and dispensing a substance including a deformable nipple having an open end, a feeding tip and a storage cavity; a lid adapted to releasably engage the open end of the nipple; and a (optionally) a tether having resilient properties, the tether connecting the nipple to the lid; wherein, in a storage position the substance, when placed within the storage cavity of the nipple, is contained; wherein in a mixing position, the substance is released from the storage cavity of the nipple; and wherein the container transitions from the storage position to the mixing position upon application of an external force to the nipple, causing the nipple to deform and the lid to disengage the open end of the nipple.

U.S. Pat. No. 8,820,549 for Multi-chamber nursing bottle having frangible portion for separately storing liquids and other substances by inventor Estrada, filed Nov. 17, 2011 and issued Sep. 2, 2014 is directed to a multi-chamber beverage container. The container includes an insert having an opening. The insert also includes a first chamber containing a first set of contents and a second chamber containing a second set of contents. The first and second chambers are separated by a frangible seal. The frangible seal is ruptured to mix the first set of contents with the second set of contents in an interior of the insert. In one embodiment, the container includes a container shell to house the insert. The insert may also include a cap that accommodates a nipple assembly.

U.S. Pat. No. 8,757,451 for Powder measuring and dispensing apparatus by inventor Schroedter, filed Apr. 19, 2013 and issued Jun. 24, 2014 is directed to a powder dispensing apparatus for storing and dispensing a measured predetermined amount of powder substance having a bottom housing chamber, a middle chamber, a removable, rotatable measuring device, a tapered top chamber, and a cap. The top end of the bottom housing chamber is engageable with the bottom end of the middle chamber, the top end of the middle chamber is engageable with the bottom end of the tapered top chamber, and the top end of the tapered top chamber is engageable with the cap or a liquid receptacle. The measuring device is slidably engageable with the internal chamber of the middle chamber and has an open cavity for measuring and dispensing a powder substance. The open cavity receives a measured predetermined amount of powder substance from the bottom housing chamber and upon rotation of the measuring device; the powder substance is dispensed from the open cavity through the tapered top chamber to a liquid receptacle. The measuring device has a locking tooth and spring mechanism which engages with the locking ring of the middle chamber.

U.S. Pat. No. 8,636,158 for Dual chamber nursing bottle by inventor Frisch, filed Jun. 4, 2007 and issued Jan. 28, 2014 is directed to a dual chamber nursing bottle includes a first, relatively larger, storage chamber and a second, relatively smaller feeding chamber. A soft rubber nursing nipple is connected to the second chamber for feeding an infant. The first and second chambers are connected by a threaded closure. A transfer valve is mounted on the threaded closure to allow the transfer of selected quantities of milk from the first chamber into the second chamber.

U.S. Pat. No. 8,573,421 for Dispenser with plural product chambers for separate storage and intermixing of products prior to use, and related method by inventors Py, et al., filed Oct. 27, 2008 and issued Nov. 5, 2013 is directed to a container including a body defining an outflow opening and at least one chamber adapted for storing a product, such as a fat containing liquid product, and a container closure including a primary seal for hermetically sealing the product within the chamber during storage. The container closure includes a sealing member forming a substantially fluid-tight seal between the container closure and the body, and a dispensing member in fluid communication with the chamber. The container closure and body move relative to each other between a first position where the primary seal is seated about the outflow port to hermetically seal the product in the chamber during storage, and a second position where the primary seal is displaced from the outflow port to allow product to pass from the chamber through the outflow port and into dispensing member to dispense the product.

U.S. Pat. No. 8,556,094 for Baby bottle having compartmented closure for selectively mixing and dispensing baby formula by inventors Brown, et al., filed Apr. 13, 2012 and issued Oct. 15, 2013 is directed to a baby formula delivery assembly includes a container that has a bottom wall, a top wall, and a perimeter wall extending between the top and bottom walls. A housing has an upper wall and a peripheral wall that is attached to and extends downwardly from the upper wall. The peripheral wall extends downwardly around the container adjacent to the top wall and is rotatably and non-removably coupled to the container. A lower wall is attached to the peripheral and is spaced from the upper wall and defines an interior space of the housing. The lower wall has a second powder aperture extending therethrough. A nipple is attached to the upper wall and is in fluid communication with the interior space of the housing. A quantity of water is positioned within the container. A quantity of baby formula is positioned within the housing.

U.S. Pat. No. 8,459,450 for Formula bottle by inventors Whitaker, et al., filed Sep. 22, 2011 and issued Jun. 11, 2013 is directed to a formula bottle includes two separate sealed chambers, a liquid chamber and a formula chamber. A first seal seals the two chambers from one another and a second seal seals the formula chamber from the nipple on the formula bottle. Rotation of the liquid chamber counterclockwise opens the seal between it and the formula chamber, allowing the formula powder and the liquid to mix. Shaking of the bottle causes the two components to mix completely. In order for the mixed formula to be dispensed to a feeding infant, a bottle collar, which secures the nipple to the formula bottle, is rotated counterclockwise to open the second seal to allow an infant to feed.

U.S. Pat. No. 8,439,231 for Powder measuring and dispensing apparatus by inventor Schroedter, filed Apr. 21, 2011 and issued May 14, 2013 is directed to a powder dispensing apparatus for storing and dispensing a measured predetermined amount of powder substance having a bottom housing chamber, a middle chamber, a removable, rotatable measuring device, a tapered top chamber, and a cap. The top end of the bottom housing chamber is engageable with the bottom end of the middle chamber, the top end of the middle chamber is engageable with the bottom end of the tapered top chamber, and the top end of the tapered top chamber is engageable with the cap or a liquid receptacle. The measuring device is slidably engageable with the internal chamber of the middle chamber and has an open cavity for measuring and dispensing a powder substance. The open cavity receives a measured predetermined amount of powder substance from the bottom housing chamber and upon rotation of the measuring device; the powder substance is dispensed from the open cavity through the tapered top chamber to a liquid receptacle. The measuring device has a locking tooth and spring mechanism which engages with the locking ring of the middle chamber.

U.S. Pat. No. 8,371,440 for Storage and mixing bottle by inventors Questad, et al., filed May 29, 2012 and issued Feb. 12, 2013 is directed to a multi-functional bottle contains two separate compartments, a first compartment for water or liquid storage, and a second compartment or holding chamber, for storage of a powdered formula. The holding chamber is comprised of both flexible, and rigid food-grade polymers. The holding chamber has a closed bottom-end, forming the bottle's base, and an open, re-sealable top-end for addition of the powdered formula, and for release of the powdered formula for mixing when so desired. Re-sealable top-end forms an airtight seal with an agitator cap. The agitator cap can easily be released by firmly pressing (depressing) the bottom-end of the holding chamber (and bottle), allowing the user to now mix the powdered formula with the water with a single hand.

U.S. Pat. No. 8,292,099 for Compartmentalized baby bottle by inventor Wahlstrom, filed Dec. 10, 2008 and issued Oct. 23, 2012 is directed to a dual chambered baby bottle has a threaded nipple top; a plastic cover for the threaded nipple top; an upper chamber in fluid communication with the interior of the nipple top; a lower chamber; an upper seal forming a lower portion of the upper chamber; a lower seal adjacent the upper seal, the lower seal forming an upper portion of the lower chamber; a plurality of upper seal apertures in the upper seal; and a plurality of lower seal apertures in the lower seal, the upper seal apertures and the lower seal apertures rotatable between an open position with the upper and lower seal apertures aligned and a closed position with the upper and lower seal apertures nonaligned.

U.S. Pat. No. 8,251,235 for Liquid nutrition product dispenser with plural product chambers for separate storage and intermixing prior to use, and related method by inventors Py, et al., filed Oct. 27, 2008 and issued Aug. 28, 2012 is directed to a container including a body defining an outflow opening and at least one chamber adapted for storing a product, such as a fat containing liquid product, and a container closure including a primary seal for hermetically sealing the product within the chamber during storage. The container closure includes a sealing member forming a substantially fluid-tight seal between the container closure and the body, and a dispensing member in fluid communication with the chamber. The container closure and body move relative to each other between a first position where the primary seal is seated about the outflow port to hermetically seal the product in the chamber during storage, and a second position where the primary seal is displaced from the outflow port to allow product to pass from the chamber through the outflow port and into dispensing member to dispense the product.

U.S. Pat. No. 8,146,758 for Compartmentalized baby bottle and associated method by inventor Peres, filed Mar. 6, 2009 and issued Apr. 3, 2012 is directed to a compartmentalized baby bottle includes main and secondary interior compartments for housing and selectively introducing a soluble mix to a fluid, as needed by the caregiver. A plurality of conduits are formed along a bottom-most end of the main interior compartments for allowing the soluble mix to pass therethrough. A conduit-sealing mechanism is provided such that a care giver is permitted to selectively combine the mix and fluid together without prematurely exposing the mix. Advantageously, the conduit-sealing is selectively biased between open and closed positions for preventing the fluid and mix from undesirably mixing together until the care giver is ready to do same.

U.S. Pat. No. 7,225,938 for Dual chamber nursing bottle by inventor Frisch, filed Dec. 11, 2003 and issued Jun. 5, 2007 is directed to a dual chamber nursing bottle includes a first chamber, a second chamber, a closure which defines the second chamber, and a valve member which communicates between the first and second chambers to control the flow of fluid from the first chamber to the second chamber and then feed an infant using the nursing nipple which is mounted on the first chamber.

U.S. Pat. No. 10,556,736 for Baby bottle with joinable dry goods section and liquid section by inventor Guevara, filed Dec. 12, 2017 and issued Feb. 11, 2020 is directed to a baby bottle with a liquid compartment and a separate dry goods compartment is described. The dry goods compartment and the liquid compartment may be removably sealable from each other by rotating a lower-annular-member with respect to an upper-annular-member; wherein these two annular-members may be disposed between a bottle-main-body and a nipple-member. Each of these two annular-members may have its own respective opening and shelf-portion and may be rotated with respect to each other from an open-configuration to a closed-configuration. In the closed-configuration, dry goods, such as dry baby formula, may be temporarily stored within the dry goods compartment, in a substantially dry condition, separated from a liquid within the liquid compartment. When desired these two annular-members may be rotated into the open-configuration, to allow the dry goods to substantially fall into the liquid compartment, to facilitate mixing with the liquid in the liquid compartment.

U.S. Pat. No. 10,463,576 for Infant bottle and warming cover by inventors Liang, et al., filed Dec. 15, 2015 and issued Nov. 5, 2019 is directed to an infant bottle is provided. The infant bottle comprises an open-top receptacle for receiving liquid, a nipple sealably connectable to the open-top end of the receptacle, a formula compartment disposed adjacent the open-top end of the receptacle, an open-top end of the formula compartment corresponding and fitted within the open-top end of the receptacle, and a formula release mechanism to empty the contents contained in the formula compartment into the receptacle. A removable warming cover substantially covering at least a portion of the outer surface of the receptacle and comprising a sleeve of material for receiving the receptacle, a base comprising a rechargeable battery, and a heating element operatively connected to the battery, is also provided. A method of using the same is also provided.

SUMMARY OF THE INVENTION

The present invention relates to a pod for storing baby powdered formula, dispensing baby powdered formula, and functioning as a cap to a baby bottle.

It is an object of this invention to provide an apparatus compatible with conventional baby bottles and operable as a cap to the baby bottle, container of powdered formula, and a dispenser of powdered formula. It is another object of this invention to ease and simplify the baby feeding process through the addition of features not found in the prior art.

In one embodiment, the present invention is directed to a device for storing a solute including a first storage compartment, a second storage compartment, and a plug, wherein an upper portion of the second storage compartment is connected to a lower portion of the first storage compartment, wherein a lower portion of the second storage compartment is configured to removably attach to an upper portion of a liquid container, wherein the plug is configured to close and/or seal the first storage compartment by frictionally engaging an orifice defined in an upper portion of the first storage compartment, wherein the first storage compartment is configured to store a solute, wherein the second storage compartment is configured to house a baby bottle nipple extending upwardly from the upper portion of the liquid container, wherein the plug includes a ring and/or an umbrella lip, and wherein the second storage compartment is attached to the upper portion of the liquid container.

In another embodiment, the present invention is directed to a device for preparing a baby bottle including a powdered formula storage compartment, a baby bottle nipple compartment, and a ring plug, wherein an upper portion of the baby bottle nipple compartment is connected to a lower portion of the powdered formula storage compartment, wherein a lower portion of the baby bottle nipple compartment is configured to removably attach to an upper portion of a baby bottle, wherein the ring plug is configured to close and/or seal the powdered formula storage compartment by frictionally engaging an orifice of an upper portion of the powdered formula storage compartment, wherein the powdered formula storage compartment is configured to store powdered formula, wherein the baby bottle nipple compartment includes a nipple housing protrusion extending downwardly from a bottom surface of the baby bottle nipple compartment and configured to compress and erect the baby bottle nipple, and wherein the ring plug includes an umbrella lip.

In yet another embodiment, the present invention is directed to a system for storing a solute includes a first storage compartment, a second storage compartment, a liquid container, and a plug, wherein an upper portion of the second storage compartment is connected to a lower portion of the first storage compartment, wherein a lower portion of the second storage compartment is configured to removably attach to an upper portion of the liquid container, wherein the plug is configured to close and/or seal the first storage compartment by frictionally engaging an orifice defined in an upper portion of the first storage compartment, wherein the first storage compartment is configured to store a solute, wherein the second storage compartment is configured to house a baby bottle nipple extending upwardly from the upper portion of the liquid container, where the plug includes a ring and/or an umbrella lip, and wherein the second storage compartment is operable to compress the baby bottle nipple when the second storage compartment is attached to the upper portion of the liquid container.

These and other aspects of the present invention will become apparent to those skilled in the art after a reading of the following description of the preferred embodiment when considered with the drawings, as they support the claimed invention.

DETAILED DESCRIPTION

Figure 1:
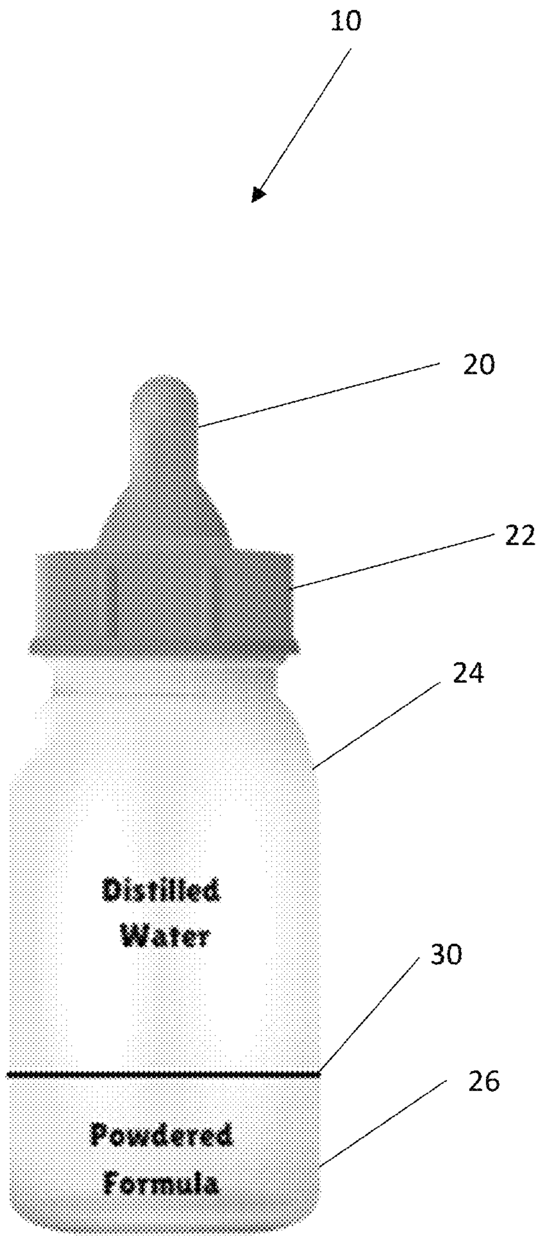
FIG. 1 illustrates a side view of a bottle according to one embodiment of the present invention.

The present invention is generally directed to an attachment for baby bottles, powdered formula containers, and baby bottles for feeding an infant.

In one embodiment, the present invention is directed to a device for storing a solute including a first storage compartment, a second storage compartment, and a plug, wherein an upper portion of the second storage compartment is connected to a lower portion of the first storage compartment, wherein a lower portion of the second storage compartment is configured to removably attach to an upper portion of a liquid container, wherein the plug is configured to close and/or seal the first storage compartment by frictionally engaging an orifice defined in an upper portion of the first storage compartment, wherein the first storage compartment is configured to store a solute, wherein the second storage compartment is configured to house a baby bottle nipple extending upwardly from the upper portion of the liquid container, wherein the plug includes a ring and/or an umbrella lip, and wherein the second storage compartment is attached to the upper portion of the liquid container.

In another embodiment, the present invention is directed to a device for preparing a baby bottle including a powdered formula storage compartment, a baby bottle nipple compartment, and a ring plug, wherein an upper portion of the baby bottle nipple compartment is connected to a lower portion of the powdered formula storage compartment, wherein a lower portion of the baby bottle nipple compartment is configured to removably attach to an upper portion of a baby bottle, wherein the ring plug is configured to close and/or seal the powdered formula storage compartment by frictionally engaging an orifice of an upper portion of the powdered formula storage compartment, wherein the powdered formula storage compartment is configured to store powdered formula, wherein the baby bottle nipple compartment includes a nipple housing protrusion extending downwardly from a bottom surface of the baby bottle nipple compartment and configured to compress and erect the baby bottle nipple, and wherein the ring plug includes an umbrella lip.

In yet another embodiment, the present invention is directed to a system for storing a solute includes a first storage compartment, a second storage compartment, a liquid container, and a plug, wherein an upper portion of the second storage compartment is connected to a lower portion of the first storage compartment, wherein a lower portion of the second storage compartment is configured to removably attach to an upper portion of the liquid container, wherein the plug is configured to close and/or seal the first storage compartment by frictionally engaging an orifice defined in an upper portion of the first storage compartment, wherein the first storage compartment is configured to store a solute, wherein the second storage compartment is configured to house a baby bottle nipple extending upwardly from the upper portion of the liquid container, where the plug includes a ring and/or an umbrella lip, and wherein the second storage compartment is operable to compress the baby bottle nipple when the second storage compartment is attached to the upper portion of the liquid container.

None of the prior art discloses a powdered formula container operable to function as a cap, storage container, and dispenser with a plunger seal ring top and a nip housing bottom. Additionally, none of the prior art discloses a cartridge system that allows a user to prefill and pack multiple cartridges with feeding powder and use cartridges in a single bottle along with an easy-to-use twist and mix design allowing for easy mixing of the formula ingredients. Advantageously, this allows for a user to pack fewer supplies than with prior art apparatuses that require a separate bottle to be packed for each meal the baby needs to be fed.

Instead, the cartridge system only requires one receptacle to be packed that is compatible with multiple prefilled cartridges.

Some animals come into this world more self-sufficient than others. As an example, baby sea turtles are born with the ability to dig their way to the beach's surface and run a gauntlet of dangers on their way to the seashore. Additionally, giraffes survive a two-meter fall upon their birth and are still able to stand, feed, and walk within hours of leaving the womb. In contrast, the human baby is absolutely helpless when they are born, so much so that human babies cannot even lift their own heads without assistance for the first two months of life.

The intense care required by human babies has created a large market for products that aid and ease the child caring process. Among the most prominent and care intense stages of a child's development is their first year of age. During a child's first year of age, they require liquid foods in the form of a mother's breast milk or baby formula. While breastfeeding is the traditional method of feeding, bottle feeding is a convenient alternative and even sometimes required for women who cannot breastfeed.

As a result, the baby bottle industry is massive and increasing yearly. The baby bottle industry had an estimated market size of 3.29 billion dollars in 2021. This is further explained by the desire to aid and ease the child feeding process due to the straining task of balancing parenthood with daily life. Additionally, there is another level of complexity introduced by formula feeding in that powdered formula needs to be measured precisely and mixed carefully with warm water. These complications are due to the fact that babies require a precise nutritional diet and improper preparation sometimes causes the proteins and fats in the baby formula to separate or the powder to clump. Therefore, baby powder formula must be stored separately from the liquid to which it is mixed, which requires parents and caregivers to carry containers to store both the powdered formula and the liquid.

Furthermore, convenience is highly valued in the baby bottle industry and caregiver market. Convenience is highly valued because of the time-consuming nature of caring for babies. As a result, any product that eases, simplifies, or reduces the complexity of child care is heavily sought after, so much so, that a product that even reduce the number of separate components or simplifies the travel aspect of a product is of great value to caregivers.

Factors that increase the convenience of child care include: products that reduce the number of separate parts; products that are small in size or compressible; products that are able to be handled with a single hand; and products that are able to be prepared quickly and easily. Therefore, there is a need to address these factors and further refine the convenience of baby bottle feeding.

Formula Mixing and Feeding Assembly Reloadable by Cartridge

In the present disclosure, the term open refers to the state of the bottle when fluids and solids smaller than the at least one hole in the divider are operable to pass freely between the two body portions. The term closed refers to the state of the bottle when fluids and solids smaller than the at least one slot in the divider are not operable to pass freely between the two body portions. The term divider is operable to include both the upper divider and a lower divider in certain embodiment or just a single layer divider operable to open and close in other embodiments.

Referring now to the drawings in general, the illustrations are for the purpose of describing one or more preferred embodiments of the invention and are not intended to limit the invention thereto.

FIG. 1 illustrates a front view of one embodiment of a baby bottle with easy mix access. The bottle 10 includes an upper body portion 24, a lower body portion 26, a threaded nipple collar 22, a nipple 20, and a divider 30. In one embodiment, the divider 30 is operable to be mechanically adjusted from an open position to a closed position to allow or prevent substances from the upper body portion 24 and lower body portion 26 from being exchanged between these portions. In one embodiment the divider is operable to be moved between an open and a closed position by twisting/rotating the upper body portion 24 with respect to the lower body portion 26, or vice versa. In one embodiment, the divider implements an iris diaphragm for the opening and closing mechanism of the divider to allow substances held in the upper body portion 24 and the lower body portion 26 to mix or be separated based on the position, as shown in FIG. 2. Details regarding fully closing iris diagrams are operable to be found in U.S. Pat. No. 3,836,234 which is incorporated herein by reference in its entirety.

Preferably, the fully closing iris mechanism creates a watertight and/or airtight barrier between the upper body portion 24 and the lower body portion 26 when in a fully closed position to prevent a liquid operable to be contained in the upper body portion 24 from moving into the lower body portion 26. In one embodiment, this characteristic is operable to be achieved by applying a coating to the blades of the iris mechanism and/or forming the blades from hydrophobic materials, such as polyvinylchloride, poly(methyl methacrylate) (PMMA), high-density polyethylene (HDPE), polyvinylidene fluoride, and/or carbon nanotubes. Alternatively or additionally, the iris mechanism is doubled and stacked one atop the other to further prevent liquid held in the upper body portion 24 from entering the lower body potion 26.

Figure 2A:
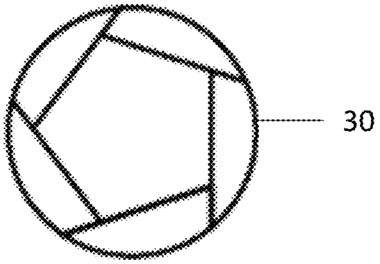
FIG. 2A illustrates a top view of a divider in an open position according to one embodiment of the present invention.
Figure 2B:
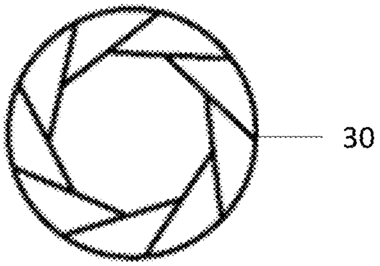
FIG. 2B illustrates a top view of a divider in a semi-open position according to one embodiment of the present invention.
Figure 2C:
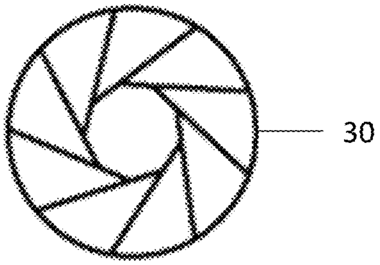
FIG. 2C illustrates a top view of a divider in a semi-closed position according to one embodiment of the present invention.
Figure 2D:
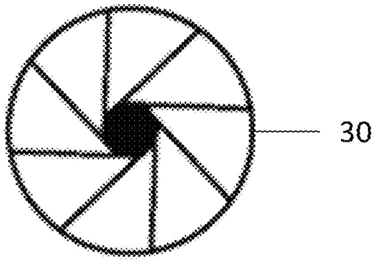
FIG. 2D illustrates a top view of a divider in a closed position according to one embodiment of the present invention.

FIGS. 2A-D illustrate multiple phases of an iris diaphragm opening and closing. FIG. 2A illustrates the iris diaphragm acting as the divider 30 in a fully open position. While the iris diaphragm is in this fully open position, substances held in the upper body portion 24 of the bottle freely flow downward and enter the bottom body portion. FIG. 2B and FIG. 2C illustrate phases wherein the iris diaphragm is in the process of closing. In such states. the iris blades of the iris mechanism pivot outward, overlapping to cover the area of the opening in the iris mechanism. FIG. 2D illustrates the fully closed position of the iris diaphragm. In this position, the hole in the center of the mechanism is completely covered by the blades of the diaphragm, preventing substances held in the upper body portion 24 from entering the lower body portion 26.

The iris diaphragm is operable to be manipulated by twisting the upper body portion 24 and/or the lower body portion 26 of the bottle. The iris mechanism is operable to transfer this rotational energy supplied by the twisting of the body portion with which it is connected into energy to pivot the flaps of the iris diaphragm into the open position or the closed position.

Figure 3A:
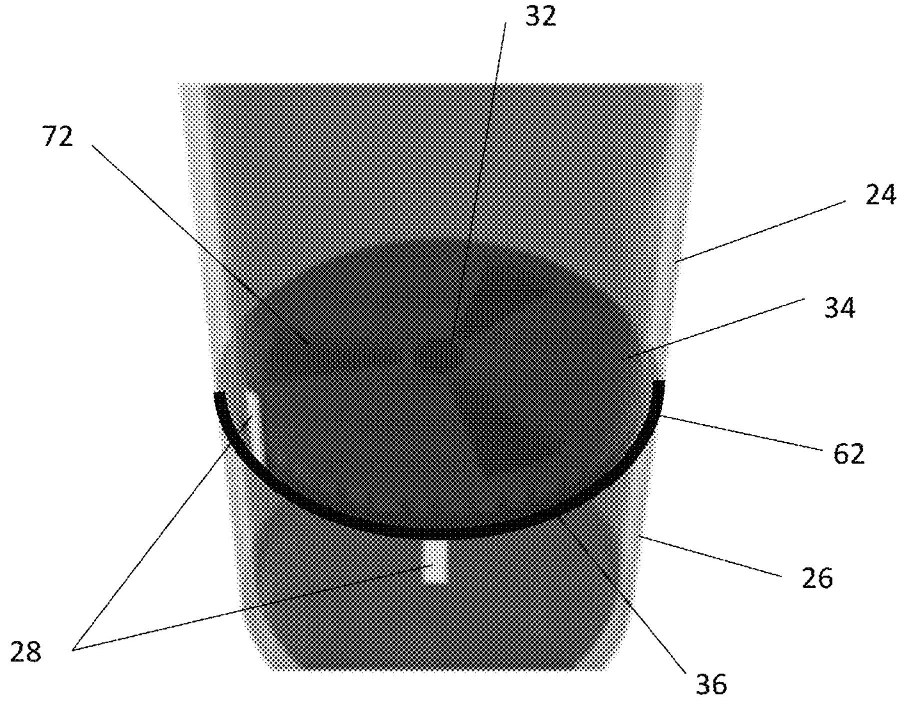
FIG. 3A illustrates a perspective view of a divider within a portion of a bottle in a closed position according to one embodiment of the present invention.
Figure 3B:
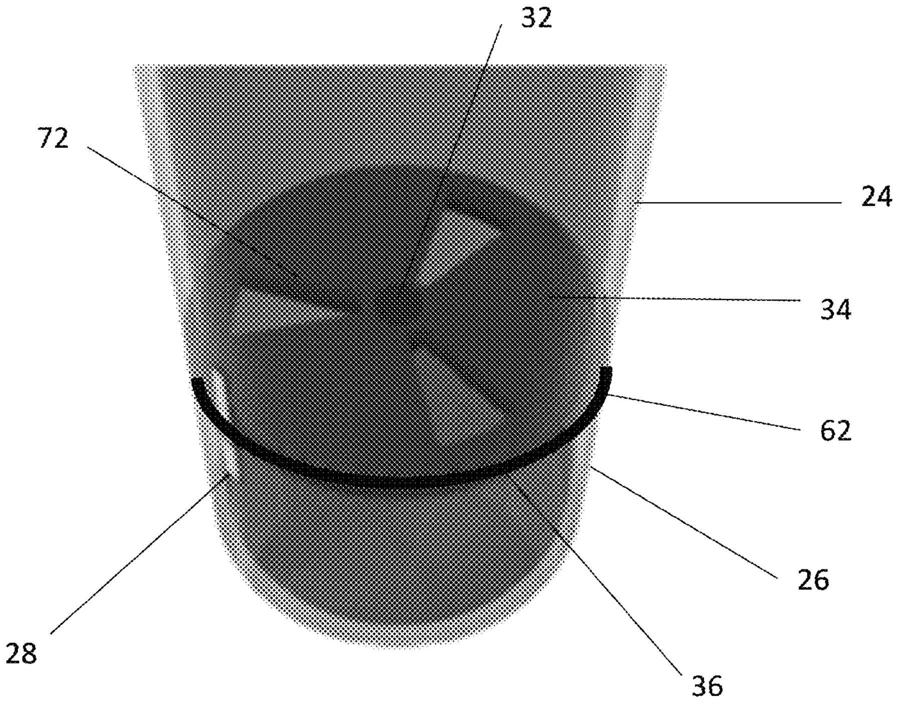
FIG. 3B illustrates a perspective view of a divider within a portion of a bottle in an open position according to one embodiment of the present invention.

FIG. 3A and FIG. 3B illustrate an alternative embodiment of the bottle. In such embodiments, an upper body portion 24 and lower body portion 26 each include an upper divider 34 and a lower divider 36, respectively, that divides where the upper body portion 24 and lower body portion 26 meet. Both the upper divider 34 and the lower divider 36 include at least one slot 72. Preferably, both the upper divider 34 and lower divider 36 slots 72 are the same in size and number. In the center of the upper divider 34 and lower divider 36, an axle 32 connects the upper divider 34 and the lower divider 36 together while allowing each to rotate with respect to the opposing divider around a similar axis. By doing so, the two dividers are operable to be rotated and positioned in a way that aligns the slots 72 of the upper divider 34 and the lower divider 36, allowing substances held in the upper body portion 24 to freely flow down into the lower body portion 36. In a preferred embodiment, at least one O-ring and/or rubber gasket 62 is included in the bottle between the two dividers and/or on an exterior circumference of the dividers. Preferably, the at least one O-ring and/or rubber gasket 62 allows the two dividers to slide with low friction while also preventing any liquids from escaping the two dividers. In one embodiment, the at least one rubber gasket and/or O-ring is doubled to further prevent leakages. In a further embodiment, the manufactured seams of the bottle where material meets and is affixed together are doubled to further prevent leakages.

In a preferred embodiment, the upper body portion 24 and lower body portion 26 are permanently or non-permanently affixed to the upper divider 34 and lower divider 36 respectively. In this embodiment, the upper body portion 24 and lower body portion 26 rotate along with the dividers about the axle 32. Advantageously, this allows for rotation to occur following a twisting motion being received along any part of the upper body portion 24 and lower body portion 26. In a preferred embodiment, the upper body portion is twisted clockwise with respect to the lower body portion to place the bottle in the closed position while it is twisted in the counterclockwise position with respect to the lower body portion to place the bottle in the open position, however the opposite configuration is operable to be implemented in some embodiments. Methods of affixing the respective body portions and dividers include, but are not limited to, mechanical, chemical, plastic welding, etc. In one embodiment, the body portions and dividers including the slots 72 are formed unitarily as a singular unit, i.e., the upper body portion 24 and the upper divider 34 are formed as a single unit and the lower body portion 26 and the lower divider 36 are formed as a single unit. In one embodiment, the dividers and body portions are threaded in a way that one is operable to receive the other. Advantageously, this allows for the two pieces to be separated and washed easily. In a preferred embodiment, the divider is its own unitary unit separate from the upper body portion 24 and lower body portion 26. In this embodiment, the upper body portion 24 and lower body portion 26 are operable to be threaded and received by the divider. This embodiment is advantageous as it allows for the bottle to easily be taken apart and washed after user.

In one embodiment, the outer walls of the upper body portion 24 and lower body portion 26 include at least one indicator 28 operable to convey whether the bottle is in an open or closed state. In one embodiment, the indicator 28 is a marking on the upper body portion 24 and a marking on the lower body portion 26 that aligns when the upper slots 72 in the upper divider 34 and lower slots 72 in the lower divider 36 are aligned. However, a person of ordinary skill in the art will appreciate that a number of indications are operable to indicate that the bottle is in the open or closed position.

Preferably, mechanical mechanisms are put into place that prevent the upper body potion and lower body portion 26 from rotating beyond a certain point about the axle 32. In one embodiment, a pin and groove mechanism is implemented between the upper divider 34 and lower divider 36 that mechanically prevents the rotation of the upper body portion 24 and lower body portion 26 past a certain point. In alternative embodiments where the divider is a unitary assembly, a mechanical stop is operable to be included in the form of a pin and groove mechanism or an alternative mechanism known in the art.

Figure 4A:
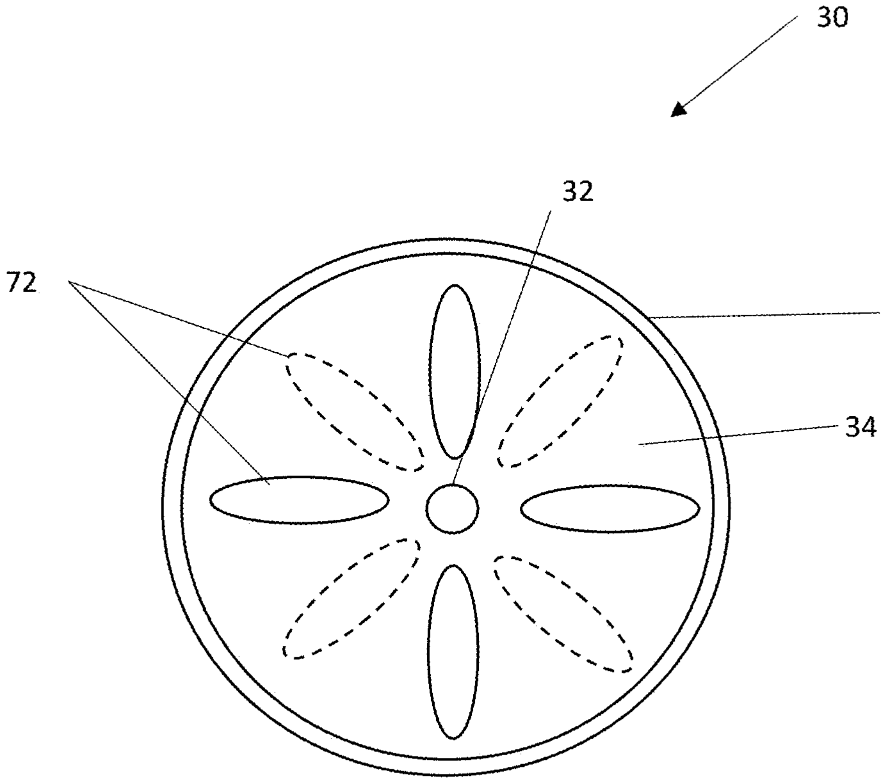
FIG. 4A illustrates a top view of a divider in a closed position according to one embodiment of the present invention.
Figure 4B:
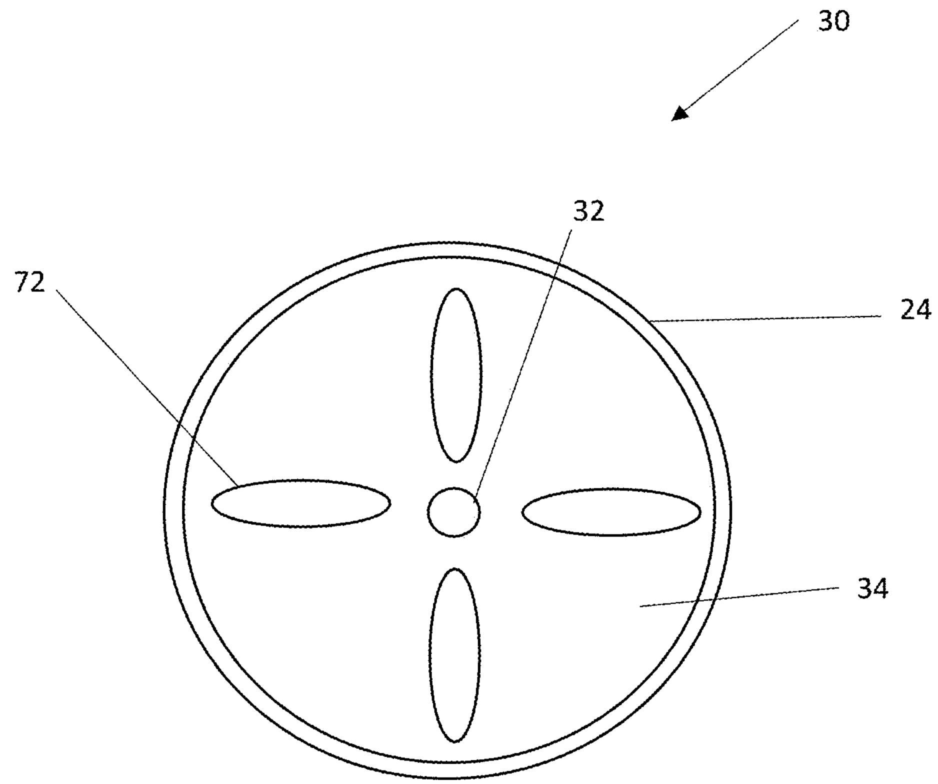
FIG. 4B illustrates a top view of a divider in an open position according to one embodiment of the present invention.

Further, the alignment of the upper and lower dividers while in the open and closed positions are illustrated in FIG. 4A and FIG. 4B. FIG. 4A illustrates the dividers in a closed position prior to rotation with the slots 72 in the upper divider 34 and the slots 72 in the lower divider 36 non-aligned. FIG. 4B illustrates the open position following rotation with the slots 72 in the upper divider 34 and the slots 72 in the lower divider 36 aligned such that fluid and solids are operable to be exchanged between the upper body portion and the lower body portion.

Preferably, this embodiment further includes a mechanism to hold the upper body portion 24 and lower body portion 26 in either the open or closed position. In one embodiment, this mechanism includes implanted magnets in the upper divider 34 and the lower divider 36 so the magnets align when the bottle is in the open position and the lower position and hold the upper divider 34 and the lower divider 36 in place. Advantageously, implementing magnetism to lock and unlock the bottle includes significantly fewer moving parts, decreasing the chance of mechanical failure. In an alternative embodiment, a button or lock switch is operable to be included to lock and unlock the rotation of the upper and lower portion. In one embodiment, pressing the button and/or lock switch is operable to compress a spring mechanism located in the divider. When the spring mechanism is compressed, a pin is released from a locking mechanism and the upper and lower halves of the divider are operable to spin freely until the button or lock switch are disengaged and the spring mechanism extends to allow the pin to return to the locked position.

Figure 5A:
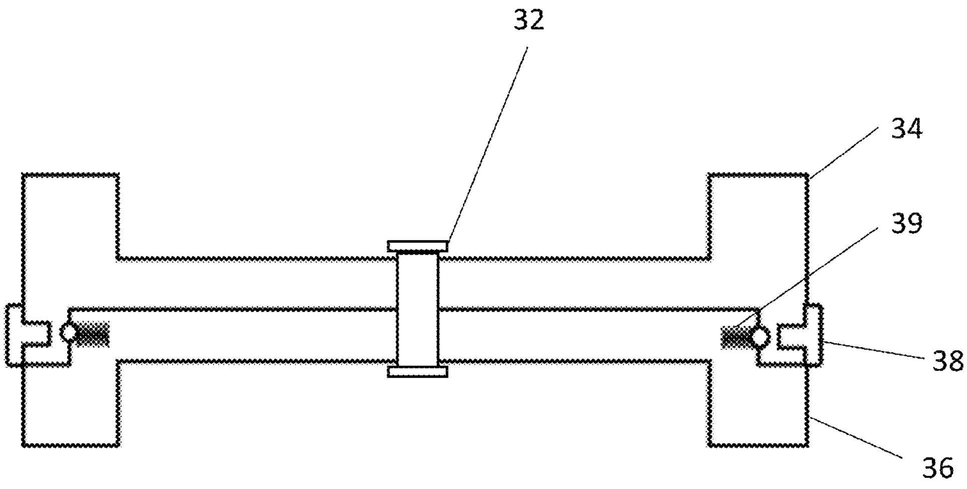
FIG. 5A illustrates a section view of a divider in a locked position according to one embodiment of the present invention.
Figure 5B:
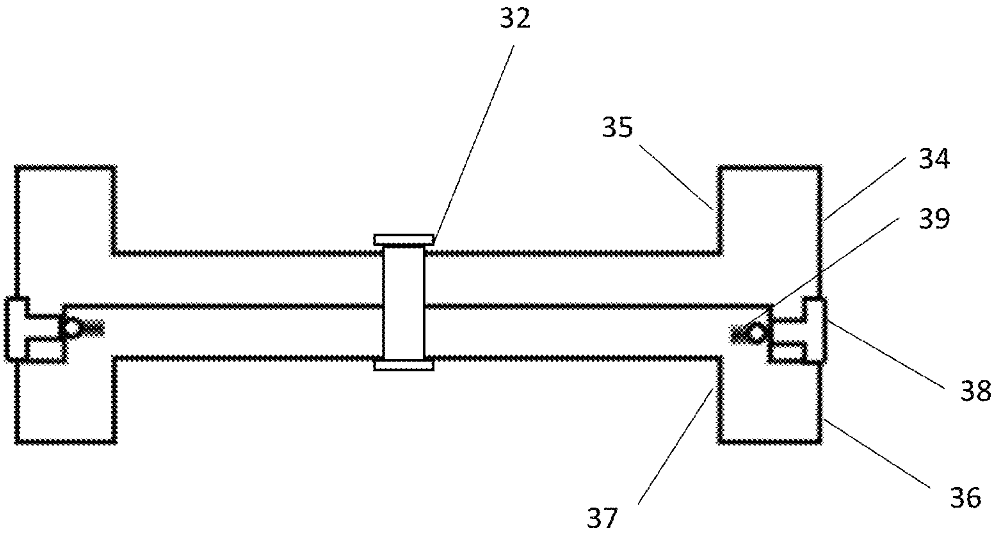
FIG. 5B illustrates a section view of a divider in an unlocked position according to one embodiment of the present invention.

FIGS. 5A and 5B illustrate one embodiment of the divider of the present invention. The divider is constructed of a top half 34 and a bottom half 36 connected by and axle 32 about which each half is operable to spin. In FIG. 5A, the top half 34 and bottom half 36 are locked into place with respect to one another by a spring mechanism 39 that prevents rotation. Further included in the divider is a button 38 operable to be pressed to compress the spring mechanism. When the spring mechanism 39 is compressed, the end of the button 38 aligns with the interface of the top half 34 and the bottom half 36, allowing the two halves to rotate with respect to one another about the axle 32, as illustrated in FIG. 5B. In one embodiment, a more or less spring mechanisms are operable to be included to allow the divider to be locked in the open configuration wherein slots in the top half and bottom half aligned, and a closed configuration wherein slots in the top half and bottom half are not aligned. Preferably, the inner face of the top half 35 and the inner face of the bottom half 37 are operable to include threading operably to receive other components of the bottle. Preferably, one or more gaskets and/or O-rings are operable to be included at the ends of threading and/or between the top half 34 and bottom half 36 of the divider 30.

Figure 6A:
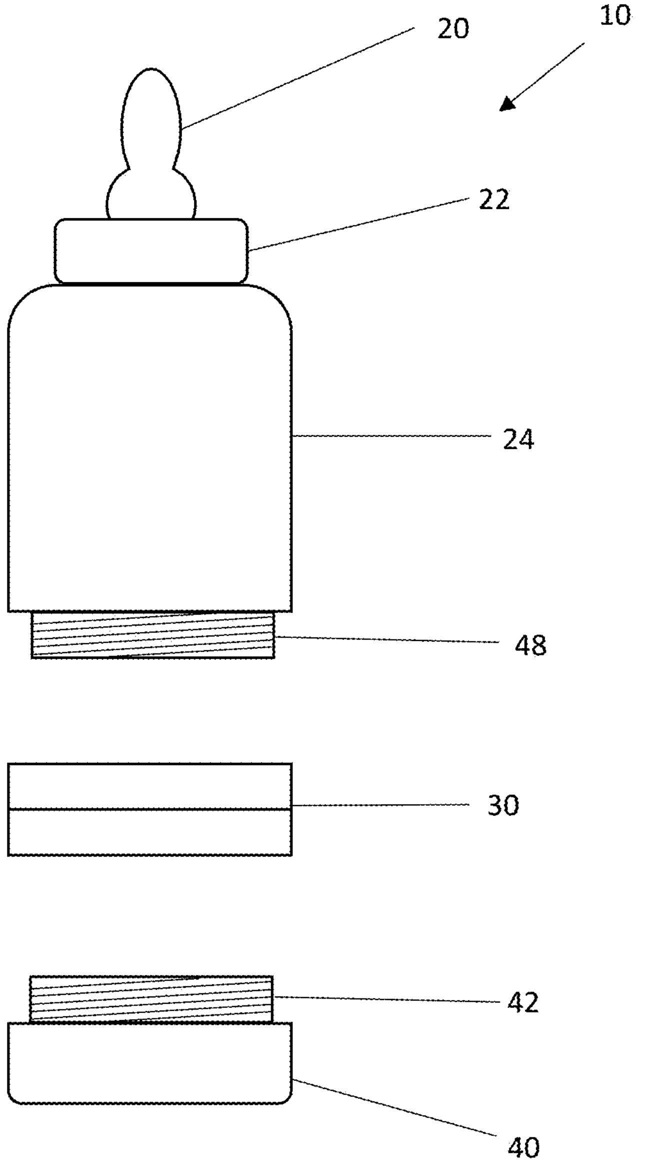
FIG. 6A illustrates an exploded side view of a bottle according to one embodiment of the present invention.
Figure 6B:
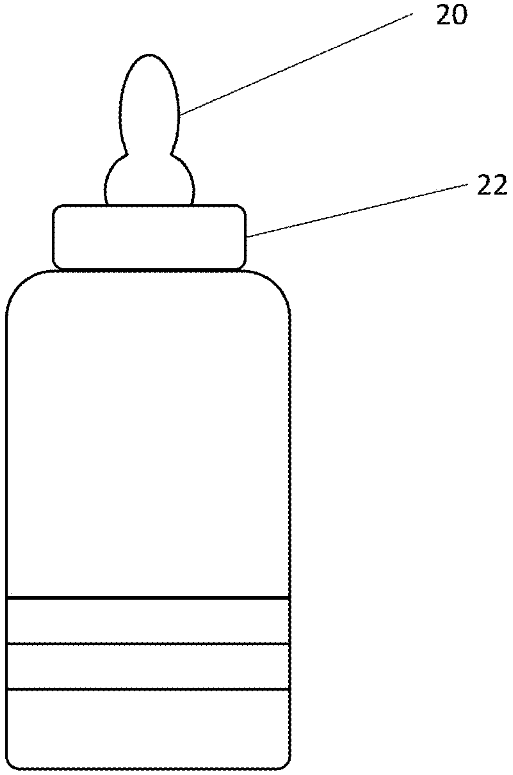
FIG. 6B illustrates a side view of a bottle according to one embodiment of the present invention.

FIGS. 6A and 6B illustrate one embodiment of a bottle incorporating a cartridge system of the present invention. In this embodiment, the cartridge system is operable to be received by the divider 30 by being screwed into the bottom side of the divider 30. Preferably, the divider 30 is the divider of the embodiment illustrated in FIGS. 5A and 5B. The top body portion 24 is operable to be screwed into the top half of the divider 30 with threading at the bottom of the top body portion 48. FIG. 6B shows the assembled version of one embodiment of the bottle of FIG. 6A.

Figure 6C:
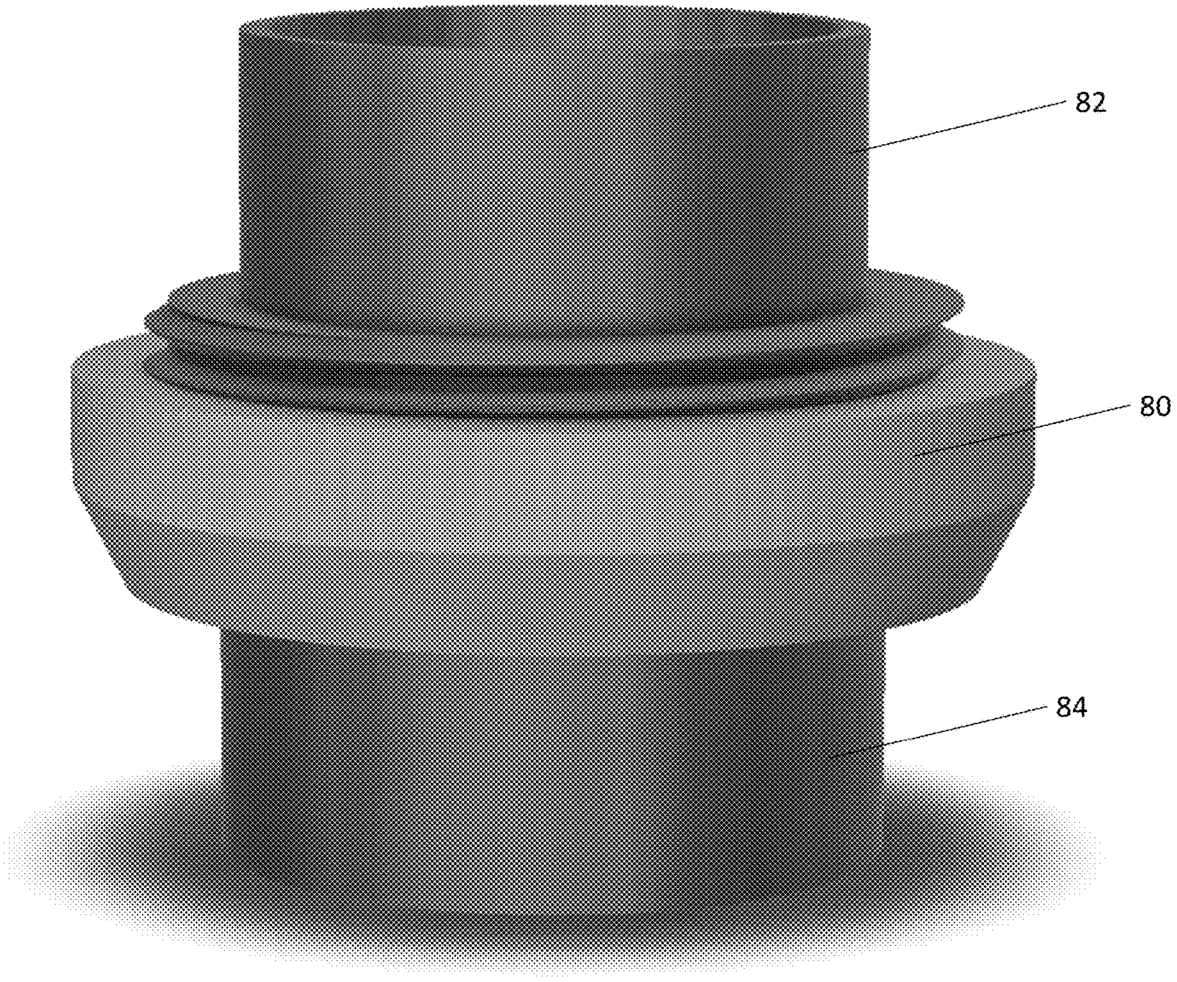
FIG. 6C illustrates a side orthogonal view of a cartridge mechanism for integration with a container according to one embodiment of the present invention.

FIG. 6C illustrates a side orthogonal view of a cartridge mechanism for integration with a container according to one embodiment of the present invention. The cartridge mechanism includes a central ring 80 which is threaded on the interior of the ring, with the bottom half of the ring being tapered for connection to the bottom portion of the cartridge mechanism 84. The central ring 80 provides for the top portion of the cartridge mechanism 82 to be joined with a bottom portion of the cartridge mechanism 84.

Figure 6D:
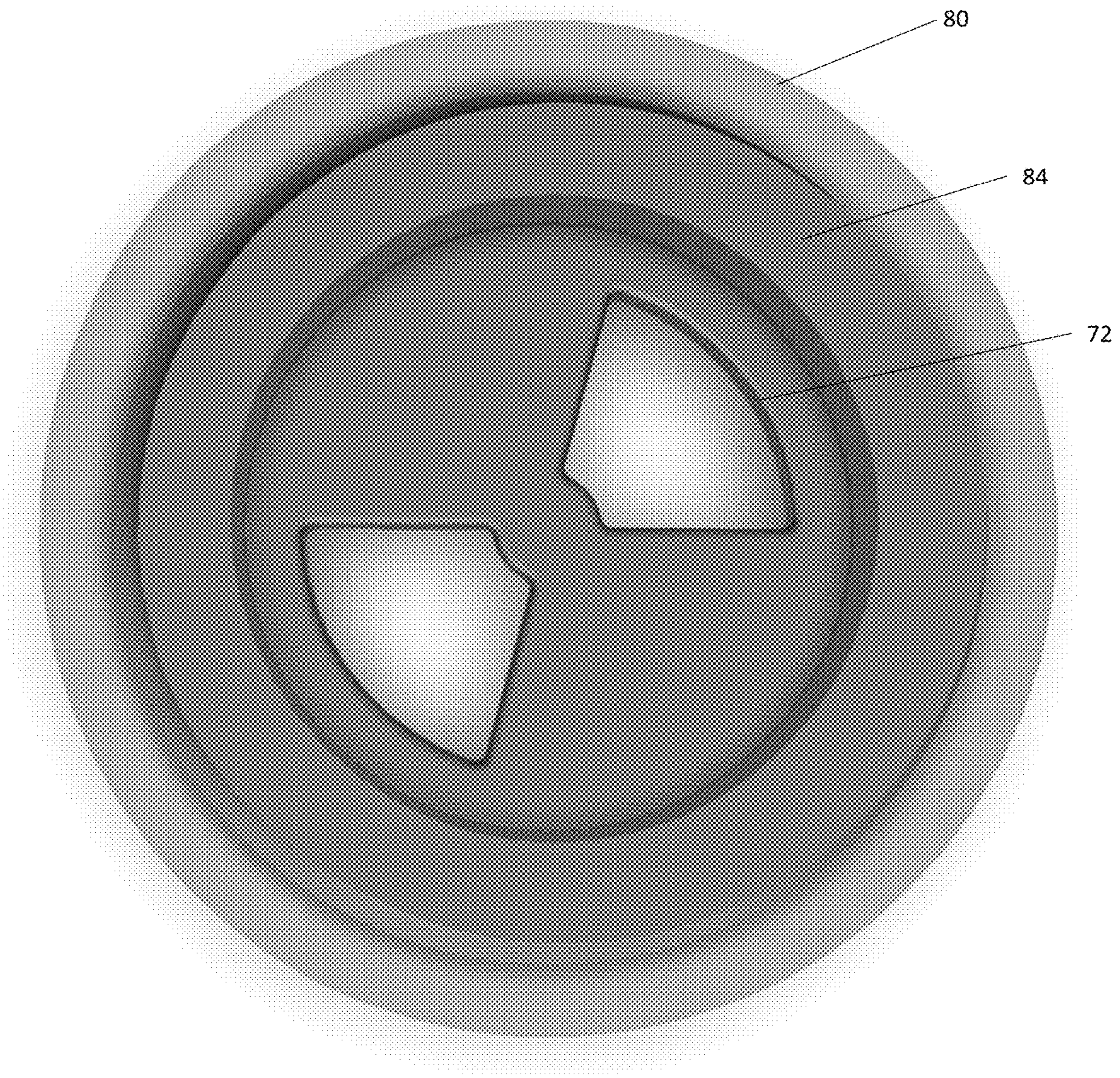
FIG. 6D illustrates a top orthogonal view of the bottom portion of a cartridge mechanism connected to the central ring according to one embodiment of the present invention.

FIG. 6D illustrates a top orthogonal view of the bottom portion of the cartridge mechanism 84 inserted into the central ring 80. The bottom portion of the cartridge mechanism 84 includes slots 72 which are operable to provide for a solid such as a powder or a liquid included in the bottom portion of the cartridge mechanism 84 to mix with liquid provided to and through the top portion of the cartridge mechanism via a container when the slots 72 are not closed off by a corresponding mechanism in the top portion of the cartridge mechanism. The top portion of the cartridge mechanism preferably includes corresponding slots which are operable to align with the slots 72 of the bottom portion of the cartridge mechanism 84 to create the openings between the bottom portion of the cartridge mechanism 84 and the top portion of the cartridge mechanism and the remainder of the container. When the slots 72 of the bottom portion of the cartridge mechanism 84 are not aligned with the corresponding slots of the top portion of the cartridge mechanism and are in a position where a solid portion of the top portion of the cartridge mechanism 84 covers the slots 72 of the bottom portion of the cartridge mechanism 84, then no fluid or solid is operable to be transferred between the bottom portion of the cartridge mechanism 84 to the top portion of the cartridge mechanism or to a container connected to the top portion of the cartridge mechanism. In another embodiment, a separate seal is provided between the top of the bottom portion of the cartridge mechanism and the bottom of the top portion of the cartridge mechanism. The seal is preferably constructed of rubber or silicone, and includes identical or substantially similar holes such that that the seal is operable to be rotated along with the bottom portion of the cartridge mechanism 84 or the top portion of the cartridge mechanism such that the slots 72 of the bottom portion of the cartridge mechanism line up with the holes in the seal and the holes or slots in the top portion of the cartridge mechanism. In another embodiment, more than one seal with holes or slots is provided, such as two seals with holes or slots, one which is operable to be placed on the top of the bottom portion of the cartridge mechanism and another which is operable to be placed on the bottom of the top portion of the cartridge mechanism.

Figure 6E:
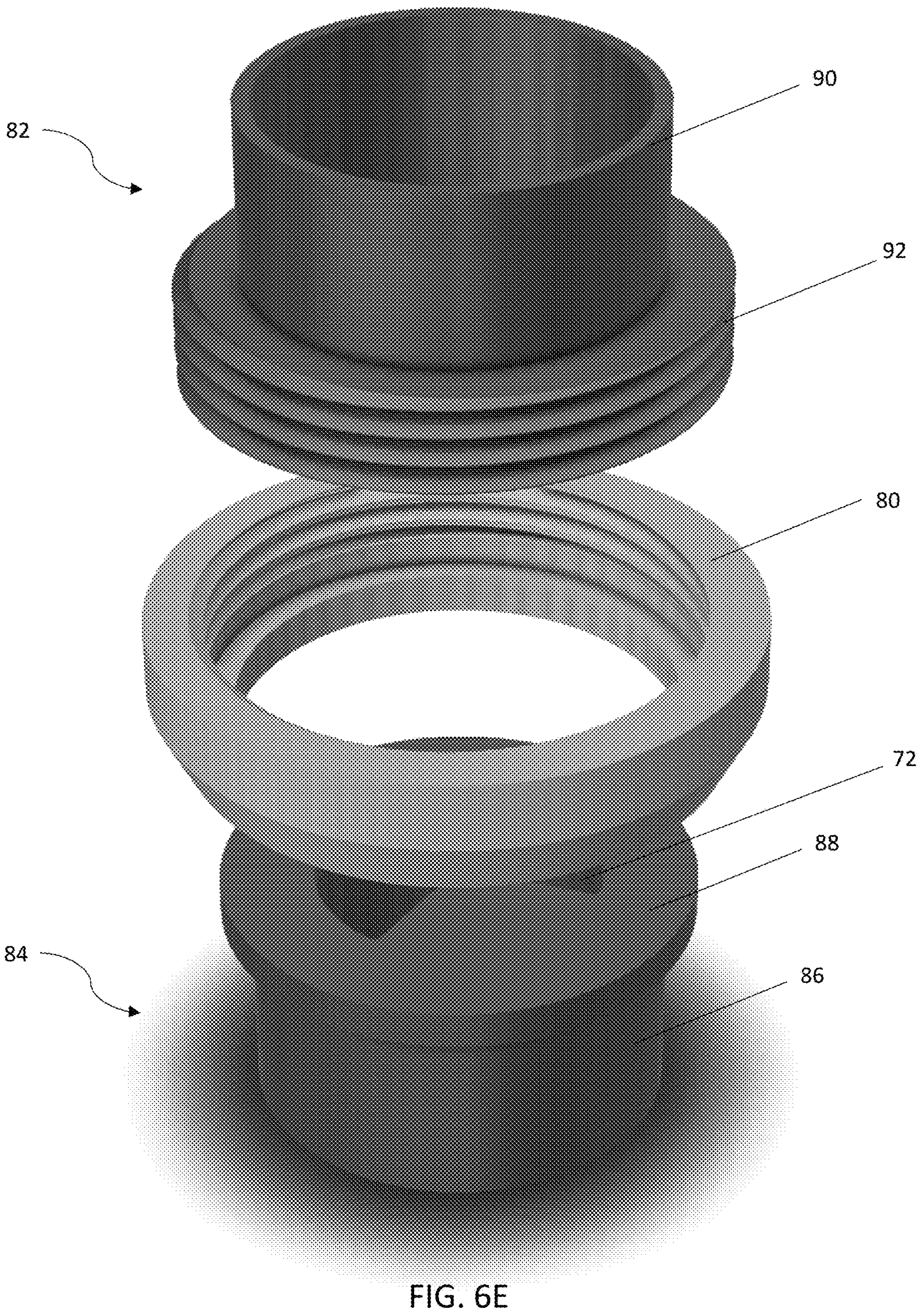
FIG. 6E illustrates a perspective exploded view of a cartridge mechanism for integration with a container according to one embodiment of the present invention.

FIG. 6E illustrates a perspective exploded view of a cartridge mechanism for integration with a container according to one embodiment of the present invention. The bottom portion of the cartridge mechanism 84 is operable to engage with the central ring 80 via friction-based locking. Alternatively, the bottom portion of the cartridge mechanism 84 is operable to engage with the central ring 80 via internal threading of the central ring 80 and an external threaded portion on the bottom portion of the cartridge mechanism 84. In one embodiment, an O-ring or a gasket is operable to provide a seal between the bottom portion of the cartridge mechanism and the central ring 80. The central ring 80 is operable to engage with the top portion of the cartridge mechanism 82 via internal threading of the central ring 80 and the external threaded portion 92 of the top portion of the cartridge mechanism 82. The top portion of the cartridge mechanism 82 is operable to engage with a bottom of a container such as a bottle or thermos via friction-based locking to provide a connection of the cartridge mechanism to the container. The top portion of the cartridge mechanism 82 includes a top cylindrical portion 90 with a diameter smaller than the diameter of the threaded portion 92 of the top portion of the cartridge mechanism 82. The top cylindrical portion 90 also has a diameter smaller than the diameter of the bottom portion of the container which the top cylindrical portion 90 is operable to engage with. In one embodiment, the top cylindrical potion 90 and/or the container include tabs which enable the top cylindrical portion 90 to lock into the container. The threaded portion 92 and the top cylindrical portion 90 are integrally formed out of a material such as plastic in one embodiment. The bottom surface of the threaded portion 92 includes a flat or substantially flat surface with holes or slots which match or substantially match the slots 72 on the bottom portion of the cartridge mechanism 84. The term "match" and "substantially match" indicate that the holes or slots on the bottom surface of the threaded portion 92 are identical or substantially identical to the slots 72 on the bottom portion of the cartridge mechanism 84.

The bottom portion of the cartridge mechanism 84 includes a bottom cylindrical portion 86 which includes a cylindrical lid 88 with a top flat or substantially flat portion with slots 72 which match or substantially match the holes or slots of the flat or substantially flat surface bottom surface of the threaded portion 92 of the top portion of the cartridge mechanism 82. The lower portion of the cylindrical lid 88 with the top flat or substantially flat portion is operable to be inserted into the bottom cylindrical portion 86 to contain a solid such as a powder or a liquid within the bottom portion of the cartridge mechanism 84. The cylindrical lid 88 with the top flat or substantially flat portion is preferably removably attached to the bottom cylindrical portion 86. Advantageously, this provides for the bottom portion of the cartridge mechanism 84 to be used as a cartridge containing a solid or liquid for mixing with liquid from a container, with the liquid from the container mixing with the solid or liquid in the bottom portion of the cartridge mechanism 84 through the cartridge mechanism, and for the bottom portion of the cartridge mechanism 84 to be subsequently reloaded with a solid or a liquid for reuse. In one embodiment, the bottom portion of the cartridge mechanism 84 includes physical components which prevent the bottom portion of the cartridge mechanism 84 from being turned beyond a certain point when engaged with the central ring 80. In other words, the bottom portion of the cartridge mechanism 84 is operable to be in a fully open position where the slots 72 of the cylindrical lid 88 align with holes in the seal and the holes or slots in the top portion of the cartridge mechanism 82, a fully closed position where the slots 72 of the cylindrical lid 88 do not align with holes in the seal and the holes or slots in the top portion of the cartridge mechanism 82 and the solid portion of the seal and/or the solid portion of the top portion of the cartridge mechanism block a liquid from entering the slots 72 of the cylindrical lid 88, and positions in between the open and closed positions, such as partially open or partially closed positions. By preventing the bottom portion of the cartridge mechanism 84 from rotating beyond a certain point within the central ring 80, the present invention provides for ease of use and prevents unnecessary stress on components of the invention by preventing rotation beyond a closed position, preventing rotation beyond an open position, and preventing rotation too far in one direction.

Advantageously, the cartridge mechanism shown in FIGS. 6C-6E is watertight when assembled, and provides a watertight cartridge container when the cartridge mechanism is connected to a container such as a bottle or a thermos. By providing a watertight assembly, the present invention provides for easy mixing of solids such as powders, liquids, or gels contained in the bottom portion of the cartridge mechanism with a liquid provided via the container. The bottom portion of the cartridge mechanism is rotated to provide fluid access between the liquid from the container and the solid, liquid, or gel in the bottom portion of the cartridge mechanism via the holes or slots included in the components of the cartridge mechanism which become aligned when the bottom portion of the cartridge mechanism is rotated. Physical agitation such as shaking encourages mixing of the solid, liquid, or gel originally contained in the bottom portion of the cartridge mechanism with the liquid from the container, or dissolution of the solid originally contained in the bottom portion of the cartridge mechanism in the liquid provided via the container, in one embodiment.

Figure 7A:
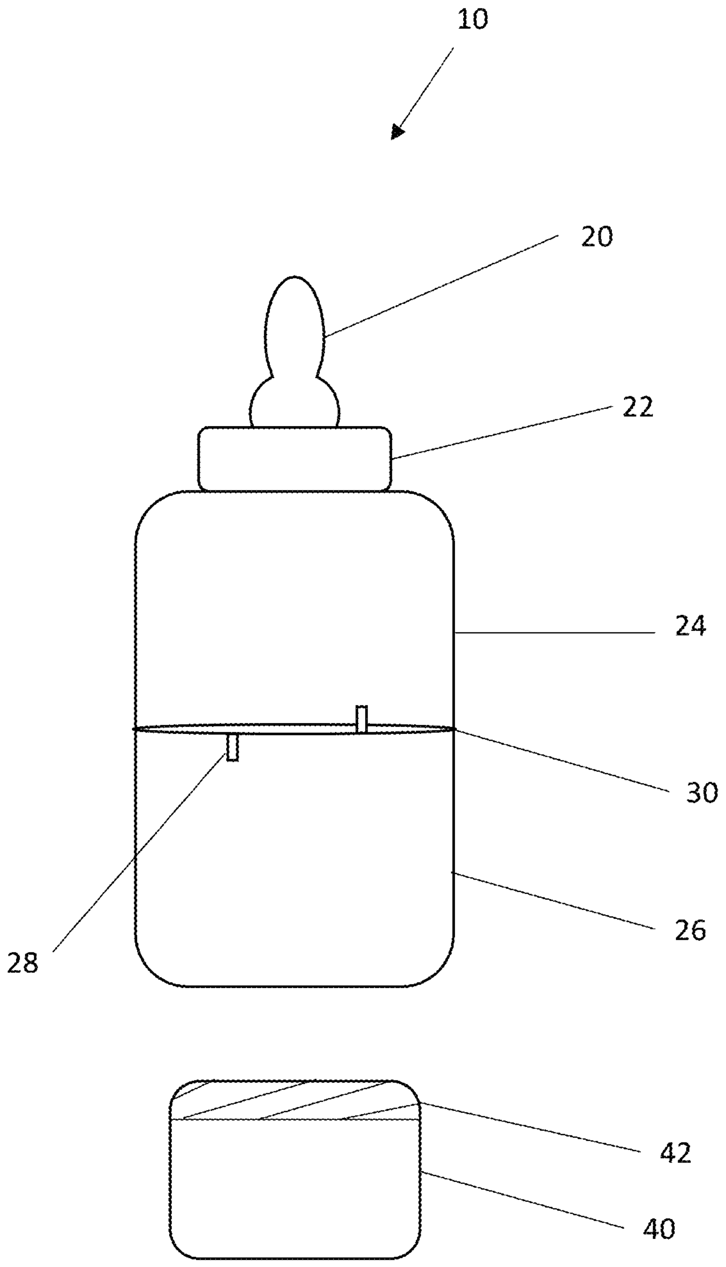
FIG. 7A illustrates an exploded side view of a bottle in a closed position according to one embodiment of the present invention.
Figure 7B:
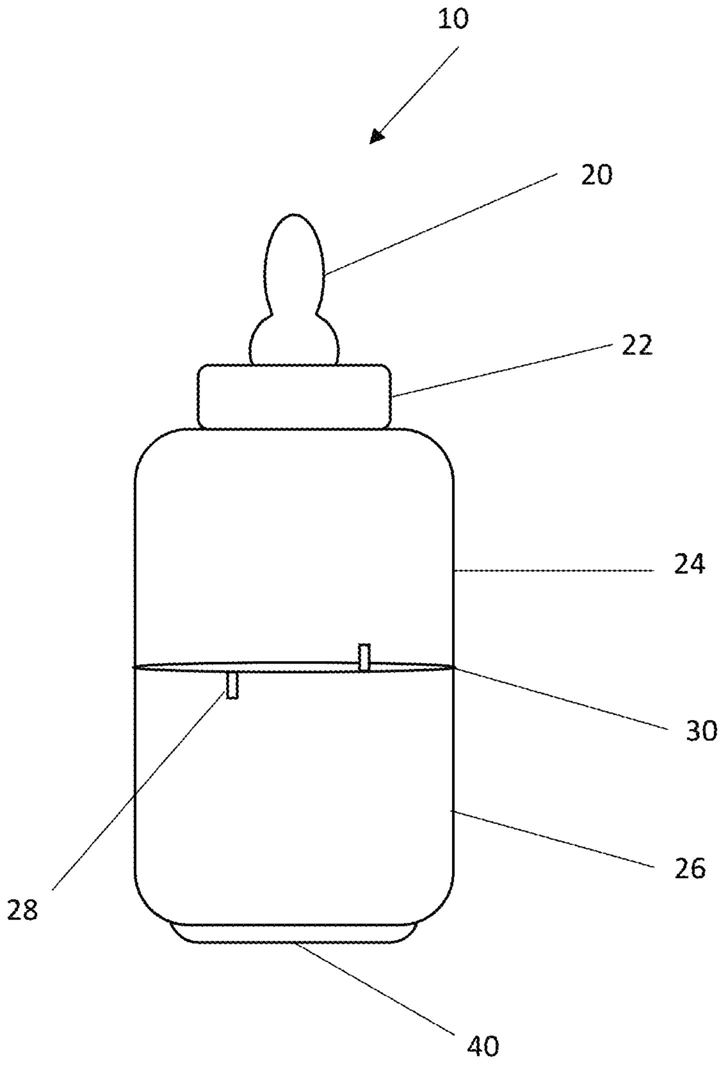
FIG. 7B illustrates a side view of a bottle in a closed position according to one embodiment of the present invention.
Figure 7C:
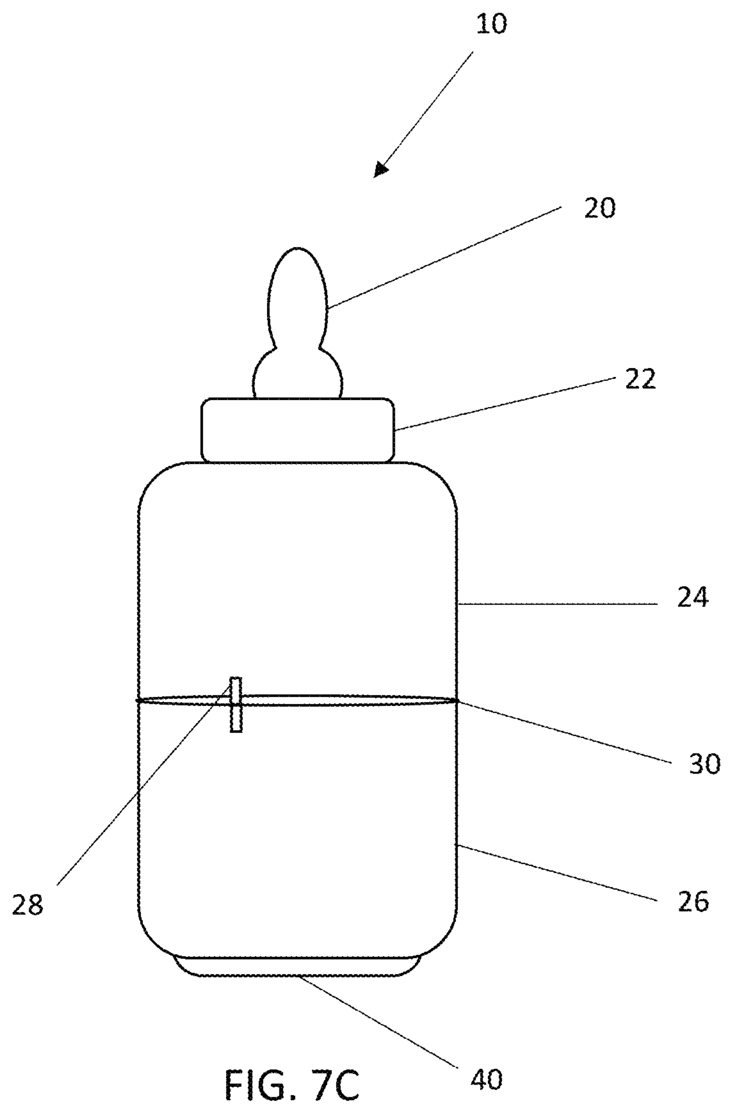
FIG. 7C illustrates a side view of a bottle in an open position according to one embodiment of the present invention.

FIGS. 7A-7C illustrate a further embodiment of the cartridge system of the present invention. Preferably, the cartridge 40 of the cartridge system is operable be received by the lower body portion 26 of the bottle 10. In one embodiment, this is achieved through screwing the cartridge into the bottom of the lower body portion 26. Alternatively, a different insertion mechanism is operable to be implemented such as a spring-loaded "push-push" mechanism. Advantageously, this allows for cartridges 40 holding ingredients to be mixed in the bottle to be inserted into the bottom of the bottle, as illustrated in FIG. 7B, before the bottle is changed to the open position and substances from the top allowed to enter the lower body portion 26, as illustrated in FIG. 7C. Preferably, the seal produced from screwing in the cartridge into the lower body portion 26 is watertight.

Figure 8A:
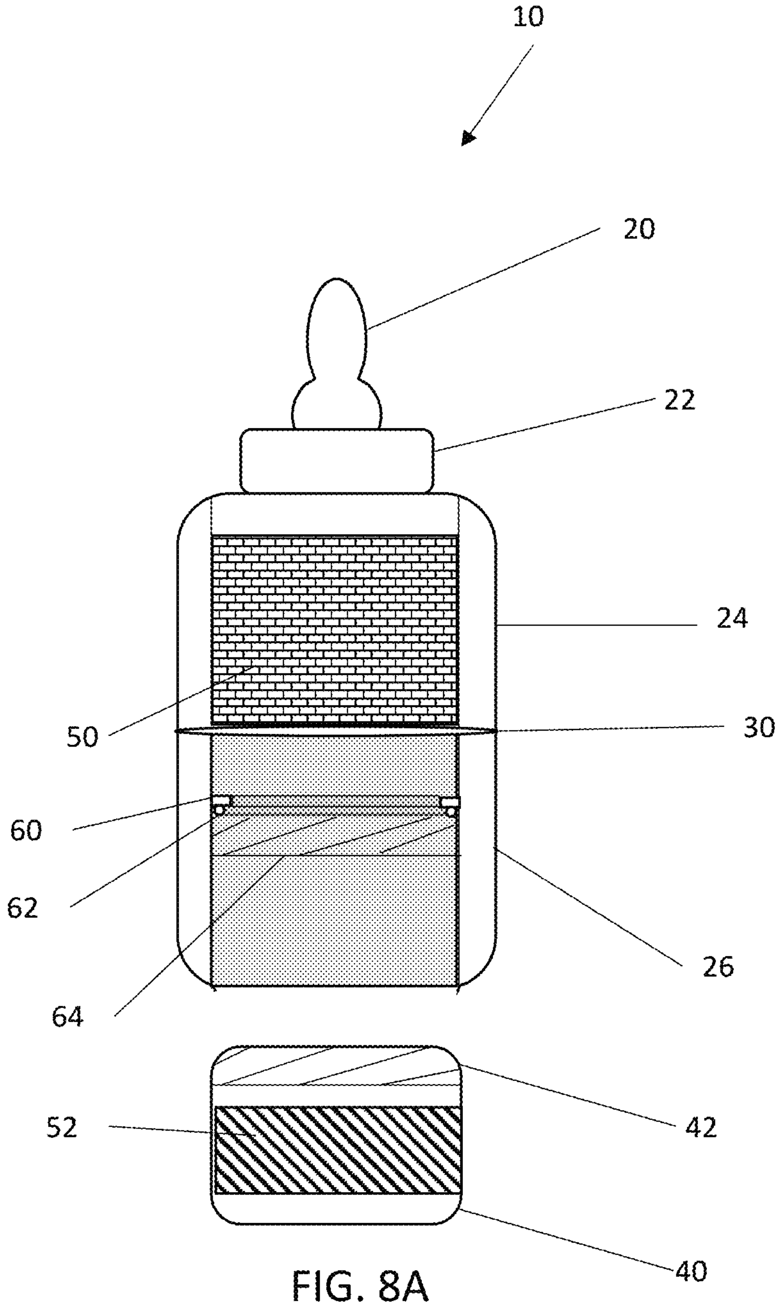
FIG. 8A illustrates a side transparent view of a bottle in a closed position according to one embodiment of the present invention.
Figure 8B:
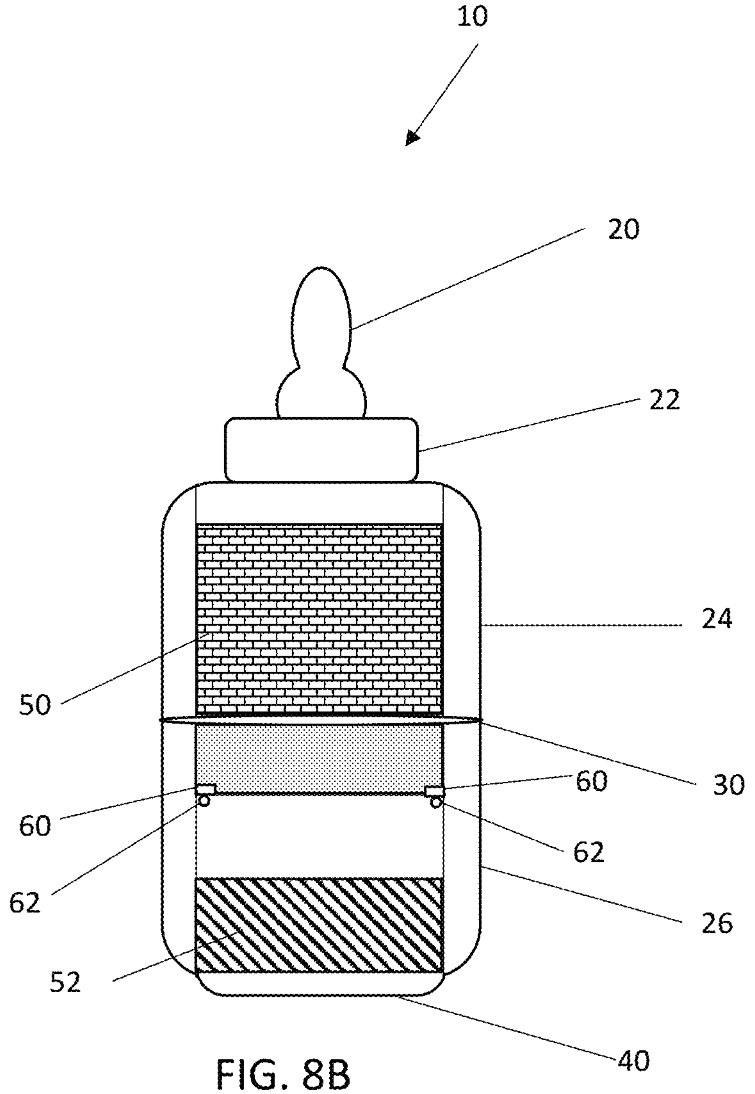
FIG. 8B illustrates a side transparent view of a bottle in a closed position according to one embodiment of the present invention.
Figure 8C:
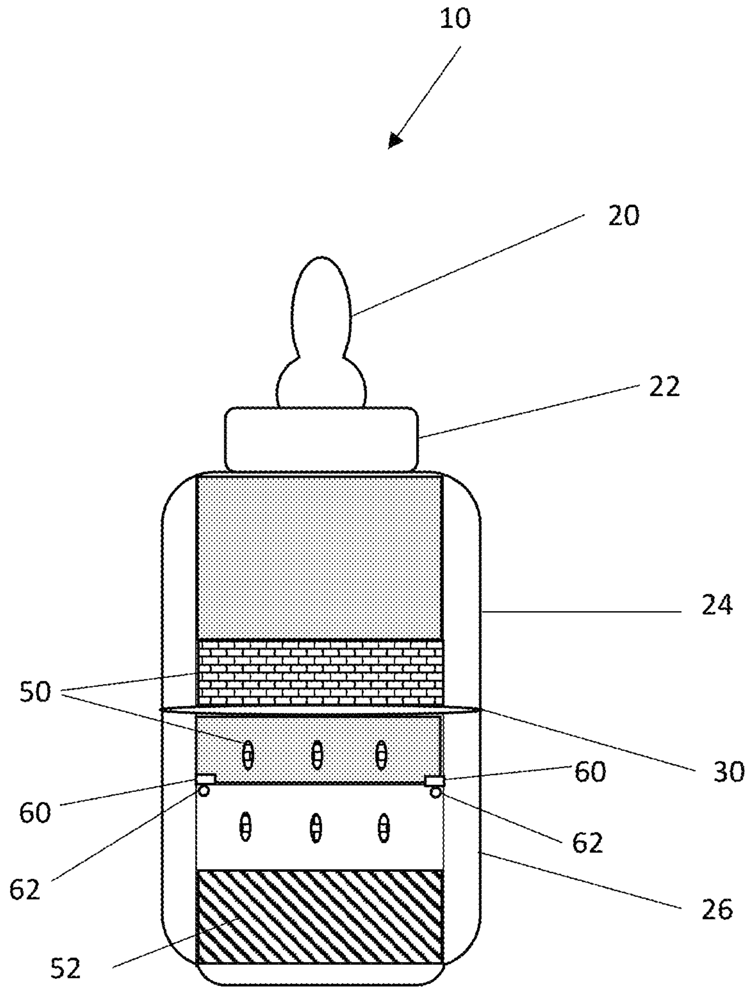
FIG. 8C illustrates a side transparent view of a bottle in an open position according to one embodiment of the present invention.

FIGS. 8A-8C illustrate a side transparent view of a bottle operable to receive a cartridge. The cartridge is operable to contain ingredients needed in a formulation to be formed in the bottle. The cartridge is operable to be screwed into the lower body portion 26 of the bottle until the upper lip of the cartridge meets a stop ring 60 located on the inner wall of the lower body portion 26. Advantageously, the stop ring 60 prevents the cartridge from being over screwed into the bottom of the lower body portion 26. In certain embodiments, a watertight O-ring and/or rubber gasket 62 is operable to be included between the stop ring 60 and the wall of the cartridge to prevent leakage. The upper body portion 24 is operable to contain at least one ingredient 50 of the final formulation. This part of the bottle is operable to be filled by removing the nipple 20 and nipple collar 22 from the upper body portion 24 while the bottle is in the closed position and therefore the ingredient is not operable to enter the lower body portion 26. Advantageously, this allows for the upper body portion 24 to be filled with at least one ingredient before the cartridge is inserted, without the bottle leaking from the lower body portion 26.

FIG. 8B illustrates the bottle following the cartridge being screwed into the lower body portion 26 before the slots 72 are not aligned (i.e. the bottle is in the closed position). Advantageously, the bottle is operable to keep the ingredients separated until action is taken to mix the ingredients, thereby increasing the convenience of use of the present application. In other words, a single action of twisting the upper body portion 24 or the lower body portion 26 is all that is required to mix the ingredients from the upper body portion 24 with the lower body portion 26 once the upper body portion, lower body portion, and cartridge are joined. Once the cartridge 40 is fully screwed into the lower body portion 26, the upper body portion 24 and/or the lower body portion 26 are operable to be twisted so that the divider 30 switches to the open position. Fluids and solids with particle sizes smaller than the width of the opening are then operable to fall into the lower body portion 26 to be mixed with the ingredient 52 for the formulation held in the cartridge as shown in FIG. 8C.

Further, the bottle of the present invention is operable to be constructed and/or manufactured from a variety of materials. The nipple is operable to be constructed from a variety of materials including, but not limited to, silicon, latex, etc. The components making up the body of the bottle (including the upper and lower body portion, threaded nipple collar, and cartridges) are operable to be constructed from a variety of materials including, but not limited to, plastics, metals, metal alloys, glass, ceramic, etc. The divider and/or dividers are operable to be constructed from preferably from plastics and/or metals. In a preferred embodiment, the upper body portion and lower body portions are constructed of glass. In one embodiment, components of the bottle is constructed from bio-based materials such as, but not limited to, bio-based plastics. In an alternative embodiment, some components of the bottle are constructed from paper.

Additionally, other features known in the art to be advantageous to bottles that do not inhibit the nature of the divider are operable to be included in the present invention. This includes, but is not limited to, an anti-colic lid, modifications to increase the grip of the bottle such as a silicon coating and/or increasing the roughness of the exterior of the bottle to increase the coefficient of static and/or kinetic friction, at least one lid to be placed over the nipple of the bottle, etc. In one advantageous embodiment, a grip-enhancing texture and/or block is added to the exterior of the upper body portion. This allows a user to rotate to upper body portion with their thumb while holding the lower body portion, allowing for mixing of the ingredients in the upper body portion and the lower body portion using only one hand. In one embodiment, the present invention further includes a straw that is operable to be places on the inside of the bottle and attached to the cap. In a preferred embodiment, volumetric measurements are displayed on the side of the bottle to indicate the volume of liquid included in the bottle. Further modifications include, but are not limited to, handles on the side of the bottle so it is easier for a user to hold.

While embodiments of the present disclosure detail applications of the present invention in the mixing of baby formula, this is not meant to limit the scope of the invention but to instead describe one embodiment. Alternative embodiments of the invention are operable to be adapted for other applications including, but not limited to, nutritional supplement mixer bottles and mixers wherein other combinations of liquids and solids are operable to be combined. As a non-limiting example, in one embodiment, the bottle is operable to be user to mix powdered creamer with coffee.

Pod

The baby bottle pod of the present invention solves the problems of the prior art. The baby bottle pod ("pod") is attachable to conventional baby bottles and functions as a cap for a baby bottle teat or "nip," a container for powdered formula, and a dispenser for powdered formula. Furthermore, when engaged with the baby bottle, the pod compresses the baby bottle nip to optimize storage space. Additionally, the pod includes a ring plunger that functions as a plug or lid to the powdered storage component and includes a ring as the handle, such that it is able to be held on the finger during preparation. Moreover, the pod has a specific powdered storage container shape and size to facilitate dispensing. Lastly, the pod includes a nip housing depression that facilitates compressing the nip and erecting the nip for use.

As a result, the pod optimizes the baby bottle feeding experience by providing a compact, easy to use, and simple baby bottle attachment. The pod allows for compact travel, minimal parts, and a smooth formula mixing protocol that is of great benefit to parents and caregivers.

Referring again to the drawings in general, the illustrations are for the purpose of describing one or more preferred embodiments of the invention and are not intended to limit the invention thereto.

Figure 9:
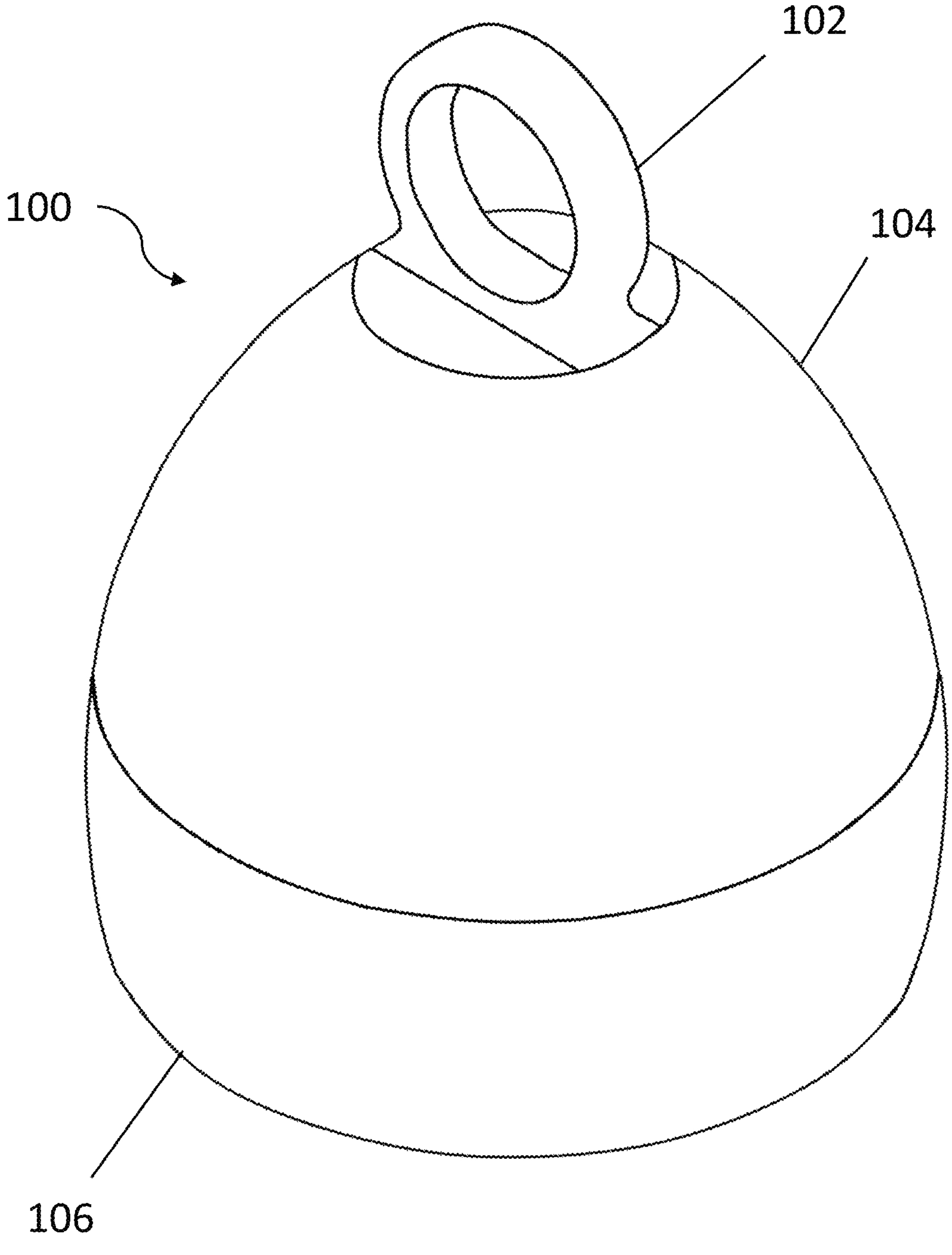
FIG. 9 illustrates a perspective view of a baby bottle pod according to one embodiment of the present invention.

FIG. 9 illustrates a side perspective view of a baby bottle pod 100 according to one embodiment of the present invention. Specifically, FIG. 9 includes a baby bottle pod 100, a ring plug 102, a formula compartment 104, and a nip compartment 106. In one embodiment, the baby bottle pod 100 is configured to include a nip compartment 106 attached below a formula compartment 104 with a ring plug 102 removably attached to the top of the formula compartment 104. In one embodiment, the nip compartment 106 and formula compartment 104 are separated by a thin layer (e.g., a boundary of polymer material, a boundary of metal material, etc.). In one embodiment, the nip compartment 106 and the formula compartment 104 are not integrally formed and are connected through one or more attachment methods known in art (e.g., adhesive, bolts, screws, welding, heat fusion, etc.). In one embodiment, the nip compartment 106, the formula compartment 104, and the boundary between the nip compartment 106 and the formula compartment 104 are integrally formed.

In one embodiment, the baby bottle pod 100 ("pod" or "device") is constructed of polymethyl methacrylate (PMMA), polycarbonate, polyethylene, polyethylene terephthalate (PET), polyvinyl chloride (PVC), acrylonitrile-butadiene-styrene (ABS), polylactic acid (PLA), or other suitable plastic known in the art. In one embodiment, the pod 100 is constructed of metal, graphite, carbon fiber or other commonly used material for 3D printing. In one embodiment, the pod 100 is constructed of silicon, ethylene propylene diene monomer rubber (EPDM), neoprene, or other suitable synthetic rubber known in the art. In one embodiment, the pod is constructed of a single, a specific, or a plurality of suitable materials. In one embodiment, the pod 100 is manufactured using extrusion blow molding, injection blow molding, and/or injection stretch molding process. In one embodiment, the pod 100 is manufactured by injecting molten material into a mold (i.e., injection molding).

In one embodiment, the pod 100 has a height of approximately 72 mm, a base diameter of approximately 63 mm, and an orifice diameter of approximately 32 mm. In one embodiment, the pod 100 has a height of approximately 62 mm, a base diameter of approximately 64 mm, and an orifice diameter of approximately 25 mm. In one embodiment, the pod 100 has a height of approximately 70 mm, a base diameter of approximately 70 mm, and an orifice diameter of approximately 26 mm. In one embodiment, the pod 100 has a height, base diameter, and orifice diameter that is compatible with any traditional baby bottle. Therefore, one of ordinary skill in the art will understand that the dimensions of the baby bottle or the pod 100 according to the present invention are not intended to be limiting. In one embodiment, the base diameter of the pod 100 is constructed to be larger or smaller to accommodate more formula powder or have a more compact figure.

Figure 13:
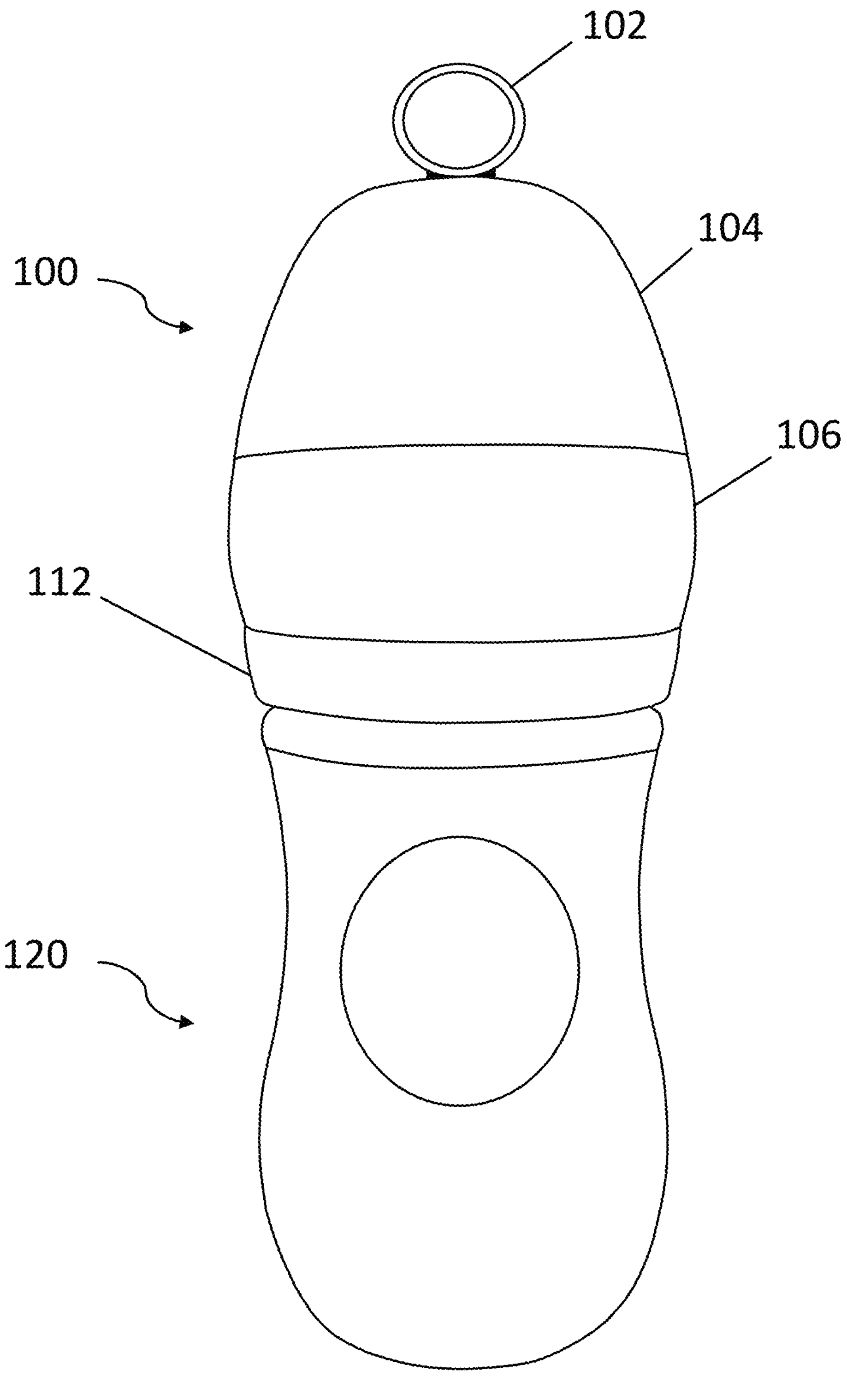
FIG. 13 illustrates a side orthogonal view of a baby bottle pod attached to a baby bottle according to one embodiment of the present invention.

In the preferred embodiment, the formula compartment 104 is configured to store powdered baby powder, although one of ordinary skill in the art will understand that the formula compartment 104 is operable to be configured to store a wide variety of substances. In one embodiment, the formula compartment 104 is operable to store a non-dissolvable solid, a semi-dissolvable solid, a solute, a solvent, and/or a liquid. In the preferred embodiment, the pod 100 is removably attached to a baby bottle 120 (as seen in FIG. 13), although one of ordinary skill in the art will understand that the pod 100 is operable to be configured to be removably attached to a wide variety of containers. In one embodiment, the baby bottle 120, upon which the pod 100 attaches, is not a baby bottle 120. In one embodiment, the pod 100 is removably attachable to a container operable to store a liquid, a solid, a solvent, and/or any other material suitable for mixing. As a nonlimiting example, the pod 100 is configured to store cereal and be removably attached to a container configured to store milk. In this example the cereal and the milk are mixed to make a heterogeneous mixture, yet the cereal does not dissolve in the milk. As another nonlimiting example, the pod 100 is configured to store protein powder and removably attached to a water bottle. In this example the protein powder and the water are mixed and the protein powder dissolves in the water to make a homogeneous mixture. One of ordinary skill in the art will recognize the benefit of the pod 100, to provide a cap and/or lid to a container that conveniently stores two compounds that may be mixed at a later time. In one embodiment, the pod 100 is not configured to function as an aid to preparing a baby bottle for feeding. In the preferred embodiment, the pod 100 is configured to function as an aid to preparing a baby bottle for feeding. Lastly, while the preferred embodiment of the present invention involves a container to store a solute removably attached to a container to store a solvent, the present disclosure is not limited to such an implementation and is operable to store a substance that does not dissolve into another substance.

Figure 10:
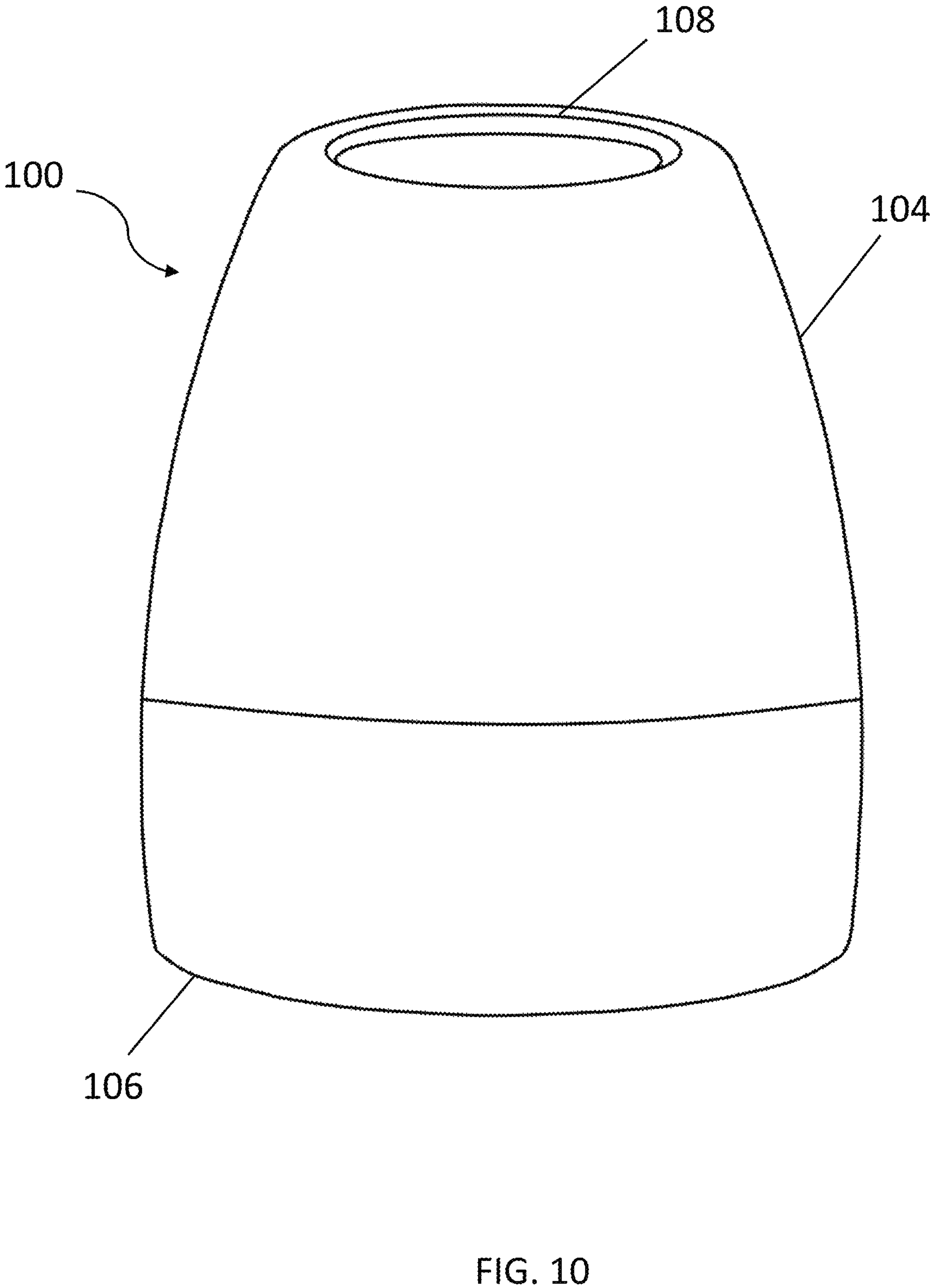
FIG. 10 illustrates a side perspective view of an open baby bottle pod according to one embodiment of the present invention.

FIG. 10 illustrates a side perspective view of an open baby bottle pod 100 according to one embodiment of the present invention. Specifically, FIG. 10 includes a baby bottle pod 100, a formula compartment 104, a nip compartment 106, and a pod orifice 108. In one embodiment, the formula compartment 104 is a closed space except for the pod orifice 108, which is located at the top of the formula compartment 104. In one embodiment, when the ring plug 102 is removed, the pod orifice 108 is configured to allow powdered formula to pass from the formula compartment 104 through the opening of a baby bottle and into a baby bottle by turning the pod 100 upside down and allowing gravity and agitation to empty the formula compartment 104. In one embodiment, the pod orifice 108 has a diameter to match the diameter of the opening to a baby bottle. In one embodiment, the pod orifice 108 has a smaller diameter than the opening to a baby bottle. In one embodiment, the pod orifice 108 has a larger diameter than the opening of a baby bottle.

Figure 11:
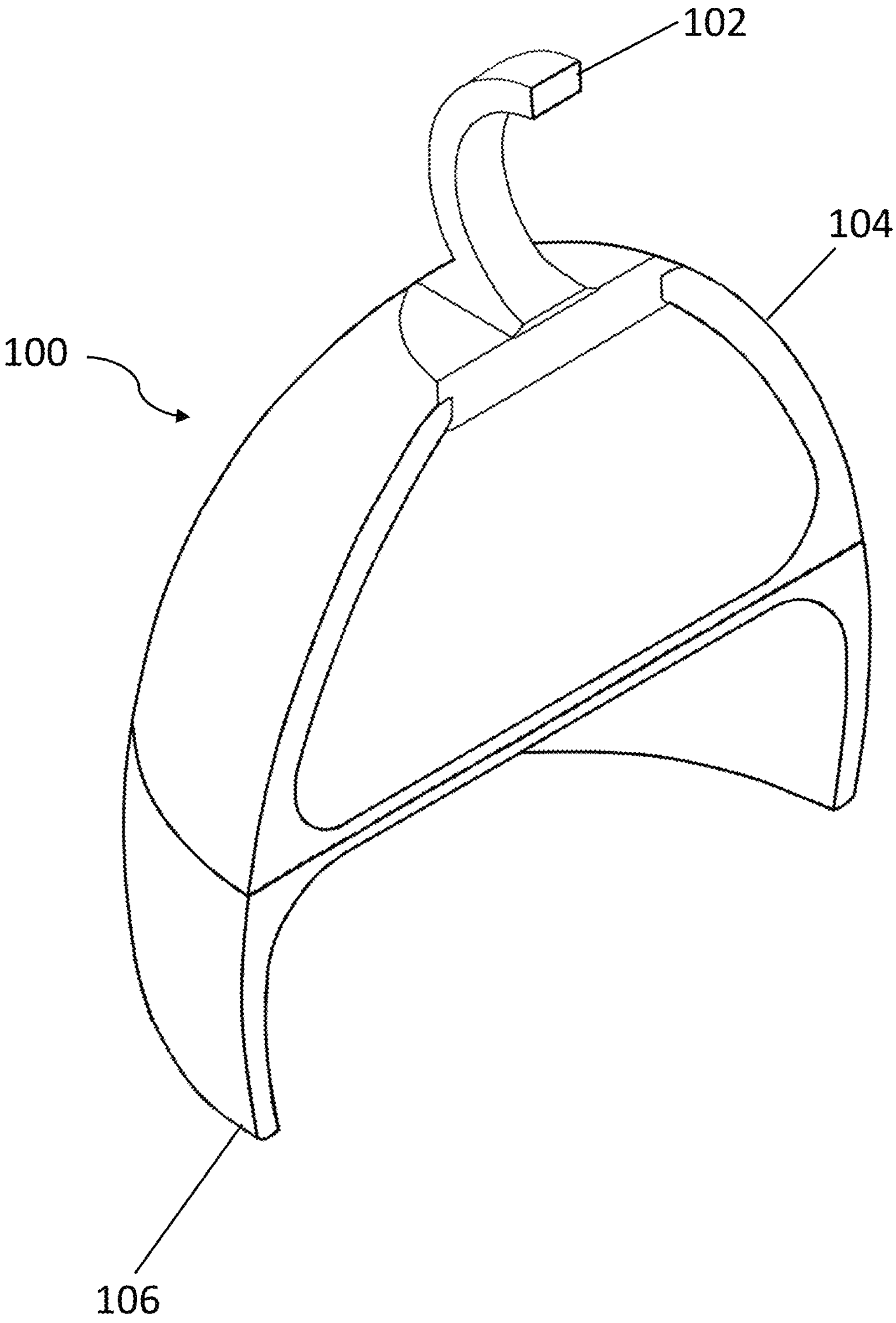
FIG. 11 illustrates a perspective cross-sectional view of a baby bottle pod according to one embodiment of the present invention.

FIG. 11 illustrates a cross-sectional view of a baby bottle pod 100 according to one embodiment of the present invention. Specifically, FIG. 11 includes a baby bottle pod 100, a ring plug 102, a formula compartment 104, and a nip compartment 106.

In one embodiment, the nip compartment 106 is partially enclosed by the boundary between the formula compartment 104 and the nip compartment 106 and at least one side wall, but includes an open bottom end. In one embodiment, the formula compartment 104 includes a flat closed bottom (i.e., the boundary between the formula compartment 104 and the nip compartment 106), sloping side walls, and a ring plug 102 sealing the top. In one embodiment, the formula compartment 104 includes smooth walls that are concave from the interior perspective of the formula compartment 104. In one embodiment, the interior walls of the formula compartment 104 form smooth corners of the interior of the formula compartment 104. In one embodiment, the interior walls of the formula compartment 104 do not include any hard corners, so as to facilitate dispensing of powdered formula and prevent clumping and sticking of powdered formula within the formula compartment 104. In one embodiment, the formula compartment 104 includes interior concave walls, that are upward and increasingly concave from the interior perspective of the formula compartment's 104 base to its top (i.e., the location of the ring plug 102). In one embodiment, the formula compartment 104 includes a bottom surface that is approximately flat, while having smooth interior concave corners (i.e., where the walls bend inwards to the space of the formula compartment 104) that lead to smooth, rounded side walls from the interior perspective of the bottom center of the formula compartment 104 up to the ring plug 102 of the pod 100. In one embodiment, the interior concave walls are of an upward slope, such that when the pod 100 is turned upside down powdered formula slides down the interior concave walls 100 and out of the formula compartment and into the baby bottle. In one embodiment, the interior concave walls 100 are constructed of polytetrafluoroethylene (e.g., TEFLON, FLUON, etc.) and/or another non-stick material to facilitate fully emptying the formula compartment 104. In one embodiment, the pod 100 has a width of approximately 67 millimeters. In one embodiment, the pod orifice 108 has a width of approximately 32 millimeters. In one embodiment, the pod 100 has a height of approximately 64 millimeters. In one embodiment, the formula compartment 104 has a height of approximately 34 millimeters. In one embodiment the nip compartment 106 has a height of approximately 25 millimeters.

Figure 12:
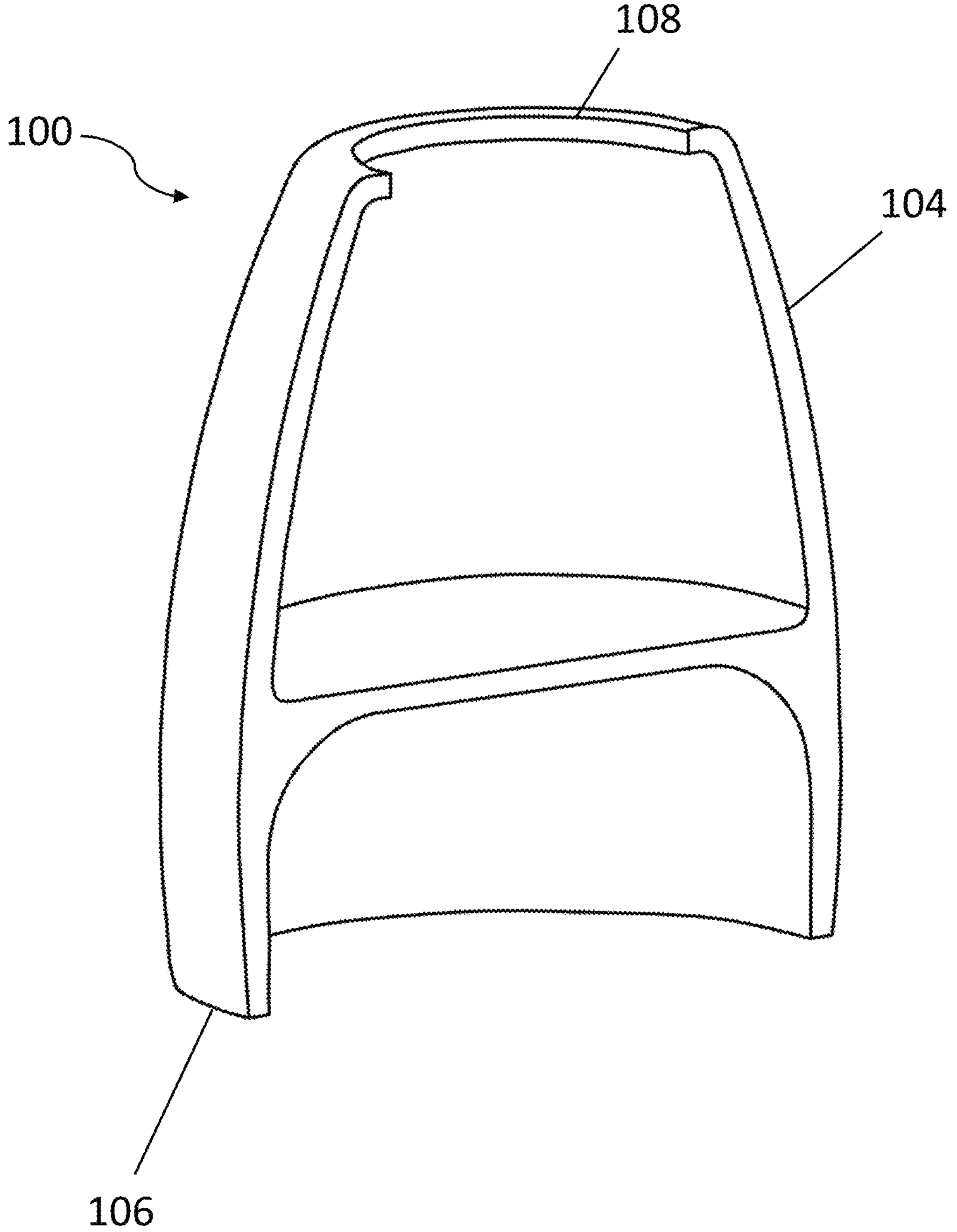
FIG. 12 illustrates a perspective cross-sectional view of an open baby bottle pod according to one embodiment of the present invention.

FIG. 12 illustrates a cross-sectional view of an open baby bottle pod 100 according to one embodiment of the present invention. FIG. 11 and FIG. 12 display nonlimiting examples of how the shape, size, and dimensions of the pod are able to be altered to fit different sized baby bottles, baby bottle nips, and hold varying amounts of powdered formula.

Specifically, FIG. 12 illustrates a baby bottle pod 100, a formula compartment 104, a nip compartment 106, and a pod orifice 108. In one embodiment, the formula compartment 104 includes a closed flat surface bottom, sloping side walls, and a pod orifice 108 at the top. In one embodiment, the pod orifice 108 is a circular shaped opening to the formula compartment 104. In one embodiment, the pod orifice 108 facilitates dispensing of powdered formula into a baby bottle. In one embodiment, the orifice 108 is of a size and shape to accommodate a corresponding ring plug 102. In one embodiment, the pod orifice 108 is of a smaller, yet complimentary size and shape to a ring plug 102, such that the ring plug 102 is operable to sealingly engage the pod orifice 108. In one embodiment, once the ring plug 102 engages the pod orifice 108, a water tight, air tight, and/or impervious seal connection results.

FIG. 13 illustrates a side perspective view of a baby bottle pod 100 attached to a baby bottle 120 according to one embodiment of the present invention. In one embodiment, the pod 100 is of a complimentary size and shape to fit on top of a conventional baby bottle. In one embodiment, the pod 100 acts as a cap to the nip of a baby bottle. Specifically, FIG. 13 includes a baby bottle pod 100, a ring plug 102, a formula compartment 104, a nip compartment 106, a baby bottle pod fitting ring 112 or "pod fitting ring 112," and a baby bottle 120.

In one embodiment, the pod 100 includes a pod fitting ring 112 ("or pod fitting") that facilitates a detachable connection between the pod 100 and the baby bottle 120. In one embodiment, the pod fitting ring 112 facilitates attachment of the pod 100 to any sized baby bottle 120. In one embodiment, the pod 100 includes a pod fitting ring 112 proximate to the bottom of the pod 100. In one embodiment, the pod fitting ring 112 is a ring-shaped component that sits around the top of a baby bottle 120. In one embodiment, the pod fitting ring 112 is of a size and shape to detachably connect to the top of a baby bottle 120. In one embodiment, the pod fitting ring 112 is tapered, such that the top diameter of the pod fitting ring 112 is larger than the bottom diameter of the pod fitting ring 112. In one embodiment, the baby bottle pod fitting ring 112 is tapered such that the top diameter of the baby bottle pod fitting is smaller than the bottom diameter of the baby bottle pod fitting. In one embodiment, the pod fitting ring 112 is a short cylinder with a uniform center diameter about its length. In one embodiment, the pod fitting ring 112 is attachable to the top of a baby bottle 120 by sliding the pod fitting ring 112 down the neck of the baby bottle 120 until it frictionally engages an outer surface of a rim of the baby bottle 120. In one embodiment, the pod fitting ring 112 is tightly attached to the baby bottle 120. In one embodiment, the pod fitting ring 112 is permanently affixed proximately to the top of a baby bottle 120. In one embodiment, the pod fitting ring 112 is affixed to the peak of the baby bottle 120 through an adhesive, welding, screws, bolts, and/or any other conventional means of attachment known in the art.

In one embodiment, the pod 100 does not include a pod fitting ring 112. The pod 100 is configured to have a size and shape compatible with the neck of the baby bottle 120, such that it is placed directly onto the baby bottle 120 and frictionally engages with the baby bottle 120. In one embodiment, the pod 100 is detachably coupled to a baby bottle 120. In one embodiment, the pod 100 matingly engages a baby bottle 120. In one embodiment, the pod 100 is of a size and shape complimentary to a baby bottle 120, such that the baby bottle 120 and the pod 100 frictionally engage each other.

Figure 14:
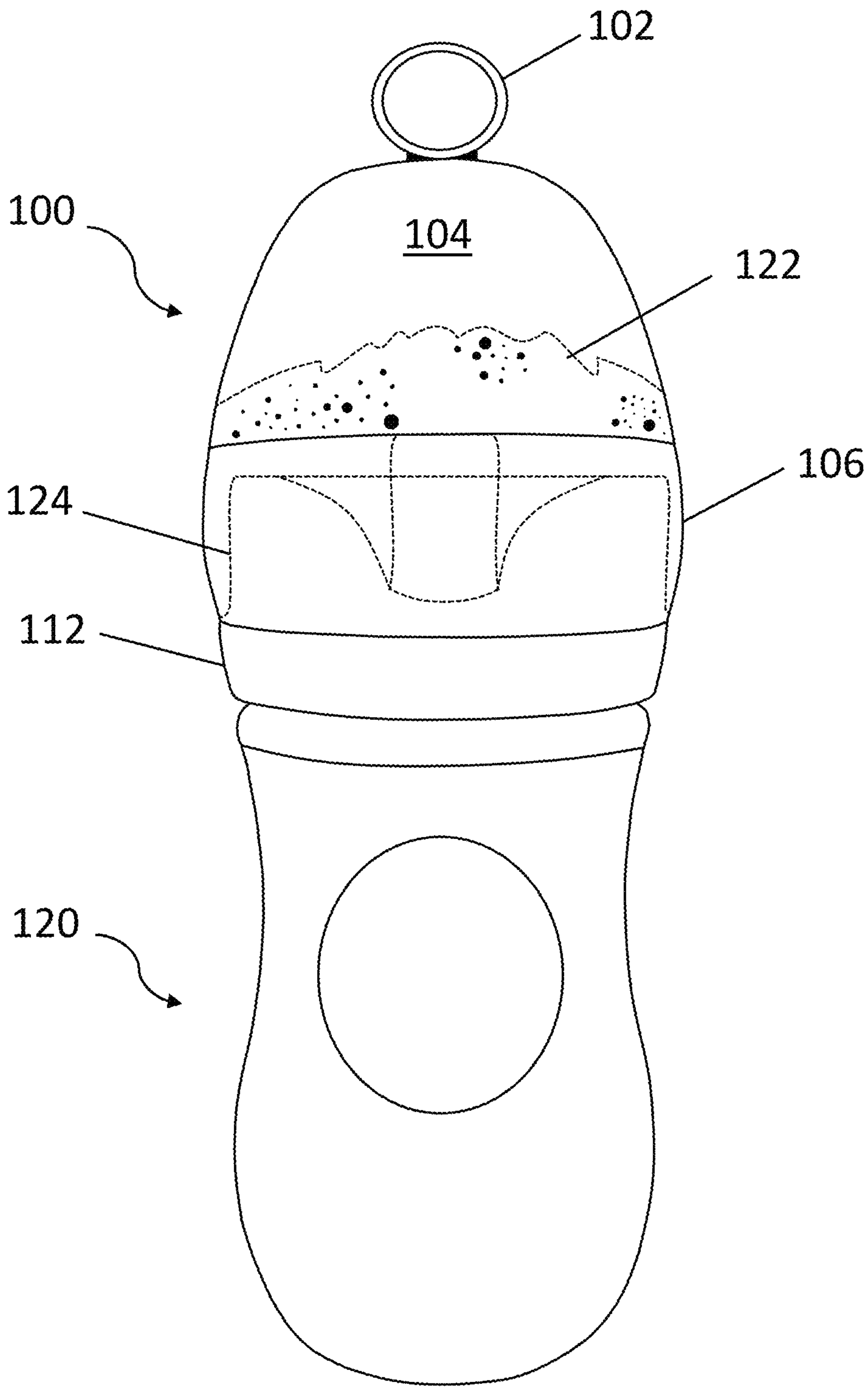
FIG. 14 illustrates side semi-transparent view of a baby bottle pod attached to a baby bottle according to one embodiment of the present invention.

FIG. 14 illustrates side semi-transparent view of a baby bottle pod 100 attached to a baby bottle 120 according to one embodiment of the present invention. FIG. 14 illustrates a transparent formula compartment 104 to illustrate its storage capabilities. FIG. 14 illustrates a transparent nip compartment 106 to illustrate how the baby bottle nip 124 interacts with and fits within the nip compartment 106 of the pod 100. Specifically, FIG. 14 includes a baby bottle pod 100, a ring plug 102, a formula compartment 104, powder formula 122, a nip compartment 106, a baby bottle nip 124, a pod fitting ring 112, and a baby bottle 120.

In one embodiment, the nip compartment 106 is operable to function as a cap to the baby bottle 120, such that the baby bottle nip 124 is not exposed to the environment of the baby bottle 120. In one embodiment, the nip compartment 106 is of a shorter height than the baby bottle nip 124, such that upon attachment of the pod 100 to the baby bottle 120 the baby bottle nip 124 is compressed, as illustrated in FIG. 14. In one embodiment, the baby bottle nip 124 is compressed evenly downward so that the nip is not folded onto one side or another upon attachment of the nip compartment 106. Typically, baby bottle nips are formed from a flexible, deformable material, allowing the nip 124 to deform, compress, and/or deflect when attached to the pod 100. In one embodiment, the nip compartment 106 is of the same length of the baby bottle nip 124, such that upon attachment of the pod 100 to the baby bottle 120, the baby bottle nip 124 remains in an erect position. In one embodiment, the internal side walls of the nip compartment 106 are coated in or formed from an antibacterial and/or antiviral material.

In one embodiment, the formula compartment 104 is operable to contain and store powder formula 122. In one embodiment, the formula compartment 104 includes a single storage compartment, as illustrated in FIG. 14. In one embodiment, the formula compartment 104 includes separate storage compartments, such that powder formula 122 is stored in different closed spaces within the formula compartment 104. In one embodiment, the formula compartment 104 is coated in or formed from an antibacterial, antimicrobial and/or antiviral material. In one embodiment, the formula compartment 104 is constructed of glass, silicone, polycarbonate, polypropylene, Bisphenol A (BPA) free plastic, ethylene vinyl acetate, polyethylene vinyl acetate, and/or borosilicate glass. In one embodiment, the formula compartment 104 and ring plug 102 together form an air tight, water tight, impermeable, and/or pressure tight storage compartment.

In one embodiment, the pod 100 is removable from the baby bottle 120 at the baby bottle pod fitting ring 112 portion through a snap on and snap off motion, which exposes the baby bottle nip 124. In one embodiment, the lid of the baby bottle 120 is able to be removed while the pod 100 is still attached. Because the fitting ring 112 is attached to the lid, both the pod 100 and the lid below the pod fitting ring 112 are removed through a twisting motion, which exposes the opening to the baby bottle 120 and retains the baby bottle nip 124 in the nip compartment 106. In one embodiment, upon twist removal of the pod 100, both the baby bottle nip 124 and a baby bottle aerator are removed from the baby bottle 120.

Figure 15A:
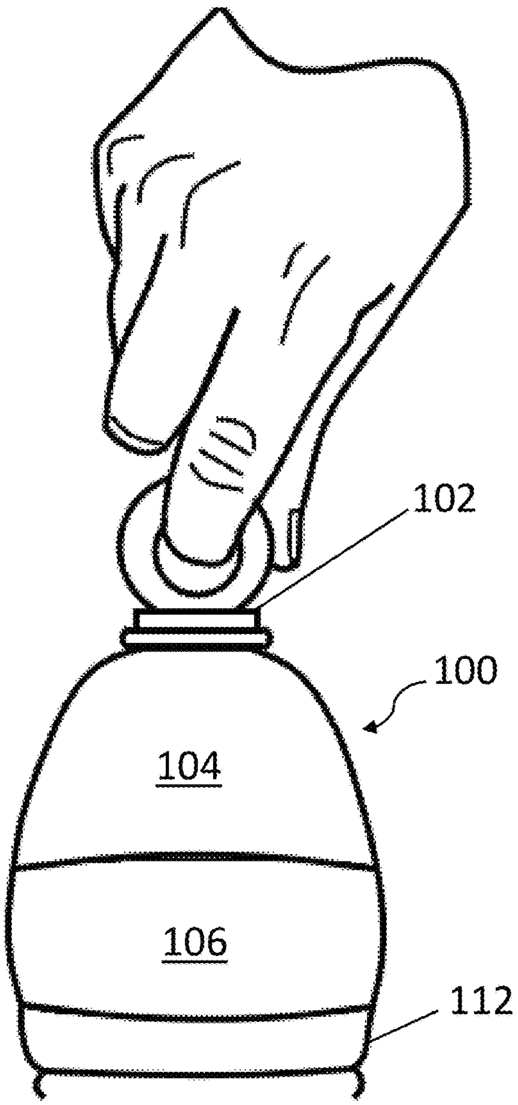
FIG. 15A illustrates a side perspective view of a baby bottle pod prior to being opened according to one embodiment of the present invention.
Figure 15B:
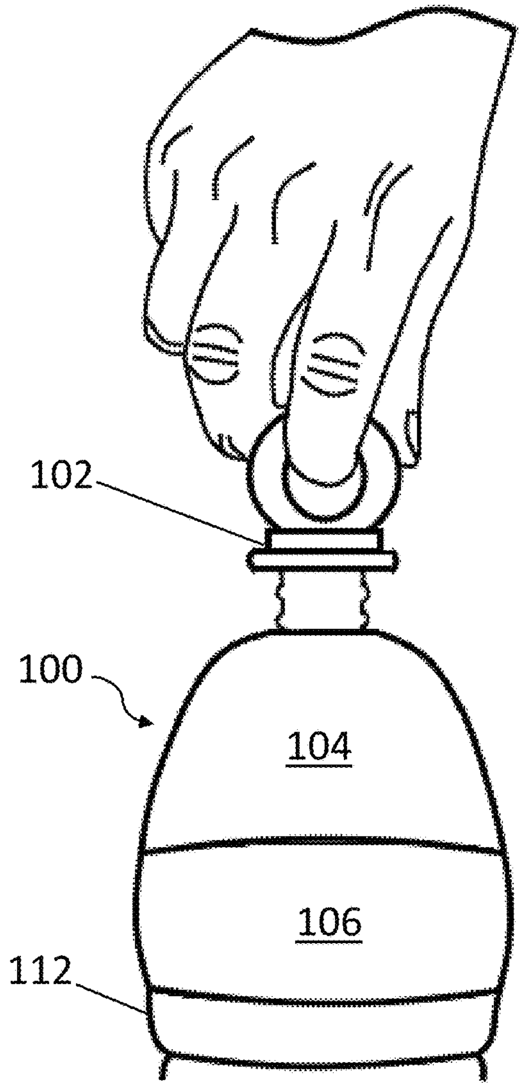
FIG. 15B illustrates a side perspective view of a baby bottle pod while being opened according to one embodiment of the present invention.

FIG. 15A illustrates a side perspective view of a baby bottle pod 100 prior to being opened according to one embodiment of the present invention. FIG. 15B illustrates a side perspective view of a baby bottle pod 100 while being opened according to one embodiment of the present invention. FIG. 15A and FIG. 15B illustrate the conventional use of the ring plug 102 and how it functions as a cork or lid to the pod 100. Specifically, FIGS. 15A and 15B includes a baby bottle pod 100, a ring plug 102, a formula compartment 104, a nip compartment 106, and a pod fitting 112. In one embodiment, the ring plug 102 provides for a quick and easy opening and closing experience. In one embodiment, the ring plug 102 has an upper ring portion that is of a shape and size to fit around a user's finger. In this embodiment, the ring plug 102 allows the user to operate the pod 100 without having to hold or displace the ring plug 102. In one embodiment, the ring plug 102 is operable to be comfortably held onto a user's finger. In one embodiment, the ring plug 102 is operable as the closing member to the formula compartment 104. In one embodiment, the ring plug 102 is operable to be placed onto the formula compartment 104, through the pod orifice 108.

In one embodiment, the ring plug 102 is constructed of polymethyl methacrylate (PMMA), polycarbonate, polyethylene, polyethylene terephthalate (PET), polyvinyl chloride (PVC), acrylonitrile-butadiene-styrene (ABS), polylactic acid (PLA), or other suitable plastic known in the art. In one embodiment, the ring plug 102 is constructed of metal, graphite, carbon fiber or other commonly used material for 3D printing. In one embodiment, the ring plug 102 is constructed of silicon, ethylene propylene diene monomer rubber (EPDM), neoprene, or other suitable synthetic rubber known in the art. In one embodiment, the ring plug 102 is constructed of a single material or a plurality of suitable materials. In one embodiment, the ring plug 102 is constructed of glass, silicone, polycarbonate, polypropylene, Bisphenol A (BPA) free plastic, ethylene vinyl acetate, polyethylene vinyl acetate, and/or borosilicate glass.

In one embodiment, the ring plug 102 includes a lower cork portion, a middle base portion, and an upper ring portion. In one embodiment, the ring plug 102 is operable to engage the pod 100 by frictionally engaging the sides of the pod orifice 108, such that the upper ring portion is exposed and pointing upwards, the middle base portion is substantially flush with the top of the pod 100, and the lower cork portion is submerged within the formula compartment 104 and engaged with the sides of the pod orifice 108. The ring plug 102 is designed so that a user will push down on the upper ring portion to close the pod 100 or pull up on the upper ring portion to open the pod 100. In one embodiment, the lower cork portion is of a size, shape, and material to frictionally engage the formula compartment 104, such that powdered formula 122 remains within the formula compartment 104 regardless of the external position and environment of the pod 100 (i.e., when the pod is placed on its side, upside down, or subject to shaking). In one embodiment, the ring plug 102 is operable to be removed from the pod 100 by a pulling motion. In one embodiment, the lower cork portion is threaded complementary to a threaded baby bottle pod orifice 108. In this embodiment, the ring plug 102 is operable to be removed from the pod 100 through a twisting motion, such that the ring plug 102 is removed from the pod 100 once the threads of the ring plug 102 and the threaded baby bottle pod orifice 108 are decoupled. In one embodiment, the friction applied between the ring plug 102 and the baby bottle pod orifice 108, upon connection, is of a degree that an adult is able to remove the ring plug with ease, while a child is not able to remove the ring plug with ease.

Figure 16:
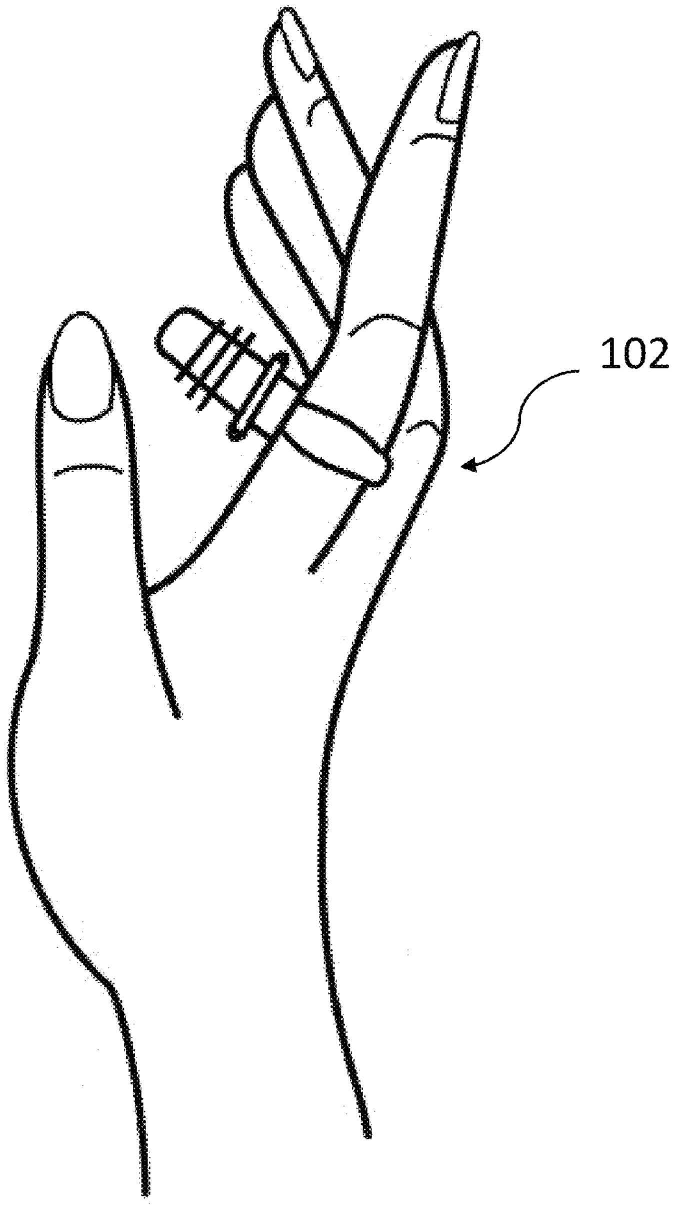
FIG. 16 illustrates a perspective view of the ring plug in use according to one embodiment of the present invention.

FIG. 16 illustrates a perspective view of the ring plug 102 in use according to one embodiment of the present invention. In one embodiment, the ring plug 102 includes an upper handle portion in the shape of a ring. In this embodiment, the ring plug 102 is designed such that a finger is able to be slid inside the ring to hold the ring plug 102. In this embodiment, a user is able to avoid placing the ring plug down on a surface, which potentially causes contamination of the formula compartment 104 and the powdered formula 122 by holding the ring plug 102 on their figure instead. In effect, the ring plug 102 is designed to reduce to contact of germs and bacteria to the powdered formula 122.

Figure 17:
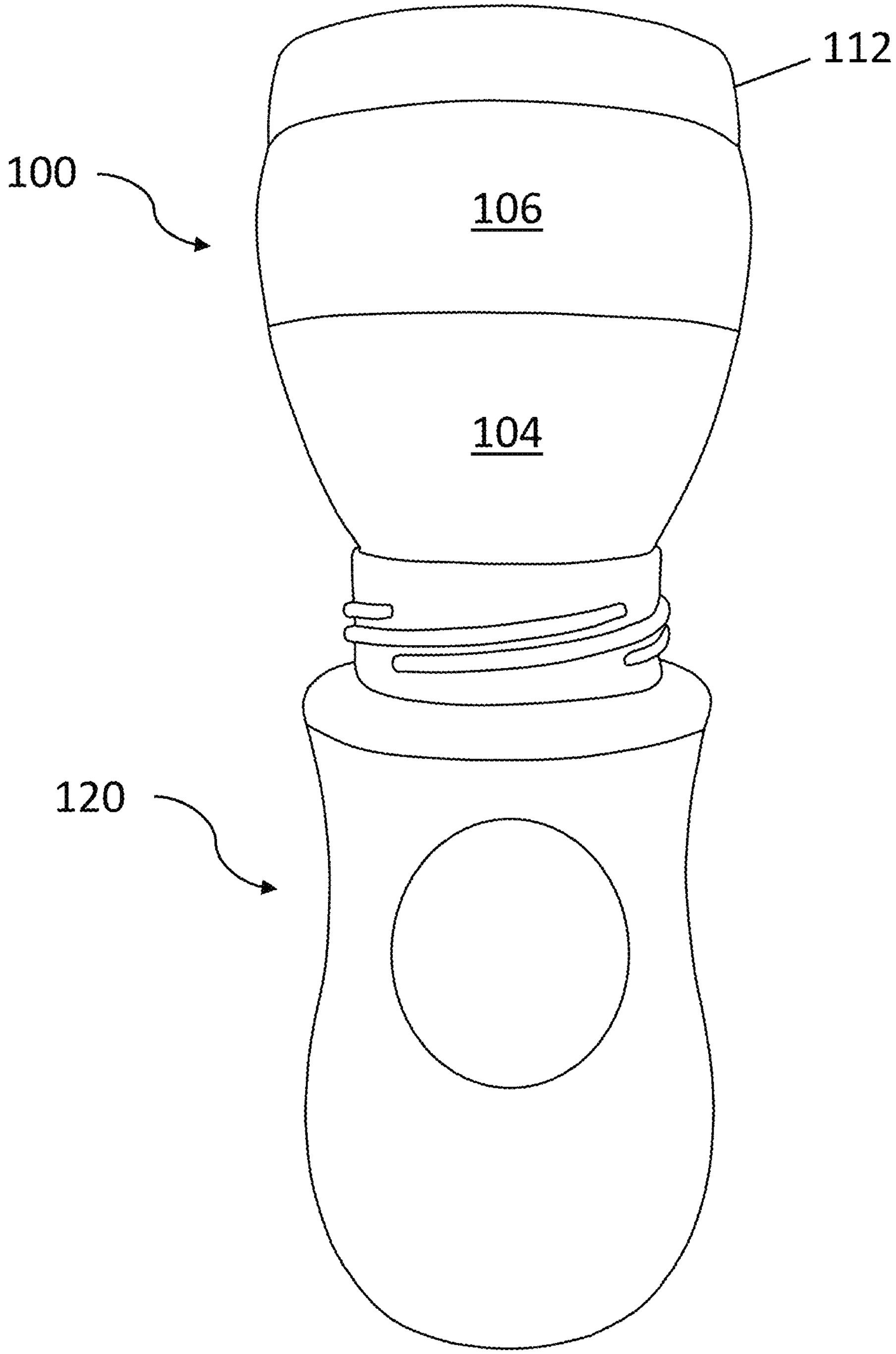
FIG. 17 illustrates a perspective view of an open baby bottle pod is use according to one embodiment of the present invention.

FIG. 17 illustrates a side perspective view of an open baby bottle pod 100 in use according to one embodiment of the present invention. Specifically, FIG. 17 includes a baby bottle pod 100, a formula compartment 104, a nip compartment 106, a baby bottle fitting ring 112, and a baby bottle 120.

In one embodiment, the pod 100 is operable to function as a container and dispenser of powdered formula. In one embodiment, the pod 100 is removed with the baby bottle nip 124 by twisting the pod 100, twisting the baby bottle nip housing 126, and/or the baby bottle fitting ring 112, which exposes the opening to the baby bottle 120. In one embodiment, the pod 100 includes a pod orifice 108 that is operable as an opening to the pod for inputting and outputting powdered formula. In one embodiment, the pod 100 is operable to be attached and detached to a baby bottle 120.

In the preferred embodiment, the pod 100 is operable to receive powdered formula in advance of intent to use, attach to the baby bottle 120 for convenience, detach from the baby bottle 120, remove the ring plug 102, and be turned upside down over the opening of the baby bottle 120, such that the powdered formula is moved by gravity and agitation into the baby bottle 120. Following this process, the baby bottle 120 is equipped with powdered formula. FIG. 17 illustrates the final step of this process, where the pod 100 is upside down and dispensing powdered formula into the baby bottle 120. In one embodiment, the orifice of the powdered formula compartment 104 has a smaller diameter than the opening to the baby bottle 120, in order to prevent spillage when preparing the baby bottle 120 for feeding.

Figure 18:
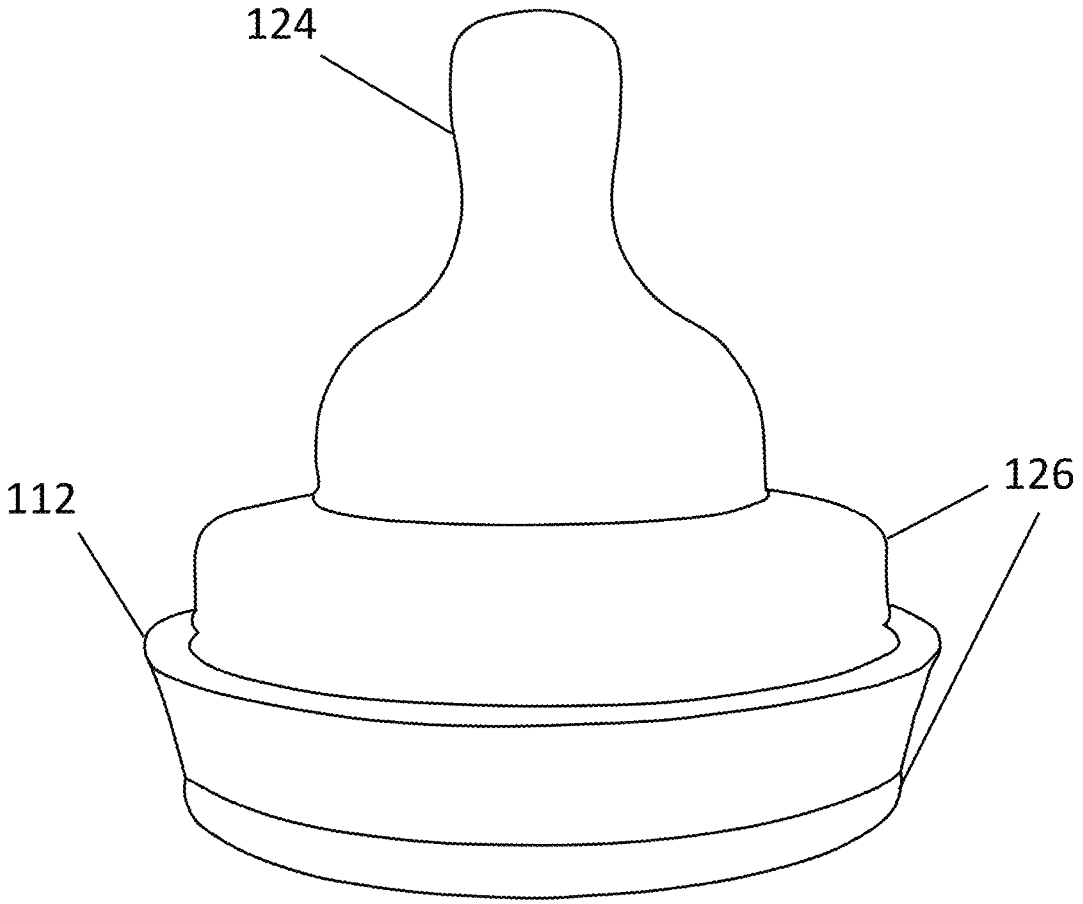
FIG. 18 illustrates a perspective view of a baby bottle pod fitting ring according to one embodiment of the present invention.
Figure 19A:
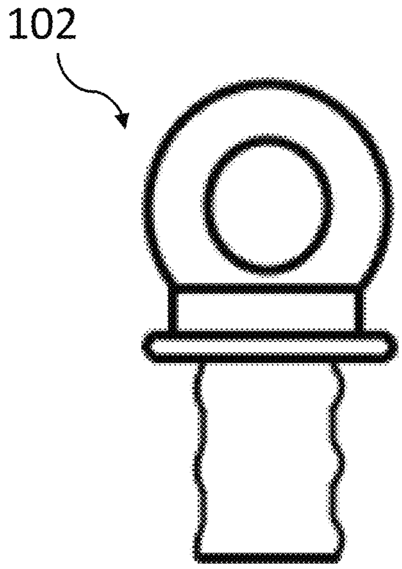
FIG. 19A illustrates a side orthogonal view of a ring plug according to one embodiment of the present invention.
Figure 19B:
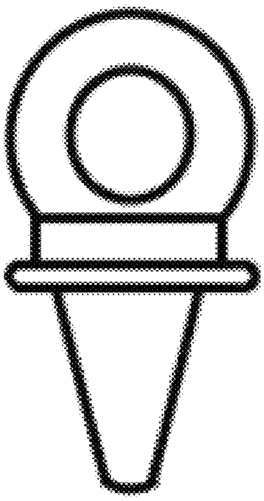
FIG. 19B illustrates a side orthogonal view of a ring plug according to one embodiment of the present invention.
Figure 19C:
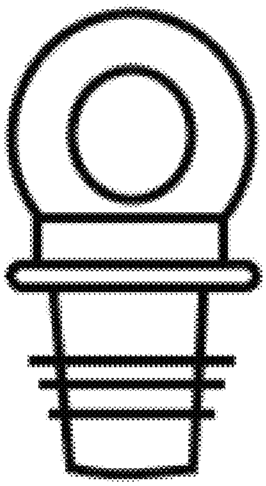
FIG. 19C illustrates a side orthogonal view of a ring plug according to one embodiment of the present invention.
Figure 19D:
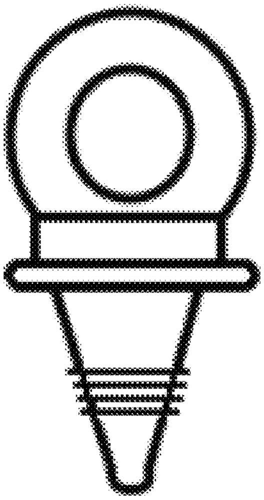
FIG. 19D illustrates a side orthogonal view of a ring plug according to one embodiment of the present invention.
Figure 19E:
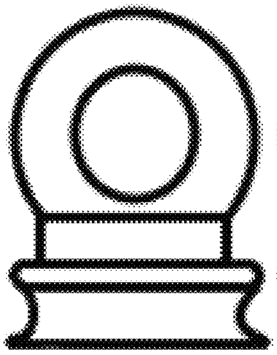
FIG. 19E illustrates a side orthogonal view of a ring plug according to one embodiment of the present invention.
Figure 19F:
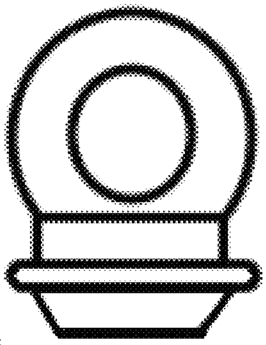
FIG. 19F illustrates a side orthogonal view of a ring plug according to one embodiment of the present invention.

FIG. 18 illustrates a side perspective view of a pod fitting ring 112 according to one embodiment of the present invention. Specifically, FIG. 18 includes a pod fitting ring 112, a baby bottle nip 124, and a baby bottle nip housing 126.

In one embodiment, the pod fitting ring 112 facilitates attachment of the pod 100 to baby bottles 120 without the need to manufacture the pod 100 to have dimensions complimentary to that of the baby bottle 120. In one embodiment, the pod fitting ring 112 functions as a one-size-fits-all medium for the pod 100.

In one embodiment, the pod fitting ring 112 facilitates a frictional engagement between the pod 100 and the baby bottle 120. In one embodiment, the pod 100 is manufactured to frictionally engage the baby bottle 120 without a pod fitting ring 112. In one embodiment, the lower circumference of the nip compartment 106 is of a size and shape slightly smaller than the size and shape of the nip housing 126, which results in the pod 100 being frictionally engaged with the baby bottle 120 upon connection. In one embodiment, the internal circumference of the nip compartment 106 is of a size and shape smaller than the outer circumference of the pod fitting ring 112, which results in the pod 100 being frictionally engaged with the baby bottle 120 upon connection. In one embodiment, the pod fitting ring 112 acts as a stopper for the connection between the pod 100 and the baby bottle 120. In one embodiment, the pod fitting ring 112 facilitates a snap fitting between the pod 100 and the baby bottle 120.

In one embodiment, the pod fitting ring 112 is attached to the baby bottle nip housing 126 of the baby bottle 120, rather than to the lower section of the pod 100. In one embodiment, the pod 100 includes a pod fitting ring 112 attachable through any conventional means of attachment to a baby bottle nip housing 126 to facilitate snap on attachment of the pod 100 to the baby bottle 120. In one embodiment, the pod fitting ring 112 has an upper ring surface complimentary to the lower ring surface of the nip compartment 106, such that they are matingly attachable to one another in a snap-on fit motion. In one embodiment, the pod fitting ring 112 is attached to the baby bottle nip housing 126 by an adhesive and is permanently affixed to the baby bottle nip housing 126. In one embodiment, the pod fitting ring 112 is fictionally engaged with the baby bottle nip housing 126 by having a size, shape, and dimension complimentary with that of the baby bottle nip housing 126. In one embodiment, the pod fitting ring 112 is removable from the baby bottle nip housing 126. In one embodiment, the pod fitting ring 112 is attached to the pod 100 and is operable to facilitate attachment of the pod 100 to the baby bottle 120. In one embodiment, the pod 100 is configured to attach to the baby bottle 120 without the use of the baby bottle pod fitting ring 112. In this embodiment, the pod 100 is configured to have dimensions complimentary to that of the baby bottle nip housing 126, such that the pod 100 is able to snap onto the baby bottle 120.

FIGS. 19A-F illustrate a variety of ring plugs 102 according to various embodiments of the present invention. In one embodiment, the ring plug 102 is operable as a lid and/or plunger, such that a silicon seal is formed once the ring plug 102 is pressed into the pod orifice 108. In one embodiment, the formula compartment 104 is exposed once the ring plug 102 is pulled from the pod orifice 108. FIGS. 19A-F illustrate different embodiments of the ring plug 102. In one embodiment, the ring plug 102 includes a lower section that is of a rectangular shape with a plurality of bulges, a cone shape with smooth edges where the tip of the cone is rounded and pointing downwards, a rectangular shape with a plurality of rings about its circumference, a cone shape with a plurality of rings about its circumference, a short rectangular shape with concave sides and protruding edges, a short cone shape with a long flat bottom, and/or any other suitable plunger shape known in the art. In one embodiment, the ring plug 102 is manufactured with an upper section that includes an aesthetically augmented design, rather than a simple ring design. As an example, the ring plug 102 includes an upper portion in the shape of a pacifier, in the shape of a football, and/or any aesthetically pleasing shape a user desires. In one embodiment, the ring plug 102 is manufactured with an upper section that includes a different practical design other than a simple ring design. As an example, the ring plug 102 includes an upper portion in the shape of a shaft grip, hand grip, knob, hook, and/or any practically designed shape.

Figure 20:
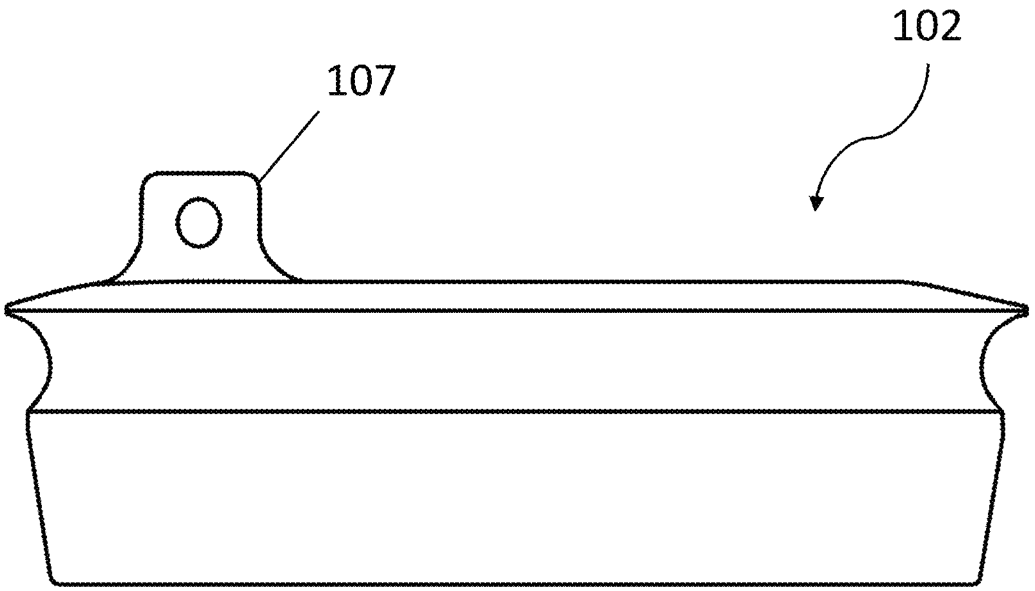
FIG. 20 illustrates a side orthogonal view of a ring plug according to one embodiment of the present invention.

FIG. 20 illustrates a side perspective view of a ring plug 102 according to one embodiment of the present invention. In one embodiment, the ring plug 102 includes a ring receptacle 107. In one embodiment, the ring receptacle 107 is located near the edge of one end of the base of the ring plug 102. In one embodiment, the ring receptacle 107 includes an aperture of a shape and size to house a ring or handle for gripping the ring plug 102.

Figure 21:
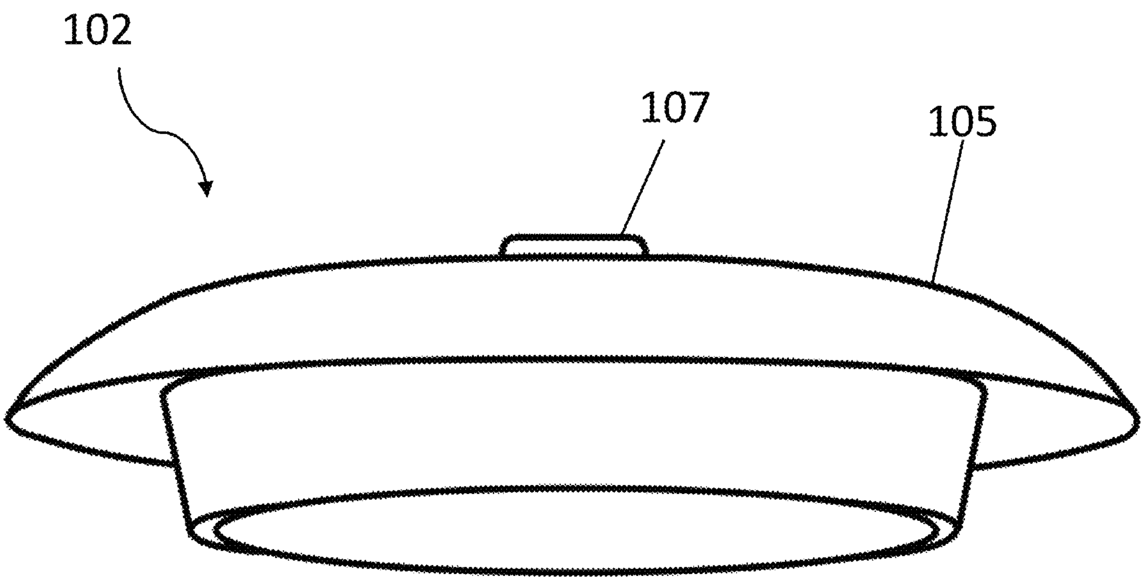
FIG. 21 illustrates a perspective view of a ring plug with an umbrella lip according to one embodiment of the present invention.

FIG. 21 illustrates a side perspective view of a ring plug 102 with an umbrella lip 105 according to one embodiment of the present invention. In one embodiment, the ring plug 102 includes an umbrella lip 105. In one embodiment, the umbrella lip 105 is operable to reduce spillage and/or leakage of the contents of the formula compartment. In one embodiment, the umbrella lip 105 is operable as an additional barrier between the formula compartment and the environment of the pod. In one embodiment, upon closing the formula compartment with the ring plug 102, the umbrella lip 105 rests overtop of and in contact with the pod orifice 108 (See FIG. 23). In one embodiment, the umbrella lip 105 is an additional appendage of the ring plug 102 located below the ring receptable 107 and above the lower cork portion. In one embodiment, the umbrella lip 105 is integrally formed with the ring plug 102. In one embodiment, the umbrella lip 105 is separately manufactured and attached to the ring plug through conventional methods of attachment (e.g., adhesive, bolts, screws, welding, heat fusion, etc.). In one embodiment, upon connection of the ring plug 102 to the pod, the umbrella lip 105 frictionally engages the upper portion of the formula compartment around and overtop of the pod orifice. In one embodiment, upon connection of the ring plug 102 to the pod, the umbrella lip 105 is flush with the upper portion of the formula compartment around and overtop of the pod orifice. In one embodiment, the umbrella lip 105 prevents contents of the formula compartment from escaping the formula compartment while the ring plug 102 is attached to the pod.

Figure 22A:
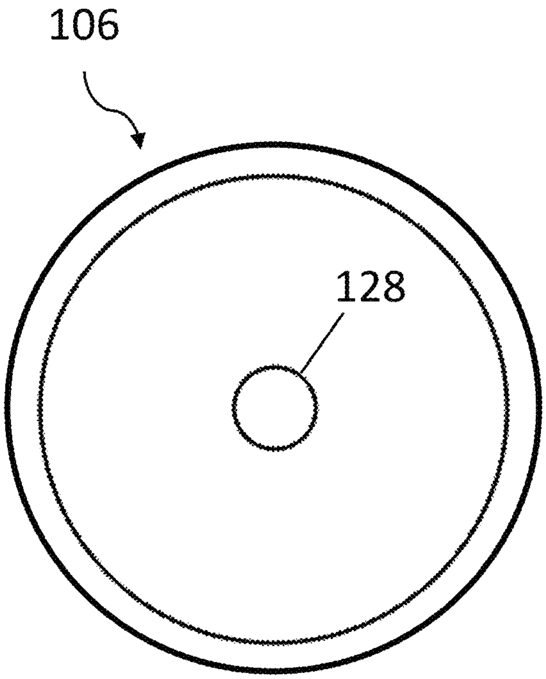
FIG. 22A illustrates a bottom orthogonal view of a nip compartment according to one embodiment of the present invention.
Figure 23:
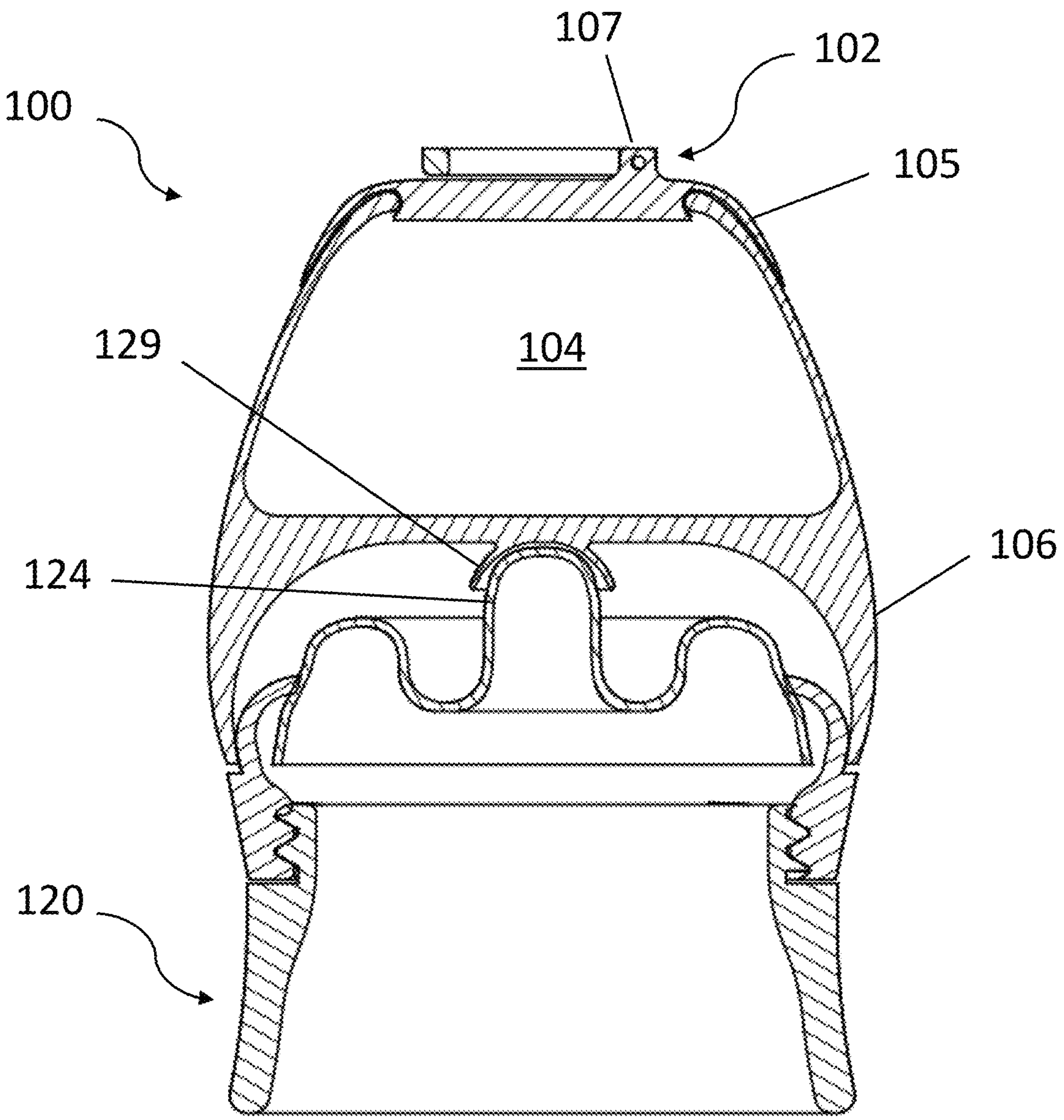
FIG. 23 illustrates a side sectional view of a baby bottle pod with an umbrella lip and a nip housing protrusion according to one embodiment of the present invention.

FIG. 22A illustrates a bottom orthogonal view of a nip compartment 106 according to one embodiment of the present invention. Specifically, FIG. 22A includes a nip compartment 106 and a nip housing depression 128 in approximately the center of the nip compartment 106. In one embodiment, the nip housing depression 128 is operable to grip and pull erect the baby bottle nip upon removal of the pod from the baby bottle 120. In one embodiment, the nip compartment 106 includes a nip housing depression 128, which is a shallow circular depression placed in the center of the roof of the nip compartment 106. In one embodiment, the nip compartment 106 is designed to be a shorter length than the length of the baby bottle nip 124, such that the baby bottle nip 124 is compressed when the pod 100 is placed on top of the baby bottle 120 (as illustrated in FIGS. 14 and 23). In the embodiment where the nip compartment 106 includes a nip housing depression 128, the nip housing depression 128 is of a size and shape complimentary with the uppermost part of the baby bottle nip. In this embodiment, the nip housing depression 128 is operable to receive the top of the baby bottle nip, such that the baby bottle nip is lightly grasped (i.e., frictionally engaged) by the nip housing depression 128. In one embodiment, the nip housing depression 128 is operable to facilitate a uniform compression of the baby bottle nip, such that the nip is compressed symmetrically downward (i.e., as opposed to being folded to one side or another) by lightly grasping the baby bottle nip as it is compressed. In one embodiment, the nip housing depression 128 is operable to lightly grasp (i.e., frictionally engage) the baby bottle nip, such that upon removal of the pod from the baby bottle 120, the baby bottle nip is pulled upwards until the force is enough to release the baby bottle nip 124 from the nip housing depression 128, which leaves the baby bottle nip 124 erect and ready for use. In this embodiment, the nip housing depression 128 is operable to prevent the situation where the baby bottle nip remains compressed upon removal of the pod from the baby bottle.

Figure 22B:
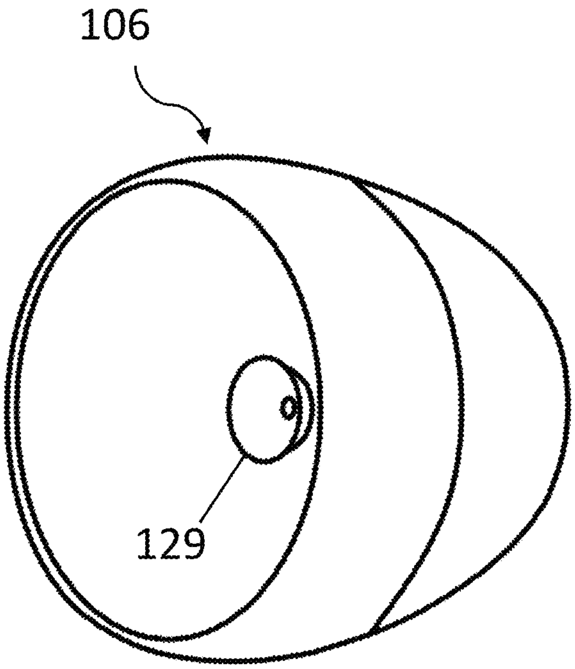
FIG. 22B illustrates a side perspective view of a nip compartment according to one embodiment of the present invention.

FIG. 22B illustrates a side perspective view of a nip compartment 106 according to one embodiment of the present invention. In one embodiment, the nip compartment 106 includes a nip housing protrusion 129. In this embodiment, the nip housing protrusion 129 is similar to the nip housing depression 128 in that the protrusion is of a size and shape operable to lightly grasp (i.e., frictionally engage) the baby bottle nip, such that upon removal of the pod from the baby bottle, the baby bottle nip is pulled upwards until the baby bottle nip is released from the nip housing protrusion 129, which leaves the baby bottle nip erect and ready for use. In this embodiment, the nip housing protrusion 129 is dissimilar to the nip housing depression 128 in that the protrusion projects from the center of the roof of the nip compartment 106 (i.e., extends outwards). In one embodiment, the nip housing protrusion 129 is an umbrella shape. In one embodiment, the nip housing protrusion 129 is a hollow half spherical shape, such that the upward facing portion includes a rounded roof with an open bottom. In one embodiment, the nip housing protrusion 129 is of a size and shape to fit the tip of a baby bottle nip. In one embodiment, the nip housing protrusion 129 is manufactured as a separate component and permanently affixed to the center roof of the nip compartment 106 through one or more attachment methods known in the art (e.g., adhesive, bolts, screws, welding, heat fusion, etc.). In one embodiment, the nip housing protrusion 129 is integrally formed with the nip compartment 106. In one embodiment, the nip housing protrusion 129 extends downwards into the center roof of the nip compartment 106 by approximately 5 millimeters.

In one embodiment, the nip housing protrusion 129 is configured to prevent liquid solution from the baby bottle 120 from leaking from the baby bottle nip by providing a formfitting surface to connect with the baby bottle nip. In one embodiment, the nip housing protrusion 129 is configured to facilitate and/or guide compression of the baby bottle nip upon placing the pod onto the baby bottle. In this embodiment, the nip housing protrusion 129 facilitates a symmetrical downward depression of the baby bottle nip, such that the nip does not bend to one particular side and instead depresses directly downward into itself (as illustrated in FIGS. 14 and 23). In this embodiment, the nip housing protrusion 129 is configured to grip the tip of the baby bottle nip as the pod is being placed on the baby bottle, such that the tip of the baby bottle nip frictionally and/or matingly engages the side walls of the nip housing protrusion 129. In this embodiment, the baby bottle nip is prevented from folding unevenly onto its side by the frictional and/or mating engagement with the nip housing protrusion 129.

FIG. 23 illustrates a side sectional view of a baby bottle pod with an umbrella lip 105 and a nip housing protrusion 129 according to one embodiment of the present invention. FIG. 23 illustrates a preferred embodiment of the pod 100, which includes an umbrella lip 105 and a nip housing protrusion 129. In one embodiment, the pod 100 includes a ring plug 102, which includes an umbrella lip 105 and a ring receptacle 107, a formula compartment 104, a nip compartment 106, which includes a nip housing protrusion 129, a nip compartment 106, a baby bottle nip 124, and a baby bottle 120. FIG. 23 illustrates how the umbrella lip 105 lays overtop of the formula compartment 104. FIG. 23 illustrates how the nip housing protrusion 129 facilitates compression of the baby bottle nip 124. In one embodiment, the ring plug 102 does not include a ring receptacle 107, rather the ring and/or handle portion of the ring plug 102 is integrally formed to the ring plug 102.

FIG. 23 serves as an example of how the present invention is operable to include some features described herein while excluding other features described herein. In one embodiment, the pod 100 does not include an umbrella lip 105 on the ring plug 102. In one embodiment, the pod 100 does not includes a nip housing protrusion 129. In one embodiment, the pod 100 includes features selected from the group consisting of a ring receptacle 107, an umbrella lip 105, a nip housing protrusion 129, a nip housing depression 128, and a pod fitting ring 112. In one embodiment, the pod 100 excludes features selected from the group consisting of a ring receptacle 107, an umbrella lip 105, a nip housing protrusion 129, a nip housing depression 128, and a pod fitting ring 112.

In one embodiment, the pod of the present invention is operable with a wide variety of baby bottles, regardless of their size and shape. One of ordinary skill in the art will appreciate that different baby bottles have varying dimensions (i.e., one baby bottle may have a wider opening than another, a larger base, or a narrower nip than another). Despite this, the baby bottle pod is operable to be manufactured at varying dimensions to match those of different baby bottles. One of ordinary skill in the art will understand that the pod may be manufactured in varying proportions. One of ordinary skill in the art will understand that while the preferred embodiment functions with conventional baby bottles, the pod of the present application maintains its operability regardless of the scale. Additionally, and with respect to the pod fitting ring 112, one of ordinary skill in the art will understand the pod fitting ring 112 is designed to serve as an intermediary between the pod 100 and varying sized baby bottles 120, such that the pod 100 is operable with a wide variety of baby bottles 120 without varying the dimensions of the pod 100. Furthermore, the pod fitting ring 112 is operable to be manufactured in a variety of dimensions in order function with a variety of baby bottles.

In one embodiment, the pod of the present invention is sealed with a frangible film rather than a ring plunger at the pod's orifice. In one embodiment, the pod includes a piercing device attachment that is operable to pierce a frangible film of the pod. In one embodiment, the piercing device is attached to the aerator of the baby bottle. In this embodiment, the pod is operable to be turned upside down, wherein the piercer engages the frangible film whereupon the pod is twisted to completely remove the frangible film. In this embodiment, the piercer is of a size and shape where twisting the pod is operable to drag the piercer around the circumference of the frangible film, which results in the frangible film being completely released from the pod orifice and the formula compartment being exposed. In this embodiment, powdered formula is dispensed into the baby bottle through a twisting motion.

In one embodiment, the present invention includes a baby bottle that is compatible with the pod 100. In one embodiment, the baby bottle includes a container with a volume, a teat or "nip" with a nip volume, a nip housing unit, and an aerator unit. In one embodiment, the baby bottle container includes a plurality of threads. In one embodiment, the container's plurality of threads are compatible with similar threads located on the inner rim of the nip housing unit, such that, upon twisting, the baby bottle container and nip housing unit are fastened together by the thread interaction. In one embodiment, attachment of the nip housing unit to the container is achieved through a half turn (i.e., half of a full 360-degree turn). In one embodiment, attachment of the nip housing unit to the container is achieved through a quarter turn (i.e., a quarter of a full 360-degree turn). In one embodiment, the nip housing unit includes a baby bottle nip and an aerator unit. In one embodiment, the aerator unit is operable to allow air to enter the baby bottle container while in use. In one embodiment, the aerator is a duckbill shape and a slit valve. In one embodiment, the aerator is located on the lower base portion of the baby bottle nip. In one embodiment, the aerator includes, but is not limited to, that described in U.S. Patent Publication No. 2022/0378664.

In one embodiment, the pod 100 is operable with a conventional baby bottle. Examples of baby bottles compatible with the pod 100 include, but are not limited to, that described in U.S. Patent Publication No. 2022/0031572, U.S. Pat. Nos. 8,752,719, and 9,561,157, each of which is incorporated herein by reference in its entirety.

In one embodiment, the pod 100 is operable to store powder and/or liquid other than those utilized in feeding a baby. One of ordinary skill in the art will recognize that the functionality of the pod 100, while preferably for powdered formula, is operable in a wide variety of fields. As an example, the pod 100 is operable to store protein powder and dispense protein powder into a larger contain than that described herein.

One of ordinary skill in the art will recognize that the need to separate solutes from their solvents, prior to their combination is useful in a wide variety of fields. Furthermore, one of ordinary skill in the art will recognize that the pod 100 is operable to provide such a use, regardless of whether the solute is powdered formula and regardless of whether the solvent is water. As an example, the pod 100 is useful in storing and preparing concrete by ensuring the components thereto are separated, yet conveniently stored in one container, prior to mixing. In one embodiment, the pod 100 and the container upon which is attaches is of a shape and size larger than the pod 100 designed to function with a baby bottle. In one embodiment, the pod 100 and the container upon which is attaches is of a shape and size smaller than the pod 100 designed to function with a baby bottle.

One of ordinary skill in the art will also appreciate that the measurements and dimensions provided herein are only exemplary, and that other dimensions are operable to be utilized in connection with the components described herein.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A device for storing a solute comprising:

a first storage compartment;

a second storage compartment;

a baby bottle nipple; and a plug;

wherein an upper portion of the second storage compartment is connected to a lower portion of the first storage compartment;

wherein a lower portion of the second storage compartment is configured to removably attach to an upper portion of a solvent container;

wherein the plug is configured to close and/or seal the first storage compartment by frictionally engaging an orifice defined in an upper portion of the first storage compartment;

wherein the first storage compartment is configured to store the solute;

wherein the second storage compartment is configured to house the baby bottle nipple;

wherein the baby bottle nipple extends upwardly from the upper portion of the solvent container;

wherein the plug includes a tapered ring and an umbrella lip; and wherein the second storage compartment includes a protruding hollow half spherical nip housing sized and shaped to grip the baby bottle nipple and to compress the baby bottle nipple into a compressed state when the second storage compartment is attached to the upper portion of the solvent container and pull the baby bottle nipple to release the baby bottle nipple from the compressed state when the second storage compartment is removed from the upper portion of the solvent container.

2. The device of claim 1, wherein the orifice of the first storage compartment has a smaller diameter than the diameter of an opening to the solvent container.

3. The device of claim 1, wherein the first storage compartment includes smooth interior walls and/or wherein the first storage compartment does not include acute corners.

4. The device of claim 1, wherein the first storage compartment includes interior concave walls that are upward and increasingly concave from the interior of the lower portion of the first storage compartment to the upper portion of the first storage compartment.

5. The device of claim 1, wherein the solute is powdered baby formula.

6. The device of claim 1, wherein the plug is operable to create an airtight, water tight, impermeable, and/or pressure tight seal with the first storage compartment.

7. The device of claim 1, wherein the umbrella lip of the plug frictionally engages around and overtop of the upper portion of the first storage compartment.

8. The device of claim 1, wherein the tapered ring of the plug is attached to a bottom surface of the plug.

9. A device for preparing a baby bottle comprising:
a powdered formula storage compartment;
a baby bottle nipple compartment; and
a ring plug;
wherein an upper portion of the baby bottle nipple compartment is connected to a lower portion of the powdered formula storage compartment;
wherein a lower portion of the baby bottle nipple compartment is configured to removably attach to an upper portion of the baby bottle;
wherein the ring plug is configured to close and/or seal the powdered formula storage compartment by frictionally engaging an orifice of an upper portion of the powdered formula storage compartment;
wherein the powdered formula storage compartment is configured to store powdered formula;
wherein the baby bottle nipple compartment is configured to house a baby bottle nipple extending upwardly from the upper portion of the baby bottle;
wherein the baby bottle nipple compartment includes a hollow half spherical nipple housing protrusion extending downwardly from a bottom surface of the baby bottle nipple compartment, which is sized and shaped to grip the baby bottle nipple to compress the baby bottle nipple and pull the baby bottle nipple to erect the baby bottle nipple; and
wherein the ring plug includes a tapered ring and an umbrella lip.

10. The device of claim 9, wherein the powdered formula storage compartment and the baby bottle nipple compartment are integrally formed.

11. The device of claim 9, wherein the powdered formula storage compartment includes smooth interior walls and/or wherein the powdered formula storage compartment does not include acute corners.

12. The device of claim 9, wherein the powdered formula storage compartment includes interior concave walls that are upward and increasingly concave from the interior of the lower portion of the powdered formula storage compartment to the upper portion of the powdered formula storage compartment.

13. The device of claim 9, wherein the ring plug includes a ring-shaped handle attached to a top surface of the ring plug and wherein the ring plug is operable to create an airtight, water tight, impermeable, and/or pressure tight seal with the powdered formula storage compartment.

14. A system for storing a solute comprising:
a first storage compartment;
a second storage compartment;
a liquid container;
a baby bottle nipple; and
a plug;
wherein an upper portion of the second storage compartment is connected to a lower portion of the first storage compartment;
wherein a lower portion of the second storage compartment is configured to removably attach to an upper portion of the liquid container;
wherein the plug is configured to close and/or seal the first storage compartment by frictionally engaging an orifice defined in an upper portion of the first storage compartment;
wherein the first storage compartment is configured to store the solute;
wherein the second storage compartment is configured to house the baby bottle nipple;
wherein the baby bottle nipple extends upwardly from the upper portion of the liquid container;
wherein the plug includes a tapered ring and an umbrella lip; and
wherein the second storage compartment includes a protruding hollow half spherical nip housing sized and shaped to grip the baby bottle nipple to compress the baby bottle nipple into a compressed state when the second storage compartment is attached to the upper portion of the liquid container and pull the baby bottle nipple to release the baby bottle nipple from the compressed state when the second storage compartment is removed from the upper portion of the liquid container.

15. The system of claim 14, wherein the first storage compartment and the second storage compartment are integrally formed and permanently connected, wherein the first storage compartment is operable to store powdered baby formula, and wherein the first storage compartment includes smooth interior concave walls that are upward and increasingly concave from the interior of the lower portion of the first storage compartment to the upper portion of the first storage compartment.

16. The system of claim 14, wherein the plug includes a ring-shaped handle attached to a top surface of the plug and wherein the plug is operable to create an airtight, water tight, impermeable, and/or pressure tight seal with the first storage compartment.

17. The device of claim 1, wherein the protruding hollow half spherical nip housing is operable to create symmetrical downward pressure on the baby bottle nipple.

18. The device of claim 9, wherein the hollow half spherical nipple housing protrusion is operable to create symmetrical downward pressure on the baby bottle nipple.

19. The device of claim 1, wherein the plug further includes a ring-shaped handle.

20. The system of claim 14, wherein the protruding hollow half spherical nip housing is operable to create symmetrical downward pressure on the baby bottle nipple.

* * * * *